United States Patent
Ogawa et al.

(10) Patent No.: US 9,288,430 B2
(45) Date of Patent: Mar. 15, 2016

(54) RECORDING MEDIUM, PLAYBACK DEVICE, RECORDING DEVICE, PLAYBACK METHOD AND RECORDING METHOD FOR RECORDING PROGRESSIVE PICTURES AT HIGH FRAME RATE

(75) Inventors: Tomoki Ogawa, Osaka (JP); Hiroshi Yahata, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 484 days.

(21) Appl. No.: 13/823,484

(22) PCT Filed: Aug. 10, 2012

(86) PCT No.: PCT/JP2012/005096
§ 371 (c)(1),
(2), (4) Date: Mar. 14, 2013

(87) PCT Pub. No.: WO2013/021657
PCT Pub. Date: Feb. 14, 2013

(65) Prior Publication Data
US 2013/0188928 A1    Jul. 25, 2013

Related U.S. Application Data

(60) Provisional application No. 61/521,877, filed on Aug. 10, 2011.

(51) Int. Cl.
*H04N 9/80* (2006.01)
*H04N 5/93* (2006.01)
(Continued)

(52) U.S. Cl.
CPC ............ *H04N 5/85* (2013.01); *G11B 20/10527* (2013.01); *G11B 27/105* (2013.01);
(Continued)

(58) Field of Classification Search
CPC ......... H04N 5/76; H04N 5/85; H04N 9/8042; H04N 9/8205; H04N 9/8211; H04N 9/8227; H04N 9/8233; G11B 27/105; G11B 20/10527; G11B 2020/10935; G11B 2020/2541; G11B 2020/10592
USPC ......... 386/248, 278, 284, 291, 323, 324, 326, 386/328, 334, 341, 353
See application file for complete search history.

(56) References Cited

U.S. PATENT DOCUMENTS

| 5,377,051 A | * | 12/1994 | Lane ................... G11B 5/0086 348/E5.007 |
| 2005/0055375 A1 | | 3/2005 | Torii et al. |
| 2009/0279869 A1 | | 11/2009 | Ogawa et al. |

FOREIGN PATENT DOCUMENTS

| EP | 1 168 833 A2 | 1/2002 |
| EP | 1 513 149 A1 | 3/2005 |

(Continued)

OTHER PUBLICATIONS

Extended European Search Report issued Nov. 10, 2014 in corresponding European Application No. 12822239.5.
(Continued)

*Primary Examiner* — Robert Chevalier
(74) *Attorney, Agent, or Firm* — Wenderoth, Lind & Ponack, L.L.P.

(57) ABSTRACT

A recording medium on which video streams, control programs and index table are recorded. The video streams include video stream composed of progressive pictures and video stream composed of interlace pictures. The video stream composed of the progressive pictures has a mandatory rate or an optional rate. The index table indicates correspondence between titles and control programs. A control program corresponding to first play title and top menu title excludes a playback path, which specifies a playback of the progressive pictures in the video stream at the optional rate, from a playback target and instructs to perform a playback in accordance with another playback path.

21 Claims, 28 Drawing Sheets

(51) Int. Cl.
*H04N 5/85* (2006.01)
*H04N 5/76* (2006.01)
*H04N 9/804* (2006.01)
*H04N 9/82* (2006.01)
*G11B 27/10* (2006.01)
*G11B 20/10* (2006.01)

(52) U.S. Cl.
CPC .............. *H04N 5/76* (2013.01); *H04N 9/8042* (2013.01); *H04N 9/8205* (2013.01); *H04N 9/8211* (2013.01); *H04N 9/8227* (2013.01); *H04N 9/8233* (2013.01); *G11B 2020/10592* (2013.01); *G11B 2020/10935* (2013.01); *G11B 2220/2541* (2013.01)

(56) References Cited

FOREIGN PATENT DOCUMENTS

| | | |
|---|---|---|
| EP | 1 843 347 A1 | 10/2007 |
| JP | 2006-510163 | 3/2006 |
| JP | 2010-232885 | 10/2010 |
| WO | 2009/128246 | 10/2009 |

OTHER PUBLICATIONS

International Search Report issued Nov. 13, 2012 in corresponding International Application No. PCT/JP2012/005096.

* cited by examiner

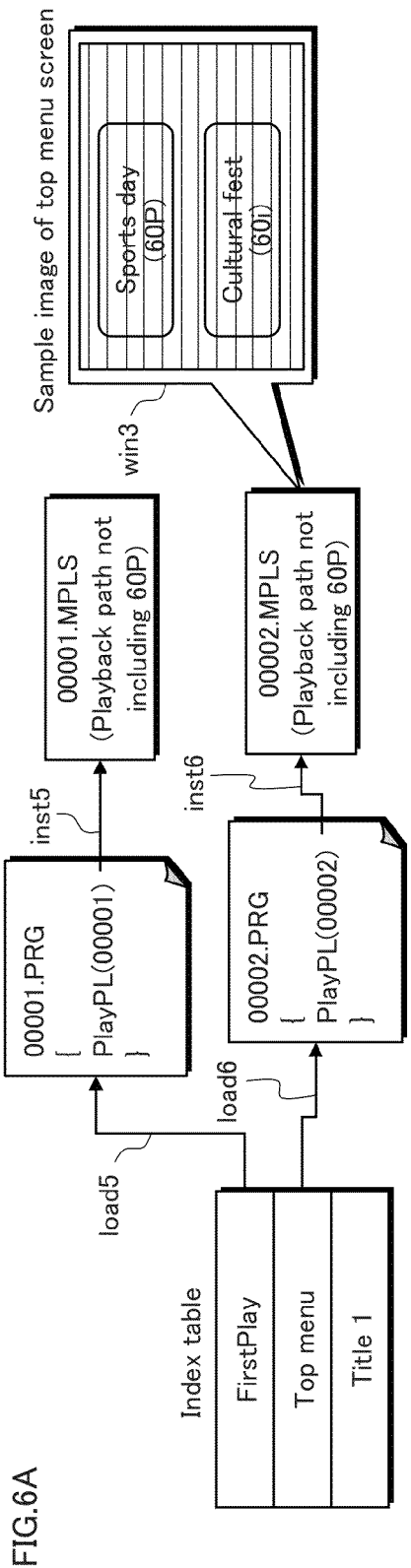
FIG.6A
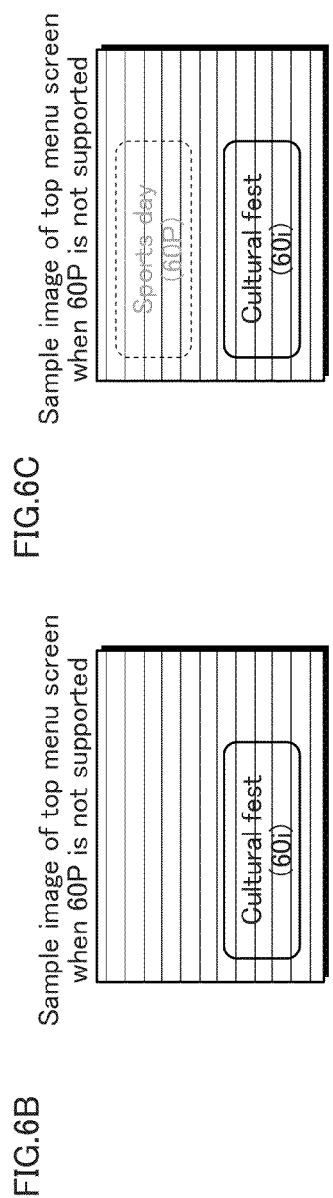
FIG.6B
FIG.6C
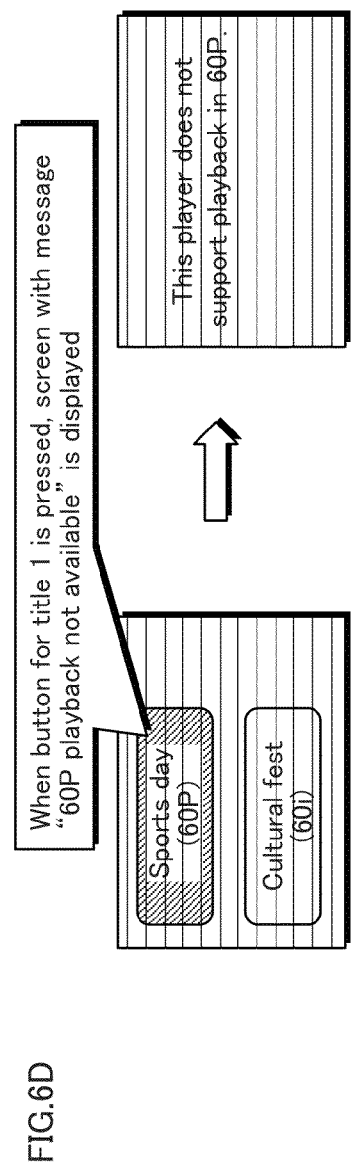
FIG.6D

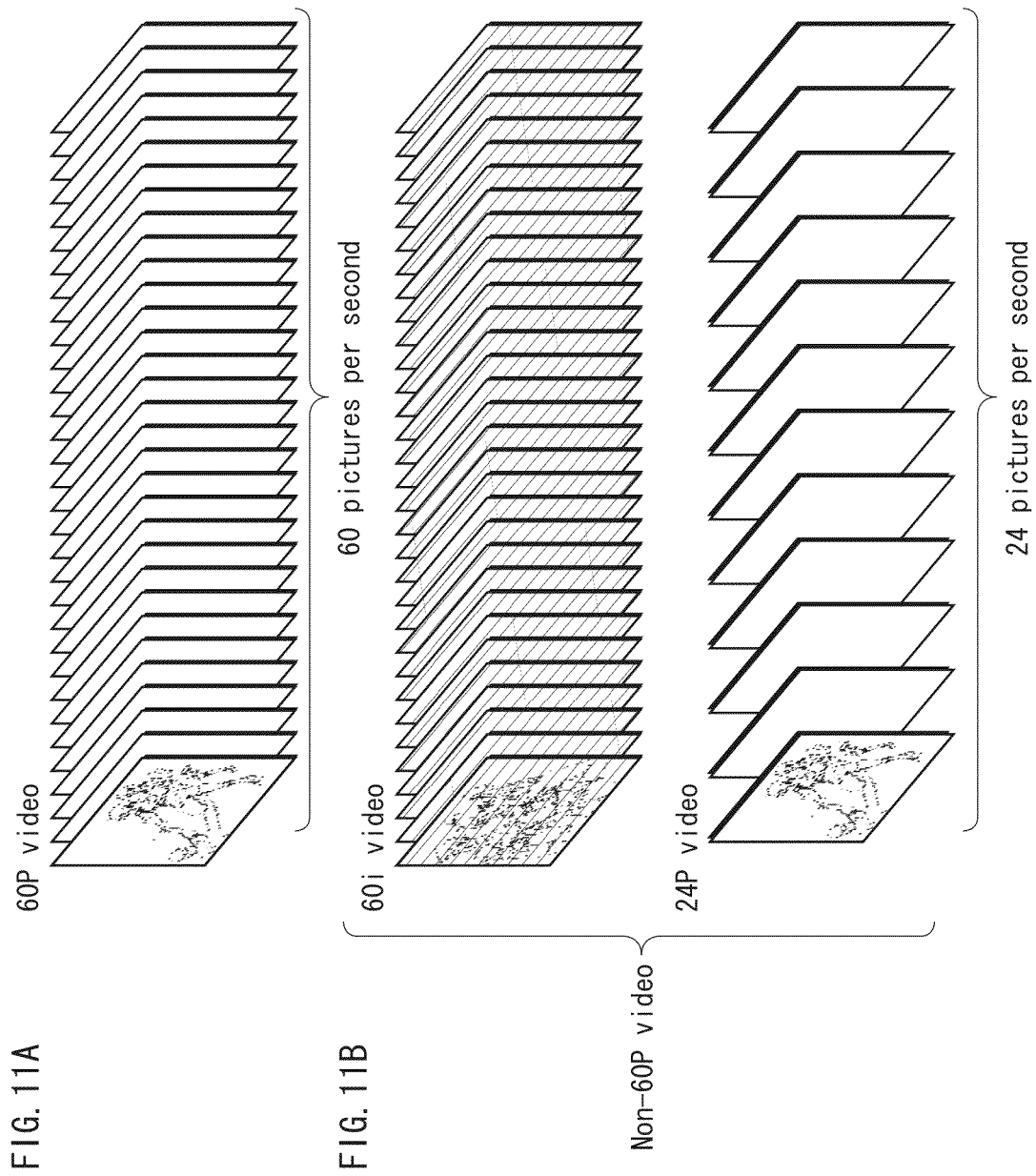

Picture in 60P video stream

Picture in 60i video stream

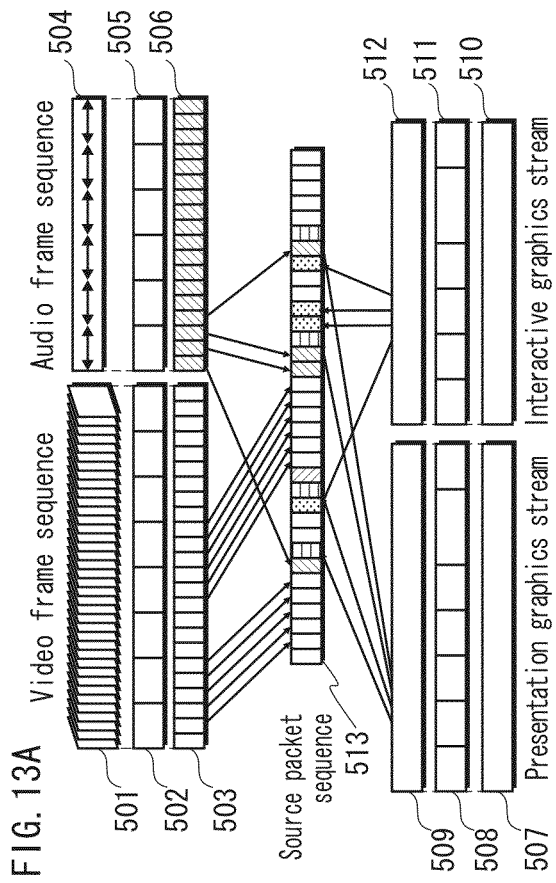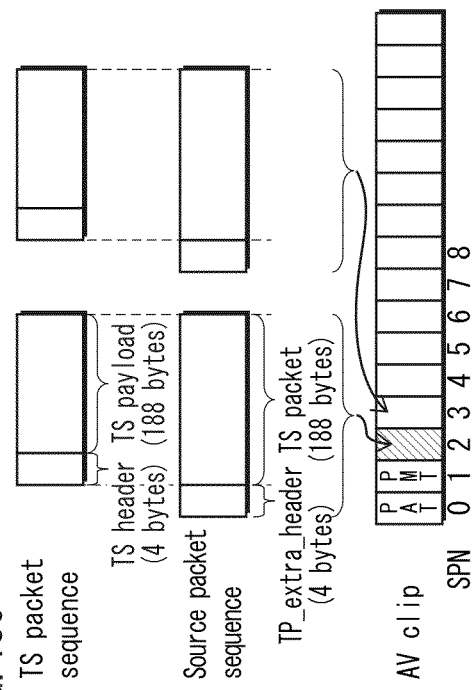

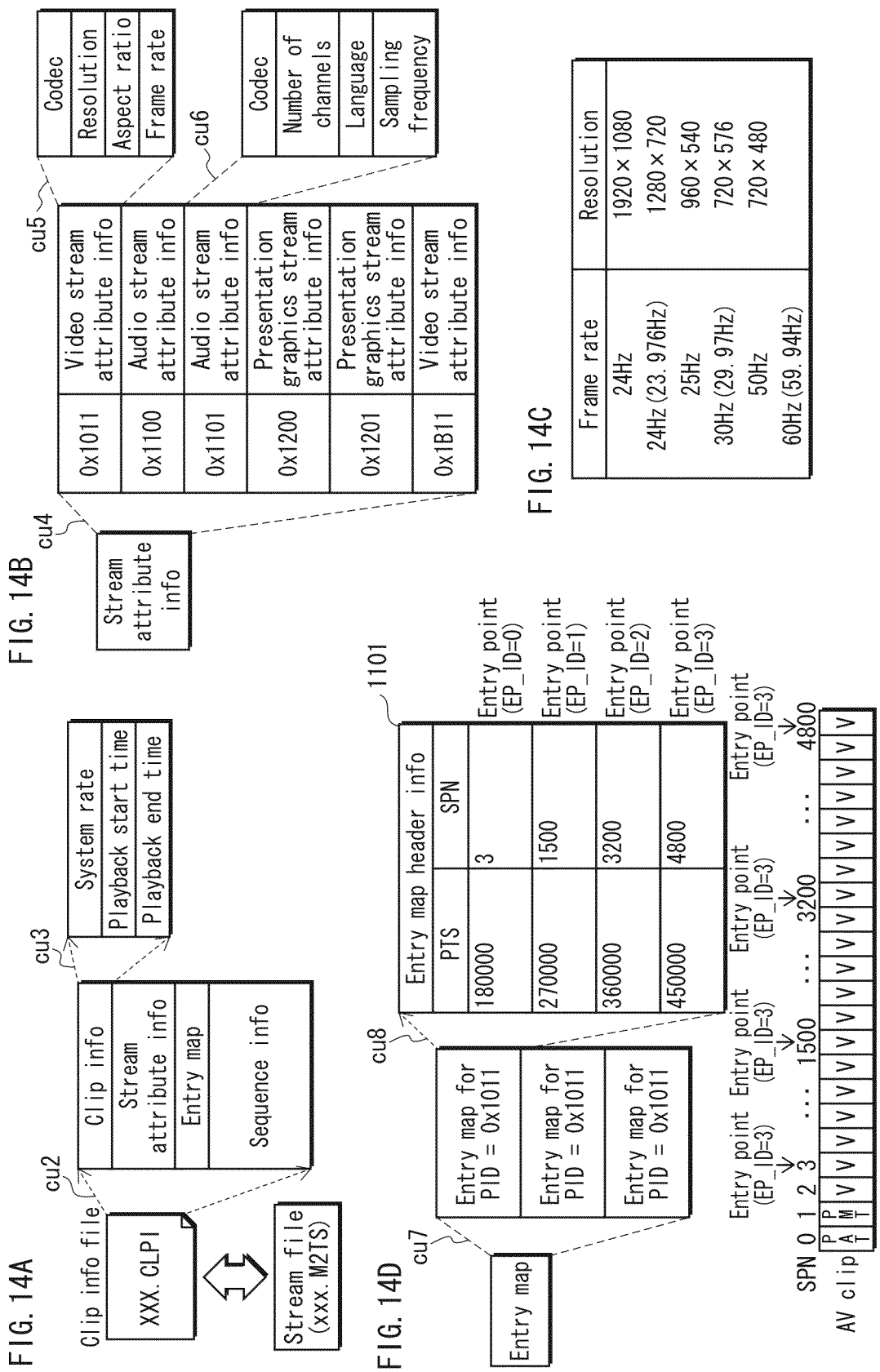

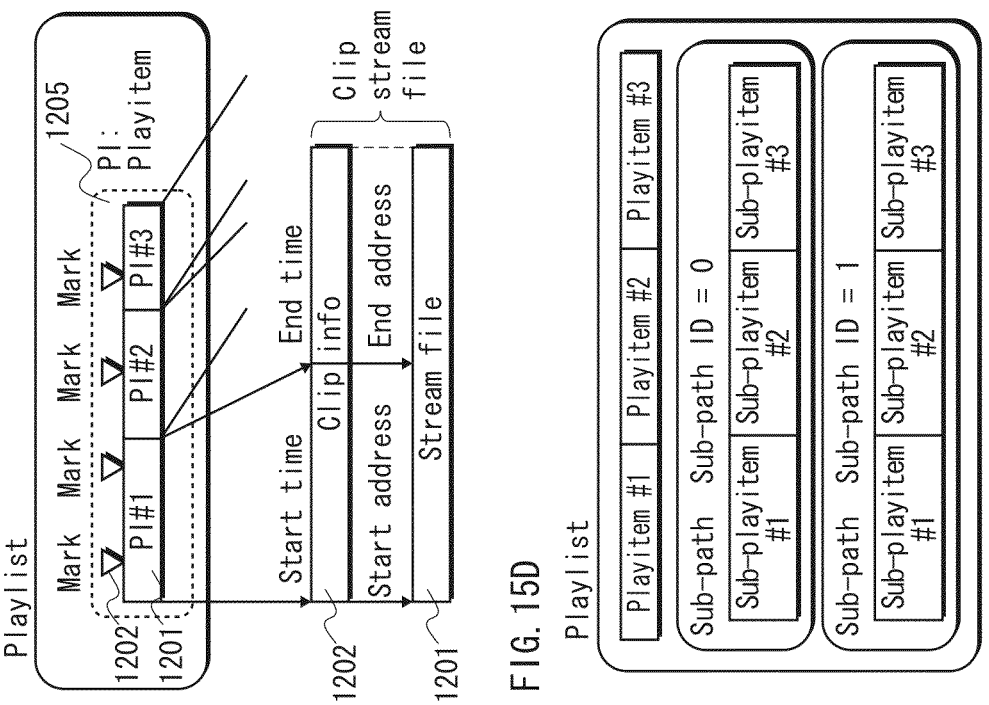
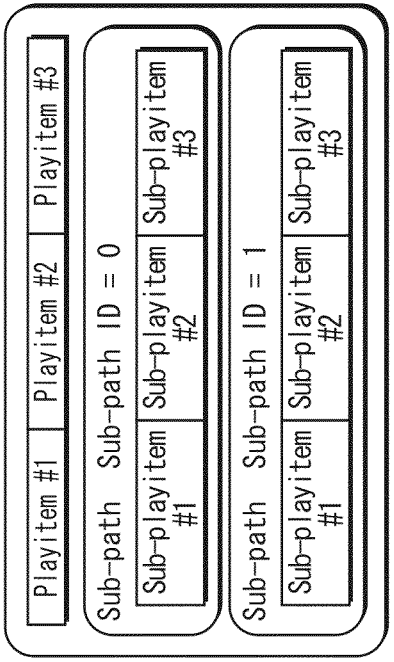
FIG. 15B
FIG. 15D
FIG. 15A
FIG. 15C
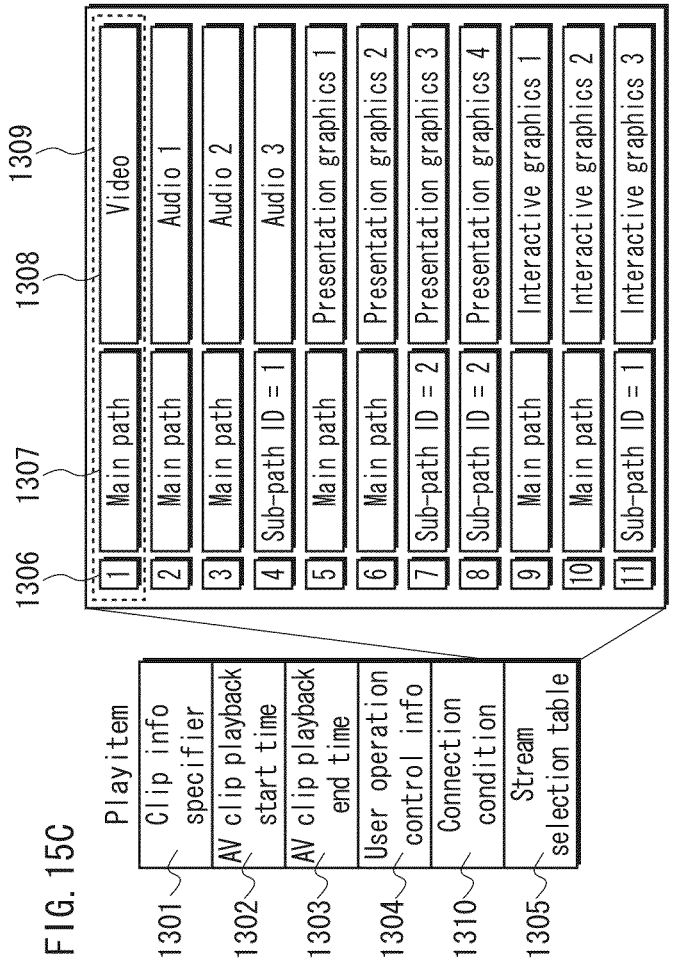
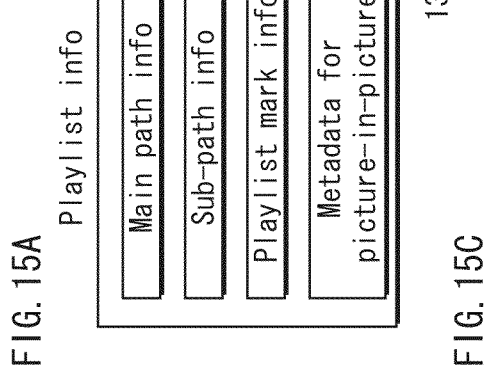

FIG. 27

PSR29:Player Capability for Video
The PSR29 register represents the Video capability of
the Player.Navigation commands and BD-J application cannot
directly change the value contained in PSR29.

| b31 | b30 | b29 | b28 | b27 | b26 | b25 | b24 |
|-----|-----|-----|-----|-----|-----|-----|-----|
| reserved | | | | | | | |

| b23 | b22 | b21 | b20 | b19 | b18 | b17 | b16 |
|-----|-----|-----|-----|-----|-----|-----|-----|
| reserved | | | | | | | |

| b15 | b14 | b13 | b12 | b11 | b10 | b9 | b8 |
|-----|-----|-----|-----|-----|-----|-----|-----|
| reserved | | | | | | | |

| b7 | b6 | b5 | b4 | b3 | b2 | b1 | b0 |
|----|----|----|----|----|----|----|----|
| reserved | | | | 60P Video Capability | | 50&25Hz Video Capability | HD Secondary Video Capability |

HD Secondary Video
Capability ⋯ 0b:HD Secondary Video incapable
            1b:HD Secondary Video capable 50&25Hz Video
Capability ⋯ 0b:50Hz and 25Hz Video incapable
            1b:50Hz and 25Hz Video capable 60P Video
Capability ⋯ 0b:60P Video incapable
            1b:60P Video capable ns in the country. of progressive pictures and a video stream composed of inter-

RECORDING MEDIUM, PLAYBACK DEVICE, RECORDING DEVICE, PLAYBACK METHOD AND RECORDING METHOD FOR RECORDING PROGRESSIVE PICTURES AT HIGH FRAME RATE

This application is the National Stage of International Application No. PCT/JP2012/005096, filed Aug. 10, 2012, which claims the benefit of U.S. Provisional Application No. 61/521,877, filed Aug. 10, 2011.

TECHNICAL FIELD

The present invention relates to a technical field of video recording.

BACKGROUND ART

In the technical field of video recording, the frame rate and the resolution are widely known as parameters that have a great influence on the quality of video. The frame rate is a parameter that indicates the number of pictures displayed per second. The resolution is represented by the number of vertical pixels and the number of horizontal pixels constituting each of the pictures. For example, the DVD provides an image quality of SD (Standard Definition) corresponding to a resolution of 720×480, and the Blu-ray disc provides an image quality of HD (High Definition) corresponding to a resolution of 1920×1080. As such, high-quality video images can be recorded on the Blu-ray disc.

Citation List

Patent Literature

Patent Literature 1:
Japanese Patent Application Publication No. 2010-232885

SUMMARY OF INVENTION

Technical Problem

Meanwhile, there are two types of video streams that can be recorded with a conventional application layer format of the recording medium: a video stream composed of progressive pictures; and a video stream composed of interlace pictures. For the video stream composed of progressive pictures, 24 Hz (≈23.976 (=24000/100001) Hz) is defined as the mandatory frame rate in the standard. The video stream that is composed of progressive pictures and whose frame rate is 24 Hz is called a "24P" video stream" (accurately speaking, it is 23.976P, but it is called 24P in general). Other known frame rates that can be applied to the video stream composed of progressive pictures include 24 Hz and 25 Hz.

On the other hand, a representative of the video stream composed of interlace pictures is a video stream composed of 60 Hz interlace pictures (60i video stream). The 60i video stream is a video stream that is composed of interlace pictures and whose frame rate is 29.97 (30000/100001) Hz. When 29.97 Hz is converted into the field picture, the number of pictures per second is approximately 60.

The progressive pictures and the interlace pictures are respectively restricted to the above-mentioned frame rates for the following reasons. That is to say, in the movie industry, movies are generally shot by the progressive method at the above frame rate, and many movies are saved in the form of films. On the other hand, in the broadcast industry, a large number of videos for TV broadcast are created and broadcast in 60i. Because it is assumed that the shot videos are used in movies or broadcast programs, the shooting equipment cannot process a video material whose frame rate exceeds the above frame rate. However, when a fast-moving image is shot at a low frame rate, such as 24 Hz, 23.976 (24000/100001) Hz, or 25 Hz, the movement of the image is jumpy and appears unnatural. This provides insufficient video quality. Even in the interlace pictures shot in 60i, the lines in a slanted direction are deformed and the image deterioration is noticeable.

Here, one may consider using the coding of multi-viewpoint images disclosed in Patent Literature 1 to obtain progressive pictures having a high frame rate. However, when considering a case of recording a video stream, of a movie or the like, composed of the progressive pictures at a high frame rate onto recording media and distributing them, a problem of compatibility with player devices that have already been in market and spread to the homes cannot be avoided. For a general playback device, progressive pictures having a frame rate exceeding the mandatory frame rate are out of expectation. When progressive pictures having a frame rate are entered into a playback device which does not support playback at such a high frame rate, the video decoder may take a heavy load and the video may not be played back at all, or, if played back, it may display an inappropriate video with some pictures missing. This may embarrass the viewers. Due to the fear that it may cause such an embarrassment among the viewers, there are many who consider that a progressive video with such a high frame rate should not be introduced into the movie production. However, this presents a problem that realization of the video with a high frame is prevented by such a cautious opinion.

The following should be noted here. That is to say, in the above description, the technical problems are explained on the presumption that the frame rate is 60i or 24P. However, these frame rates were selected just because they are familiar and convenient for explaining the technical problems. The technical problems of the present application are not limited to the above-described frame rates. The technical problems that the present application is intended to solve cover a broad range of failures that may occur when a certain restriction is imposed on the frame rate, resolution, or encoding method, and are technical barriers that one having ordinary skill in the art is to face when he/she intends to put the above technology into practical use in the field of industrial products.

It is therefore an object of the present invention to minimize an influence of a phenomenon that a video stream composed of a plurality of progressive pictures and having a high frame rate imposes a heavy load onto a video decoder of an existing-type playback device, and prevent the influence from developing into a product quality problem.

Solution to Problem

The above object is fulfilled by a recording medium on which are recorded: an index table; a plurality of digital streams respectively including a plurality of video streams; a plurality of pieces of playlist information respectively defining a plurality of playback paths of the plurality of video streams; and a plurality of control programs, wherein the plurality of video streams include a video stream composed of progressive pictures and a video stream composed of interlace pictures, and the video stream composed of the progressive pictures has a mandatory rate or an optional rate, the mandatory rate is a frame rate at which a playback device of any version can decode and play back the progressive pictures, and the optional rate is a frame rate at which a playback device of a predetermined version can decode and play back the progressive pictures, each of the plurality of control programs instructs a playback device to play back one of the plurality of video streams in accordance with one of the plurality of playback paths defined in the plurality of pieces of playlist information, the index table indicates one-to-one correspondence between a plurality of titles and the plurality of control programs, the plurality of titles including a first play title and a top menu title, and among the plurality of control programs, control programs corresponding to the first play title and the top menu title exclude a progressive-optional-rate playback path from a playback target, the progressive-optional-rate playback path being a playback path for playing back the progressive pictures in the video stream at the optional rate.

Advantageous Effects of Invention

With the above structure, control programs that are made to correspond to the core of the playback control exclude, from a playback target, a playback path that specifies a playback of the progressive pictures in the video stream at the optional frame rate. Thus even when the above recording medium is loaded in a playback device not supporting playback of the progressive pictures at a frame rate higher than the mandatory frame rate, or even when the user calls a menu, a video stream composed of progressive pictures and having a high frame rate is not entered into a video decoder of an old-type playback device. This prevents the screen from blacking out upon loading of a recording medium, or blacking out upon input of a menu call.

With the above-described structure, when a recording medium is loaded or a menu call is input, a state where "something is displayed on the screen" is ensured. With such an arrangement, the worst case scenario that the playback device blacks out can be avoided. This gives a minimum sense of assurance to the manufacturer of the device. As a result, the structure of the present invention minimalizes an influence of a phenomenon that a video stream composed of a plurality of progressive pictures and having a high frame rate imposes a heavy load onto a video decoder of an existing-type playback device, and prevents the influence from developing into a product quality problem.

With such ensurance of the playback, the present invention strongly encourages the movie producers and manufacturers, who are both nervous about the quality problems, to produce movies at high frame rates and develop the application products. When, encouraged as such, more playback devices of lower prices and varieties are produced, a more varieties of high-frame-rate contents will be provided. This will powerfully lead the development of the content-related industry.

When the above recording medium is sold at retail stores or provided as a rental product in rental shops, users can enjoy watching a movie at home with a quality not lower than a quality at a movie theater. This will stimulate development and activity in the movie industry including the retail stores and rental shops. The sensation that is experienced when one watches a movie at a movie theater can be tasted at home. As such, the recording medium makes a tremendous contribution to the society also in the aspect of cultural promotion. Furthermore, its high quality increases the value of the movie as a recorded material when it is recorded in the archive, and it can be left to posterity as a historical asset. Also, when the recording medium is adopted as a medium of a home video camera, it is possible to preserve the growth of children and family memorial events in high-quality videos. This makes it possible for the users to view the preserved videos later and indulge in fond memories.

BRIEF DESCRIPTION OF DRAWINGS

FIGS. 6A-6D illustrate the structure of the top menu.

FIGS. 11A and 11B illustrate typical three types of video streams.

FIGS. 13A-13D illustrate the transport stream formation process.

FIGS. 14A-14D illustrate the internal structure of the clip information file.

FIGS. 15A-15D illustrate one example of the internal structure of the playlist information.

FIG. 27 illustrates a bit assignment in PSR29.

DESCRIPTION OF EMBODIMENTS

Figure 1:
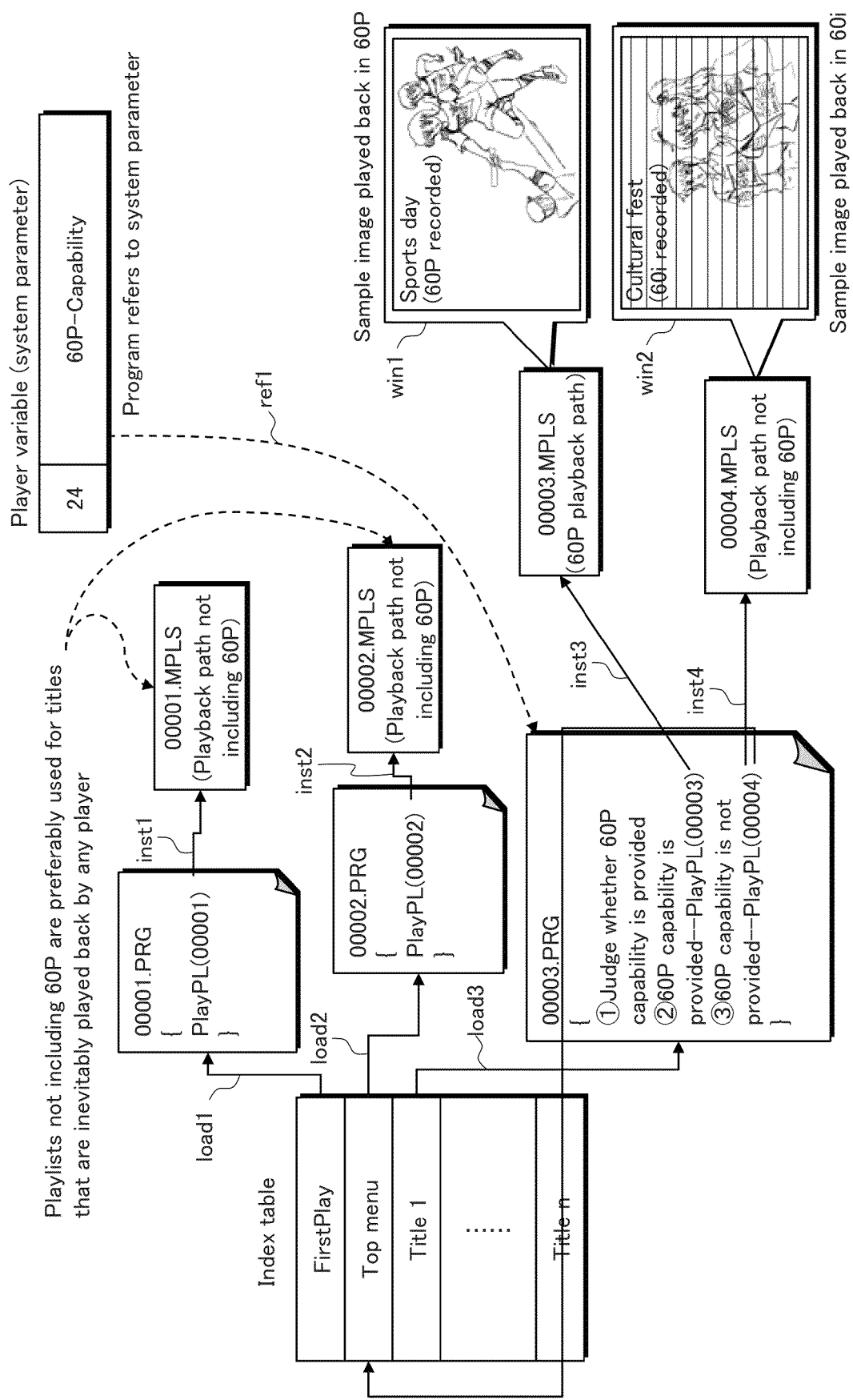
FIG. 1 schematically illustrates the contents of the index table and the control program of Embodiment 1.

The following describes embodiments of the recording device, playback device, recording device, playback method, and recording method encompassed by the present application, with reference to the attached drawings.

Embodiment 1

Embodiment 1 is intended to solve the following problem (problem 1) that one having ordinary skill in the art is to face when he/she intends to realize playback of progressive pictures at the frame rate of 60 Hz, which is a video attribute of the optional frame rate.

Problem 1: With the progress of the imaging elements and improvement in processing capability of the video processing LSI in recent years, shooting progressive pictures at a frame rate higher than 24 Hz, 23.976 (24000/100001) Hz or 25 Hz is becoming reality.

However, when considering a case of recording a video stream, of a movie or the like, composed of the progressive pictures at a high frame rate onto recording media and distributing them, it is necessary to address the problem of compatibility with player devices that have already been in market and spread to the homes.

Here, the following considers a case where a recording medium is loaded in an existing-type playback device, wherein a video stream composed of progressive pictures and having a high frame rate is recorded on the recording medium. In that case, upon the loading, a program executed first from a first play title may instruct to play back progressive pictures at a high frame rate. Also, a user operation on a remote control may cause a command "return to top menu title" to be executed, which instructs to play back progressive pictures at a high frame rate.

When instructed to play back progressive pictures at a high frame rate, a video decoder embedded in the existing-type playback device takes a heavy decoding load, and the screen of the display device blacks out. When this happens, the viewer of the existing-type playback device cannot view even a playlist that is the starting point of the playback, such as the first play title or the top menu title, appropriately.

For example, a 60P video stream is known as a video stream composed of progressive pictures and having a high frame rate that is treated as an optional frame rate. The 60P video stream is a video stream composed of progressive pictures of 1920×1080 resolution and having a frame rate of 60 Hz. More specifically, the 60P video stream having an optional frame rate displays 60 pictures per second, which is more than double the 24P video stream in GOP data scale, thus generating an overscale of GOP. The number of pictures displaced per second being 60 requires the decode timing, which is defined by the decode time stamp (DTS) and the playback timing, which is defined by the presentation time stamp (PTS), to be set precisely by accurate time intervals. In addition to this, the entry map points to the data entries with intervals of double precision.

When GOPs of such an overscale are entered into an existing type of playback device that satisfies merely the bare minimum of the specifications of the Blu-ray Recording, Blu-ray REwritable and Blu-ray ReadOnly discs, the playback device, unable to maintain the playback timing for displaying 60 pictures per second, may black out.

If the screen blacked out upon loading of a recording medium in a popular, existing type of playback device, that would be a manufacturer's nightmare, forcing the manufacturer to field a deluge of complaints.

When a 60p video recorded on the Blu-ray ReadOnly, Blu-ray Recording or Blu-ray REwritable disc is played back by an existing player device not supporting the 60P video stream, there is a possibility that the video may be displayed inappropriately, the viewer's health may be strained, or the player device may take a heavy load and may operate abnormally. Accordingly, it is necessary to provide a mechanism for preventing an inappropriate playback of video.

It is therefore an object of the present embodiment to exclude a possibility that a non-60P-supporting playback device may take a heavy load by making an attempt to play back a 60P video stream.

(Solution 1 to Problem 1)

In the case where the above problem is solved in the phase of implementing a recording medium, the recording medium in this phase is a recording medium on which are recorded: an index table; a plurality of digital streams respectively including a plurality of video streams; a plurality of pieces of playlist information respectively defining a plurality of playback paths of the plurality of video streams; and a plurality of control programs, wherein the plurality of video streams include a video stream composed of progressive pictures and a video stream composed of interlace pictures, and the video stream composed of the progressive pictures has a mandatory rate or an optional rate, the mandatory rate is a frame rate at which a playback device of any version can decode and play back the progressive pictures, and the optional rate is a frame rate at which a playback device of a predetermined version can decode and play back the progressive pictures, each of the plurality of control programs instructs a playback device to play back one of the plurality of video streams in accordance with one of the plurality of playback paths defined in the plurality of pieces of playlist information, the index table indicates one-to-one correspondence between a plurality of titles and the plurality of control programs, the plurality of titles including a first play title and a top menu title, and among the plurality of control programs, control programs corresponding to the first play title and the top menu title exclude a progressive-optional-rate playback path from a playback target, the progressive-optional-rate playback path being a playback path for playing back the progressive pictures in the video stream at the optional rate. Solving the problem with the above improvement of the structural elements is an aspect of solution to the problem in this phase.

In the case where the above problem is solved in the phase of implementing a playback device, it is desirable to adapt the problem solving means to the phase by imposing a limitation of a playback device comprising: a reading unit configured to read an index table from a recording medium; a current number register storing a current title number which is a title number of a current title; an execution unit configured to execute a control program which is indicated in the index table as corresponding to the current title; and a playback unit configured to play back a video stream selected from a plurality of video streams as instructed by the execution unit, in accordance with one of a plurality of playback paths defined in playlist information, wherein the plurality of video streams include a video stream composed of progressive pictures and a video stream composed of interlace pictures, and the video stream composed of the progressive pictures has a mandatory rate or an optional rate, the mandatory rate is a frame rate at which a playback device of any version can decode and play back the progressive pictures, and the optional rate is a frame rate at which a playback device of a predetermined version can decode and play back the progressive pictures, the control program instructs the playback device to play back one of the plurality of video streams in accordance with one of a plurality of playback paths defined in a plurality of pieces of playlist information, the index table indicates one-to-one correspondence between a plurality of titles and the plurality of control programs, the plurality of titles including a first play title and a top menu title, and among the plurality of control programs, control programs corresponding to the first play title and the top menu title exclude a progressive-optional-rate playback path from a playback target, the progressive-optional-rate playback path being a playback path for playing back the progressive pictures in the video stream at the optional rate.

In the case where the above problem is solved in the phase of implementing a recording device, it is desirable to adapt the problem solving means to the phase by imposing a limitation of a recording device comprising: an encoder configured to obtain a plurality of digital streams respectively including a plurality of video streams by performing an encoding process; a generating unit configured to generate a plurality of pieces of playlist information corresponding to the plurality of digital streams, a plurality of control programs, and an index table; and a writing unit configured to write the plurality of digital streams, the plurality of pieces of playlist information, the plurality of control programs, and the index table onto a recording medium, wherein the plurality of video streams include a video stream composed of progressive pictures and a video stream composed of interlace pictures, and the video stream composed of the progressive pictures has a mandatory rate or an optional rate, the mandatory rate is a frame rate at which a playback device of any version can decode and play back the progressive pictures, and the optional rate is a frame rate at which a playback device of a predetermined version can decode and play back the progressive pictures, each of a plurality of control programs instructs the playback device to play back one of the plurality of video streams in accordance with one of the plurality of playback paths defined in the plurality of pieces of playlist information, the index table indicates one-to-one correspondence between a plurality of titles and the plurality of control programs, the plurality of titles including a first play title and a top menu title, and among the plurality of control programs, control programs corresponding to the first play title and the top menu title exclude a progressive-optional-rate playback path from a playback target, the progressive-optional-rate playback path being a playback path for playing back the progressive pictures in the video stream at the optional rate.

In the case where the above problem is solved in the phase of implementing a playback method, it is desirable to adapt the problem solving means to the phase by imposing a limitation of a playback method comprising: reading an index table from a recording medium; executing a control program which is indicated in the index table as corresponding to a current title whose title number is stored in a current number register as a current title number; and playing back a video stream selected from a plurality of video streams as instructed by the execution unit, in accordance with one of a plurality of playback paths defined in playlist information, wherein the plurality of video streams include a video stream composed of progressive pictures and a video stream composed of interlace pictures, and the video stream composed of the progressive pictures has a mandatory rate or an optional rate, the mandatory rate is a frame rate at which a playback device of any version can decode and play back the progressive pictures, and the optional rate is a frame rate at which a playback device of a predetermined version can decode and play back the progressive pictures, the control program instructs the playback device to play back one of the plurality of video streams in accordance with one of a plurality of playback paths defined in a plurality of pieces of playlist information, the index table indicates one-to-one correspondence between a plurality of titles and the plurality of control programs, the plurality of titles including a first play title and a top menu title, and among the plurality of control programs, control programs corresponding to the first play title and the top menu title exclude a progressive-optional-rate playback path from a playback target, the progressive-optional-rate playback path being a playback path for playing back the progressive pictures in the video stream at the optional rate.

In the case where the above problem is solved in the phase of implementing a recording method, the recording method in this phase is a recording method comprising: encoding to obtain a plurality of digital streams; generating a plurality of pieces of playlist information corresponding to the plurality of digital streams, a plurality of control programs, and an index table; and writing the plurality of digital streams, the plurality of pieces of playlist information, the plurality of control programs, and the index table onto a recording medium, wherein the plurality of video streams include a video stream composed of progressive pictures and a video stream composed of interlace pictures, and the video stream composed of the progressive pictures has a mandatory rate or an optional rate, the mandatory rate is a frame rate at which a playback device of any version can decode and play back the progressive pictures, and the optional rate is a frame rate at which a playback device of a predetermined version can decode and play back the progressive pictures, each of a plurality of control programs instructs the playback device to play back one of the plurality of video streams in accordance with one of the plurality of playback paths defined in the plurality of pieces of playlist information, the index table indicates one-to-one correspondence between a plurality of titles and the plurality of control programs, the plurality of titles including a first play title and a top menu title, and among the plurality of control programs, control programs corresponding to the first play title and the top menu title exclude a progressive-optional-rate playback path from a playback target, the progressive-optional-rate playback path being a playback path for playing back the progressive pictures in the video stream at the optional rate.

Here, the "mandatory frame rate (mandatory rate)" is a frame rate at which a playback device of any version can perform decoding and playback. For example, the version upgrade of the Blu-ray ReadOnly disc application standard has been performed repeatedly since the issuance of the first version (the logical format of the Blu-ray ReadOnly disc includes ROM2 and ROM3, the oldest one being ROM2 established in early May, 2006), and decoding and playback of the 24P video stream and 60i video stream are possible in all of the versions. Accordingly, 24 Hz of the 24P video stream and 60 Hz of the 60i video stream are mandatory rates in the Blu-ray ReadOnly disc application standard.

The "optional frame rate (optional rate)" is a frame rate at which a limited versions of playback devices can perform decoding and playback. Currently, decoding and playback of a 60P video stream at 60 Hz are not available with current Blu-ray ReadOnly discs, but will be allowed when the standard is revised in the near future. Accordingly, 60 Hz of the 60P video stream corresponds to the optional rate in the Blu-ray ReadOnly disc application standard.

FIG. 1 illustrates a data structure improved for solving the above-described problem. FIG. 1 schematically illustrates the contents of the index table and the control program of Embodiment 1.

The following describes the problem solving process performed by the above problem solving means. A specific example is used here for the explanation. That is to say, it is supposed that a content of sports involving fast-moving subjects and a content involving slow-moving subjects are encoded and recorded on the same recording medium. Specific examples of such images are shown in FIG. 1. Note that, in the following, the examples provided in FIG. 1 are used in the explanation of the contents of the recording medium, unless it is explicitly stated otherwise.

FIG. 1 indicates that one digital stream including a video stream composed of progressive pictures of an optional frame rate (60P video stream) and three digital streams including non-60P video streams are present, and that the four digital streams are referred to by four pieces of playlist information "00001.MPLS"-"00004.MPLS". Note that the non-60P video stream is a 24P video stream or a 60i video stream, wherein the 24P video stream is composed of progressive pictures and its frame rate is 24 Hz, and the 60i video stream is composed of interlace pictures and its frame rate is 60 Hz.

In the present Description, the 60i video stream is used as one example of the non-60P video stream. However, it is considered that, in the actuality, the 24P video stream is generally used as the non-60P video stream. This is because the 24P video stream is the same as the 60P video stream except for the frame rate, and is similar to the 60P video stream in image quality when the shooting subjects move slowly.

It is also presumed that there are three control programs "00001.PRG"-"00003.PRG" and the control programs are made to correspond to the title numbers of the first play title, top menu title, and title 1 in the index table, respectively. Among the four pieces of playlist information, the first, second and fourth pieces of playlist information (00001.MPLS, 00002.MPLS, 00004.MPLS) are playback paths having the non-60P video attribute, and the third piece of playlist information (00003.MPLS) is a playback path having the 60P video attribute.

The left-hand side of FIG. 1 illustrates the index table that includes indexes corresponding to the first play title, top menu title, and title 1. The arrows "load1", "load2" and "load3" schematically illustrate loading of control programs based on the corresponding indexes in the index table. The arrows "inst1", "inst2", "inst3" and "inst4" schematically illustrate playlist playback instructions issued by the control programs. The frames "win1" and "win2" indi indicates a closeup of the internal structure of the stream information.

The following describes the index table. The index table defines the correspondence between a plurality of title numbers that can be stored in the title number register provided in the playback device and program files that define the operation modes. It should be noted here that the title numbers that can be stored in the title number register include "0", "1"-"999", and an undefined value "0xFFFF". A title number "0" is a title number of the top menu title.

The top menu is a menu of the highest rank in the hierarchy of menus in the recording medium, and is a menu at the core of the structure where titles transition among each other. The top menu title is a title that can be called by a menu call operation performed by the user. The title number by the undefined value "0xFFFF" is a title number of the first play title. The first play title is a title that displays a warning to the viewer, a logo of the content provider and so on immediately after the recording medium is loaded. The index table includes entries (title indexes) in one-to-one correspondence with title numbers. A program file is described in each title index, each program file defining an operation mode. With this structure, the index table defines in detail how each title operates in a corresponding operation mode.

A description of the digital stream is given here. The digital stream is variable-length data composed of a series of fixed-size packets. The digital stream does not need to be resident in memory, but is partially read from the recording medium to the memory as necessary. The AV stream is a digital stream that contains at least video and audio.

The following explains the playlist information. The playlist information includes one or more pieces of playitem information, and defines a playback path composed of one or more playback sections. The playback section is a closed section defined by a pair of "In_Time" and "Out_Time" of the playitem information based on the playback time axis of the stream file that is paired with clip information specified by the playitem information. The playback path defined by the playlist information is an access route of the digital stream defined by interpreting the arrangement order of a plurality of pieces of playitem information in one piece of playlist information as the order of the playback path.

As illustrated in FIG. 1, the program 00001.PRG corresponding to the first play title includes a command "PlayPL(00001)" that instructs a playback of progressive pictures or interlace pictures at the frame rate of 24 Hz. The program 00002.PRG corresponding to the top menu title includes a command "PlayPL(00002)" that instructs a playback of progressive pictures or interlace pictures at the frame rate of 24 Hz. In this way, the control programs (00001.PRG and 00002.PRG) referred to by the first play title and the top menu title refer to playback paths (00001.MPLS and 00002.MPLS) that do not include the 60P video attribute. With the above structure of the index table, when a viewer plays back the recording medium with a player device that does not support 60P, the viewer can play back at least (i) the playback path (00001.MPLS) referred to by the first play title and (ii) the playback path (00002.MPLS) referred to by the top menu title.

According to the present embodiment, a video shot in 60P to be played back as the first play title or the top menu title is converted into a 24P video stream or a 60i video stream, wherein the 24P video stream is composed of progressive pictures and its frame rate is 24 Hz, and the 60i video stream is composed of interlace pictures and its frame rate is 60 Hz, and then digital streams including such video streams are recorded on a recording medium. Thus when the recording medium is loaded in a non-60P-supporting playback device, playback of the first play title and the top menu title is ensured. With such minimum ensurance of the playback, the present embodiment strongly encourages the movie producers and manufacturers, who are both nervous about the quality problems, to produce movies at high frame rates and develop the application products. When, encouraged as such, more playback devices of lower prices and varieties are produced, a more varieties of high-frame-rate contents will be provided. This will powerfully lead the development of the content-related industry.

Embodiment 2

The present embodiment is intended to supplement Embodiment 1 technically in solving the problem 1. More specifically, the present embodiment is intended to solve the following problem 2.

Problem 2: when a non-60P-supporting playback device attempts to play back a title which is other than the first play title or the top menu title and includes a 60P video stream, the title is not played back at all, or played back with frame dropping, namely, it is not possible to play back progressive pictures at the frame rate of 24 Hz or interlace pictures by using non-6-P playback paths to come up with qualities that viewers hope for.

It is therefore an object of the present embodiment to satisfy the expectations held by the viewers for the 60P video stream.

(Solution 1 to Problem 2)

The above-described problem solving means is improved as follows to solve the problem 2.

In the case where the above problem is solved in the phase of implementing a recording medium, in the recording medium in this phase, among the plurality of control programs, one or more control programs, which respectively correspond to one or more general titles that include neither the first play title nor the top menu title, instruct the playback device to play back the video stream composed of the progressive pictures at the optional rate, on a condition that the playback device has a capability to process the video stream composed of the progressive pictures at the optional rate. Solving the problem with the above improvement of the structural elements is an aspect of solution to the problem in this phase.

In the case where the above problem is solved in the phase of implementing a playback device, it is desirable to adapt the problem solving means to the phase by imposing a limitation of the playback device in which, among the plurality of control programs, one or more control programs, which respectively correspond to one or more general titles that include neither the first play title nor the top menu title, instruct the playback device to play back the video stream composed of the progressive pictures at the optional rate, on a condition that the playback device has a capability to process the video stream composed of the progressive pictures at the optional rate, the playback device further comprising: a player setting register indicating one or more capabilities of the playback device; and a title management unit configured to, when the player setting register indicates that the playback device has a capability to process the progressive-optional-rate playback path, set a title number of a title corresponding to the progressive-optional-rate playback path into the title number register in accordance with the control program executed by the execution unit.

In the case where the above problem is solved in the phase of implementing a recording device, it is desirable to adapt the problem solving means to the phase by imposing a limitation of the recording device in which the index table is generated to make one or more general titles that include neither the first play title nor the top menu title among the plurality of titles to correspond to one or more control programs which instruct the playback device to play back the video stream composed of the progressive pictures at the optional rate, on a condition that the playback device has a capability to process the video stream composed of the progressive pictures at the optional rate, and then the index table is written on the recording medium.

In the above structure, the following lower concepts of the control program are provided. As one lower concept, the control program is an object program in a command-interpreter-based operation mode, and includes one or more navigation commands. In that case, a playback in accordance with a playback path defined in the playlist information may be performed by a playlist playback command that is one of the navigation commands.

As another lower concept, the control program is a bytecode application (BD-J application) in a bytecode-interpreter-based operation mode, and includes one or more bytecodes. In that case, a playback in accordance with a playback path defined in the playlist information may be performed by a call of an application interface instructing to generate a player instance, and in generating the player instance, a playlist information file may be specified by a locator.

With this lower concept of the control program, it is possible to use a bytecode that corresponds to the conditional branch command or the if statement structure written in an object-oriented programming language to set a condition for playing back a playlist having the 60P video attribute. This makes it possible to play back a 60P playlist only when the playback device has the capability to play back the 60P playlist. In this way, the above two aspects of control programs can be adopted. In the following description, however, the former, namely the object program (called a "movie object") in a command-interpreter-based operation mode is adopted for the sake of simple explanation.

The following describes the problem solving process performed by the problem solving means having the above improvement with reference to FIG. 1.

The "60P-Capability" illustrated in the upper-right portion of FIG. 1 represents the content of the system parameter (player variable) in the playback device. The 60P capability includes: a decode capability of being capable to decode a plurality of access units constituting the GOPs included in a 60P video stream at regular intervals of $1/60$ seconds; and a presentation capability of being capable to write 1920×1080 pixels constituting a decompressed picture obtained by the decoding into a video plane at regular intervals of $1/60$ seconds for use in an overlay with graphics. In terms of the speed performance, the decode capability and the presentation capability are required to be able to decode each picture at regular intervals of $1/60$ seconds and to write each decompressed picture obtained by the decoding into the video plane at regular intervals of $1/60$ seconds, respectively.

Conversely, with regard to the decode capability of the video decoder, if the video decoder cannot decode or play back pictures at regular intervals of $1/60$ seconds, it can be said that the video decoder does not have the 60P capability.

Users or content producers cannot judge whether a playback device has a capability to play back 60P video streams. Only the manufacturer of the playback device can determine whether to provide the playback device with the capability to play back 60P video streams. When the hardware specification of the playback device satisfies the above-stated conditions of memory size, decode capability and presentation capability, the manufacturer of the playback device sets the 60P capability of the playback device as "provided". Conversely, when the hardware specification of the playback device does not satisfy the conditions of memory size, decode capability and presentation capability, the manufacturer of the playback device sets the 60P capability of the playback device as "not provided". A dotted-line arrow ref1 in FIG. 1 schematically indicates that the program 00003.PRG refers to the player variable (system parameter) in the player device.

The following explains how the control program judges whether or not a playlist is a 60P playlist. The content producer knows well which playlists are 60P playlists. Accordingly, with regard to a playlist created by the content producer, a control program created by the content producer can judge accurately whether or not the playlist is a 60P playlist. On the other hand, with regard to a playlist created by another content producer, the control program checks on whether or not the playlist is a 60P playlist by checking on whether or not the version number of the playlist information indicates a predetermined version or later (the reason for this is described below). Also, since a bytecode application (BD-J application) is merely a program, it can judge whether or not a playlist to be played back is a 60P playlist by referring to details of the clip information file in the playlist.

That is to say, the bytecode application can judge whether or not a playlist to be played back is a 60P playlist only by referring to the stream attribute in the clip information referred to by clip_information_file_name of the playitem information included in the playlist information. It is possible to judge whether or not a playlist to be played back is a 60P playlist by judging whether or not the stream attribute information of the clip information referred to by clip_information_file_name of any playitem information.

In FIG. 1, control program 00003.PRG corresponding to title 1 includes: (1) judging whether or not the playback device has the 60P capability; (2) instructing to play back progressive pictures at the frame rate of 60 Hz when the 60P capability is provided—PlayPL(00003); and (3) instructing to play back progressive pictures at the frame rate of 24 Hz or play back interlace pictures according to a non-60P playback path when the 60P capability is not provided—PlayPL (00004). As indicated by the above (1), (2) and (3), control program 00003.PRG corresponding to title 1 instructs to play back progressive pictures at 60 Hz based on a predetermined condition. This suggests that playing back progressive pictures at 60 Hz is made limited. Another variation of the solution to the problem is illustrated in FIG. 2.

Figure 2:
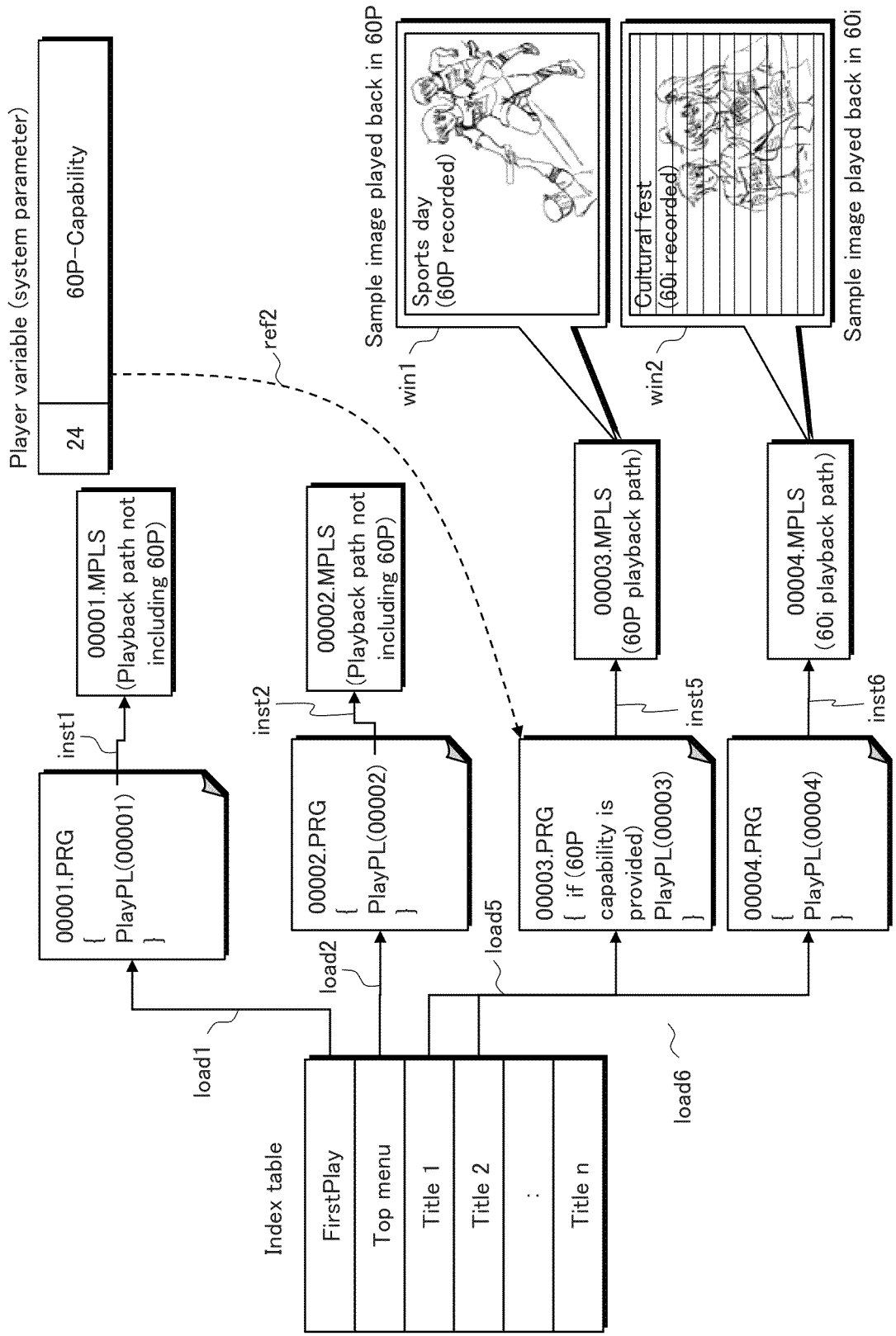
FIG. 2 illustrates a data structure in which a plurality of titles are made to correspond to playback paths having the non-60P video attribute and playback paths having the 60P video attribute.

FIG. 2 illustrates a data structure in which a plurality of titles are made to correspond to playback paths having the non-60P video attribute and playback paths having the 60P video attribute. The structure of FIG. 2 differs from the structure of FIG. 1 in that there are four titles and four control programs, and titles 1 and 2 are made to correspond to 00003.PRG and 00004.PRG, respectively. The arrows load5 and load6 in FIG. 2 indicate that 00003.PRG and 00004.PRG are loaded when titles 1 and 2 are selected, respectively. The structure of FIG. 2 also differs from the structure of FIG. 1 in that each of the programs instructs to play back pictures according to a playback path having the 60P attribute or a playback path having the non-60P attribute. The reference sign ref2 indicates referencing of information that indicates whether or not the playback device has the 60P capability. The control program 00003.PRG judges whether or not the playback device can play back a 60P video stream by referring to the "60P capability" included in the player variable (system parameter), and when the playback device can play back, starts playing back the progressive pictures at 60 Hz.

As described above, according to the present embodiment, a playback of progressive pictures at the frame rate of 60 Hz, which is an optional frame rate, is performed on a condition that the playback device has the 60P capability, thereby preliminarily preventing a 60P video stream from being entered into a non-60P-supporting playback device at the stage of title selection.

Embodiment 3

The present embodiment discloses a solution to a new problem caused by the title direct search. The title direct search is a function to start playing back a title of a specified title number, without via the top menu title or the like when a viewer directly inputs the title number into the player device by operating a remote control or the like. Regardless of whether the top menu title is present, the control transitions to the title having the input title number, and an attempt is made to play back progressive pictures at 60 Hz. Accordingly, even if the player device used by the viewer does not support 60P, the player device starts playing back the progressive pictures at 60 Hz. When this happens, the above-described problem 2 occurs.

It is therefore an object of the present embodiment to plug up a loophole where a quality may be impaired when the user uses the title direct search.

This loophole can be closed by preventing, at the stage of title selection, the title direct search from being entered to play back a title that involves a playback of a 60P video stream.

In the case where the above problem is solved in the phase of implementing a recording medium, it is desirable to adapt the problem solving means to the phase by imposing a limitation of the recording medium in which the plurality of control programs include a plurality of mask flags, the plurality of mask flags each indicating whether or not a search operation for searching a corresponding title is prohibited, and among the plurality of mask flags, one or more mask flags corresponding to one or more titles that instruct to play back the progressive pictures at the optional rate are set to indicate that search operations for searching the one or more titles are prohibited.

In the case where the above problem is solved in the phase of implementing a playback device, it is desirable to adapt the problem solving means to the phase by imposing a limitation of the playback device further comprising a receiving unit configured to receive a title search request from a user, wherein the plurality of control programs include a plurality of mask flags, the plurality of mask flags each indicating whether or not a search operation for searching a corresponding title is prohibited, among the plurality of mask flags, one or more mask flags corresponding to one or more titles that instruct to play back the progressive pictures at the optional rate are set to indicate that search operations for searching the one or more titles are prohibited, and the execution unit refers to a mask flag of a control program corresponding to a title number for which a title search request has been issued, and when the mask flag indicates that a search operation for searching the title is not prohibited, executes a processing procedure defined in the control program corresponding to the title number for which the title search request has been issued, and when the mask flag indicates that the search operation for searching the title is prohibited, does not execute the processing procedure defined in the control program corresponding to the title number for which the title search request has been issued.

Figure 3:
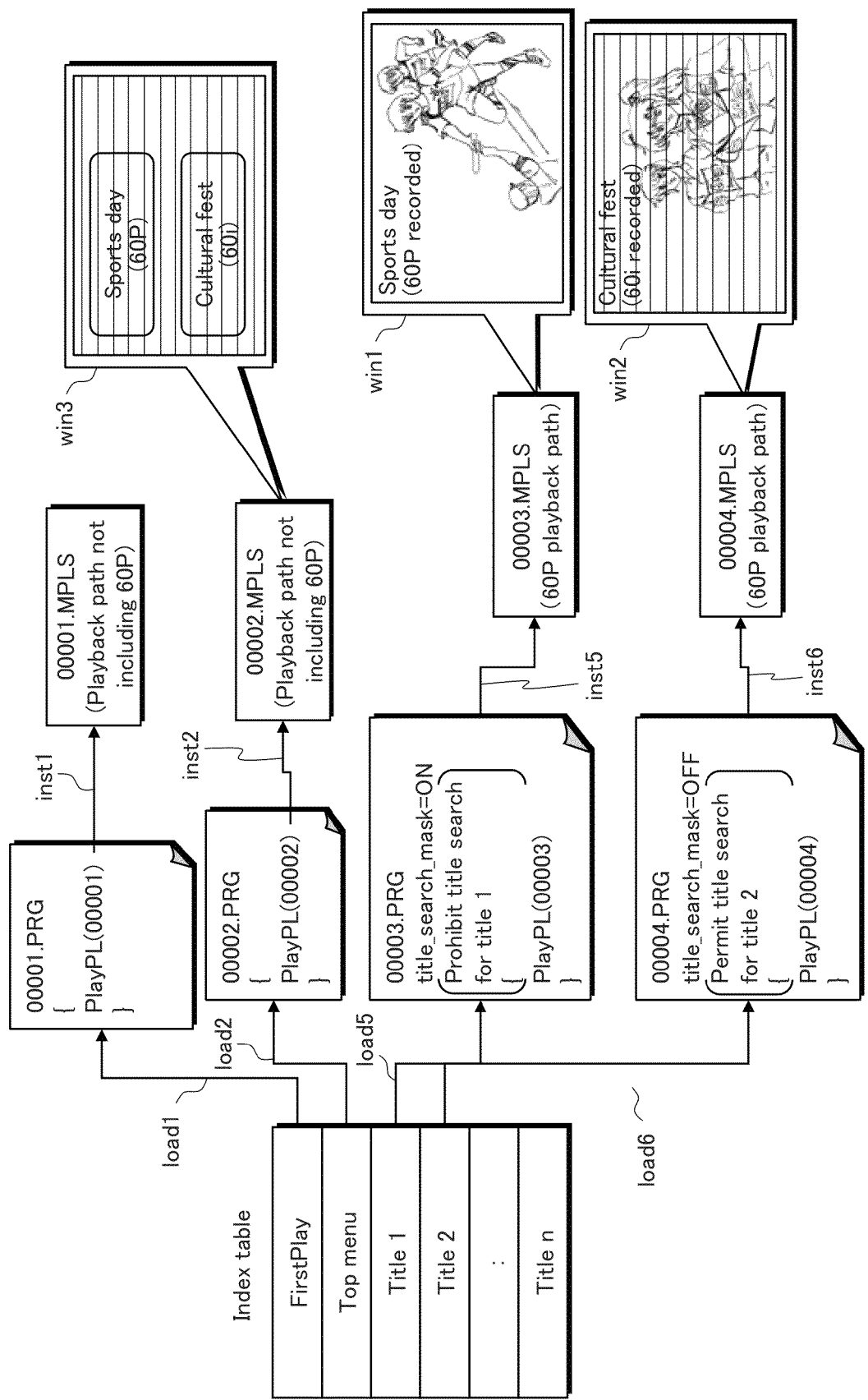
FIG. 3 illustrates the internal structure of the control programs in Embodiment 3.

In the case where the above problem is solved in the phase of implementing a recording device, it is desirable to adapt the problem solving means to the phase by imposing a limitation of the recording device in which, when writing the progressive-optional-rate playback path, which includes a first-attribute playback section defined for a video stream that satisfies a condition of being composed of progressive pictures and having the optional rate, onto the recording medium, when the progressive-optional-rate playback path includes another playback section, a video stream defined by the another playback section is regarded to satisfy the condition, and information indicating presence of the first-attribute playback section is set in a playlist that includes one or more first-attribute playback sections. The above improvement for solving the problem is illustrated in the data structure of FIG. 3. FIG. 3 illustrates the internal structure of the control programs in Embodiment 3.

The structure of FIG. 3 differs from the structure of FIG. 2 in that (1) in control program 00003.PRG for instructing to play back a 60P video stream, a flag for masking a title search (title_search_mask) is set ON to prohibit the title direct search, and (2) in control program 00004.PRG for instructing to play back progressive pictures at the frame rate of 24 Hz or interlace pictures, the flag for masking a title search (title_search_mask) is set OFF to permit the title direct search.

When a plurality of titles registered in the index table include a title that includes a 60P video stream, the title_search_mask flag of the control program corresponding to the title is set ON to prohibit the title search of the title, and the title_search_mask flag of the control program corresponding to a title that does not include a 60P video stream is set OFF to validate the title search of the title. With this structure, the title transition by the title direct search is restricted, thereby making it possible to prevent progressive pictures from starting to be played back at the frame rate of 60 Hz, contrary to the intention, in a player device that does not support the 60P playback.

Here, if it is difficult for the viewers to understand why some titles are prohibited and others are permitted to be searched by the title direct search, the title direct search may be prohibited with regard to all the titles so that a selection of a title can be received only from the top menu. By recording the data, which has a data structure based on an appropriate combination of the above solutions to the problems 1 and 2, onto a disc, it is possible to prevent a player device not supporting 60P from playing back progressive pictures at the frame rate of 60 Hz.

Embodiment 4

The present embodiment explains an improvement to be added to the playlist to solve the problems 1 and 2.

The playback devices available in the market include player devices supporting the 60P playback and player devices not supporting the 60P playback.

It is desirable that a playlist does not include both a playitem specifying a 60P video stream and a playitem specifying a video stream that can be played back in an existing player device and is other than a 60P video stream. The reason for this is as follows. From the standpoint of viewers, it is desirable that even a player device not supporting 60P can playback a playitem specifying a video stream that is other than a 60P video stream and can be played back in an existing player device. However, many manufacturers, who in general advocate the supremacy of the quality, demand a complete prohibition of supply of the 60P video streams to the video decoder. For this reason, when a playlist including a playitem specifying a 60P video stream also includes a playitem specifying a non-60P video stream that can be played back in a player device not supporting 60P, the playlist should be excluded from the target of playback.

It is therefore an object of the present embodiment to exclude a possibility that a 60P video stream is entered into a non-60P-supporting playback device, imposing a heavy load onto the playback device, in circumstances where a playback path of a 60i/24P video stream may also have a 60P video stream.

In the case where the above problem is solved in the phase of implementing a recording medium, the recording medium in this phase is the recording medium in which the progressive-optional-rate playback path includes a first-attribute playback section defined for a video stream that satisfies a condition of being composed of progressive pictures and having the optional rate, and in a case where the progressive-optional-rate playback path includes another playback section, a video stream defined by the another playback section is regarded to satisfy the condition, and information indicating presence of the first-attribute playback section is set in a playlist that includes one or more first-attribute playback sections. Solving the problem with the above improvement of the structural elements is an aspect of solution to the problem in this phase.

In the case where the above problem is solved in the phase of implementing a playback device, it is desirable to adapt the problem solving means to the phase by imposing a limitation of the playback device in which the progressive-optional-rate playback path includes a first-attribute playback section defined for a video stream that satisfies a condition of being composed of progressive pictures and having the optional rate, and in a case where the progressive-optional-rate playback path includes another playback section, a video stream defined by the another playback section is regarded to satisfy the condition, and information indicating presence of the first-attribute playback section is set in a playlist that includes one or more first-attribute playback sections, the playback device further comprising: a playitem number register storing a current playitem number identifying a current piece of playitem information among a plurality of pieces of playitem information which respectively define a plurality of playback sections in one playback path; a demultiplexing unit configured to demultiplex, from a digital stream, one or more elementary streams that are indicated in a stream selection table of the current piece of playitem information as being permitted to be played back; and a video decoder configured to decode a video stream included in the one or more elementary streams.

In the case where the above problem is solved in the phase of implementing a recording device, it is desirable to adapt the problem solving means to the phase by imposing a limitation of the recording device in which, when writing the progressive-optional-rate playback path, which includes a first-attribute playback section defined for a video stream that satisfies a condition of being composed of progressive pictures and having the optional rate, onto the recording medium, when the progressive-optional-rate playback path includes another playback section, a video stream defined by the another playback section is regarded to satisfy the condition, and information indicating presence of the first-attribute playback section is set in a playlist that includes one or more first-attribute playback sections.

In the present embodiment, a concept "60P video attribute" is introduced in the playback path defined by the playlist information. The following describes a detailed structure of the 60P playlist having the 60P video attribute. With regard to a playlist that includes a 60P video stream, the version number of the playlist is set to a different value from that of a playlist that includes only existing, mandatory video streams. When the playlist version numbers are set in this way, it indicates that a target playlist includes a video stream that is composed progressive pictures and has an optional frame rate.

Here, the "playlist version number" is a version number that is set in an MPLS file which is a playlist information file. By setting the playlist version number to a special value or a value that is greater than an existing one, it is possible to indicate that the corresponding playlist information file is a 60P playlist. This is because, when the playlist version number is set in this way, the subject of the player device recognizes that the playlist as the target of playback includes some update.

As described above, a playlist is a playback path, and is formed by arranging one or more playback sections defined for one or more digital streams. By indicating whether or not each playback path has a video attribute of "60P", the stream video attributes of the clip information files corresponding to respective digital streams are united in a virtual manner, and attributes of playitem information defining the playback sections are united in a virtual manner. Here, "united" means that, when a plurality of digital streams constituting a playlist include a digital stream that is composed of progressive pictures and has an optional frame rate, the video attributes of the whole digital streams constituting the playlist are regarded as "60P".

Conversely, when each of a plurality of digital streams constituting a playlist has a video attribute of 24P or 60i, the video attributes of the whole digital streams constituting the playlist are regarded as 24P or 60i. With this structure, even if only one of a plurality of digital streams constituting a playlist includes a 60P video stream, the playlist as a whole is treated as a "playback path having the 60P video attribute", and it is excluded from the playback-target playback path when the first play title or the top menu title is selected.

The following point out some requirements from the standpoint of the playitem information. According to the standard for the application layer of the Blu-ray disc, the following items in a plurality of pieces of playitem information in the playlist information need to be set in the same manner Video Codec
Resolution
Frame rate
Aspect ratio This, in principle, prevents one playback path from including both a playitem having the 60P attribute and a playitem having another attribute. Thus, if a plurality of pieces of playitem information constituting a playlist include even one piece of playitem information permitting a playback of a 60P video stream, the playlist version in the playlist information file becomes a new version number, and in that case, the other pieces of playitem information having the new version number in the playlist are treated as 60P. Since one playback path should not include both a playitem having the 60P attribute and a playitem having another attribute, the video stream attributes are united in a virtual manner as described in the following.

Figure 4:
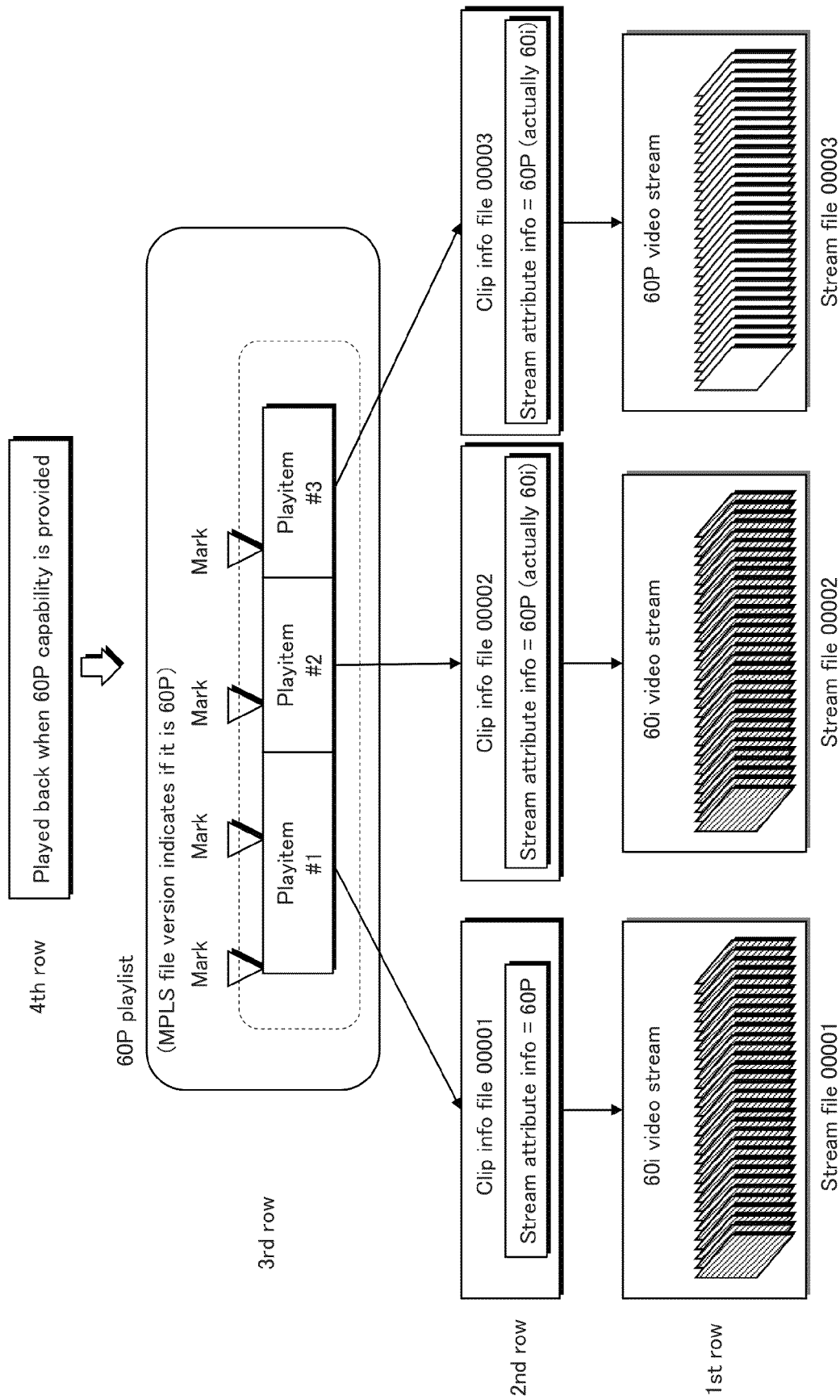
FIG. 4 illustrates an improvement in a data structure of a 60P playlist.

FIG. 4 illustrates an improvement in a data structure of a 60P playlist. The first row illustrates stream files. The second row illustrates clip information files. The third row illustrates the playlist information composed of a plurality of pieces of playitem information #1 to #3. The triangle signs attached to the playitem information indicate corresponding pieces of mark information set in the playitem information. The fourth row illustrates the internal state of the playback device.

In the third row, the version number of the MPLS file, which is the playlist version number, is set to a predetermined value to indicate to the playback device that the playlist illustrated in FIG. 4 is a 60P playlist.

Among a plurality of pieces of playitem information constituting the playlist information in the third row, the last one, namely playitem information #3, specifies a 60P video stream, and playitem information #1 and #2 specify 60i video streams that are composed of interlace pictures and have the frame rate of 60 Hz. However, the stream attribute information included in clip information files #1 to #3 that correspond to the playitem information #1 to #3 are united to "60P" in a virtual manner. With this structure, the attribute of the whole playlist is set to the attribute of the progressive pictures having the frame rate of 60 Hz, namely the 60P video attribute.

Note that the reason for expressing the unity of the video attributes in the clip information as "virtual" is that, according to the actual Blu-ray disc application standard, there is a one-to-one correspondence between a plurality of pieces of stream attribute information in the clip information file and a plurality of real streams, and thus it is inconceivable that a false attribute is set in the stream attribute information. In FIG. 4, the video attribute of the clip information file is set to "60P". This is a special treatment in the case where the playlist is a 60P playlist.

As described above, even if a 60P video stream is permitted to be played back via clip information only by playitem information, which constitutes only a part of a playlist, the playlist as a while is treated as a 60P playback path. Therefore, the three video streams illustrated in FIG. 4 can be played back as far as the playback device has the 60P capability as indicated in the fourth row thereof. With this structure, even when the playlist information includes a piece of playitem information specifying a video stream that can be played back by a non-60P-supporting playback device, when it is judged that the playback device does not have the 60P capability, the 60P playlist is not played back.

In this way, according to the present embodiment, when one of a plurality of video shooting sections includes a locally dynamic movement of a subject, sections around the section can be recorded on the recording medium as one playback path of 24P→60P→24P by setting the section to 60P and sections before and after the section to 24P. This provides a recording format enabling a playback path to include a locally high frame rate. Accordingly, this makes it possible to restrict the consumption of the recording capacity to the minimum, while introducing a video shooting of a 60P video stream.

Embodiment 5

The present embodiment relates to an improvement in recording a digital stream having an optional frame rate other than 60P. In the previous embodiment, when a plurality of digital streams constituting a playlist include one 60P stream, the whole playback paths defined by the playlist are regarded as having the 60P attribute.

However, there are digital streams having an optional frame rate other than 60P, such as "50P video stream". The "50P video stream" is a video stream composed of progressive pictures and having the frame rate of 50 Hz. If a playback path of the 50P video stream is treated as a "non-60P playback path", the following may happen: when the first play title or top menu title is selected, the playback path of the 50P video stream is selected, and the screen blacks out.

It is therefore an object of the present embodiment to exclude a possibility that a playback path of the 50P video stream is selected as a playback path of a non-60P video stream.

In the case where the above problem is solved in the phase of implementing a recording medium, the recording medium in this phase is the recording medium in which the progressive-optional-rate playback path is a progressive-first-optional-rate playback path which is a playback path for playing back the progressive pictures at a first optional rate, and the plurality of playback paths defined in the playlist information include, as another type of playback path, a progressive-second-optional-rate playback path which is a playback path for playing back the progressive pictures at a second optional rate only within a predetermined geographical region, and one of the plurality of control programs instructs the playback device to play back the progressive pictures at the second optional rate, on a condition that the playback device has a capability to process the progressive-first-optional-rate playback path and a capability to process the progressive-second-optional-rate playback path. Solving the problem with the above improvement of the structural elements is an aspect of solution to the problem in this phase.

In the case where the above problem is solved in the phase of implementing a playback device, it is desirable to adapt the problem solving means to the phase by imposing a limitation of the playback device in which the progressive-optional-rate playback path is a progressive-first-optional-rate playback path which is a playback path for playing back the progressive pictures at a first optional rate, and the plurality of playback paths defined in the playlist information include, as another type of playback path, a progressive-second-optional-rate playback path which is a playback path for playing back the progressive pictures at a second optional rate only within a predetermined geographical region, one of the plurality of control programs instructs the playback device to play back the progressive pictures at the second optional rate, on a condition that the playback device has a capability to process the progressive-first-optional-rate playback path and a capability to process the progressive-second-optional-rate playback path, the player setting register is a first capability register indicating whether or not the playback device has a capability to process the progressive pictures at the optional rate, the playback device further comprises a second capability register indicating whether or not the playback device has a capability to play back the progressive pictures at the second optional rate, and when the playback device is instructed to play back the progressive pictures at the second optional rate, the playback unit plays back the progressive pictures at the second optional rate on a condition that the first capability register indicates that the playback device has the capability to process the progressive pictures at the optional rate and the second capability register indicates that the playback device has the capability to play back the progressive pictures at the second optional rate.

In the case where the above problem is solved in the phase of implementing a recording device, it is desirable to adapt the problem solving means to the phase by imposing a limitation of the recording device in which the progressive-optional-rate playback path is a progressive-first-optional-rate playback path which is a playback path for playing back the progressive pictures at a first optional rate, and the plurality of playback paths defined in the playlist information include, as another type of playback path, a progressive-second-optional-rate playback path which is a playback path for playing back the progressive pictures at a second optional rate only within a predetermined geographical region, and when a piece of playlist information defining the progressive-second-optional-rate playback path for playing back only within the predetermined geographical region is written onto the recording medium, a control program, which instructs the playback device to play back the progressive pictures at the second optional rate on a condition that the playback device has a capability to process the progressive-first-optional-rate playback path and a capability to process the progressive-second-optional-rate playback path, is written onto the recording medium together with the piece of playlist information.

In accordance with the above problem solving means, the present embodiment introduces a "50P playlist". The 50P playlist is a playlist defined by a playlist information file (MPLS file) in which the playlist version number is set to a predetermined value indicating 50P. The 50P playlist includes not only a playlist in which all playitems constituting thereof have a stream video attribute "50P", but also a playlist which includes one or more playitems that permit playback of 50P video streams and one or more playitems that permit playback of 60P video streams. This is because a 50P playlist is treated as a sub set of a 60P playlist.

The reason for this is as follows. The 60P is seen as an extension of the NTSC method adopting 60i. The 60i NTSC method is a world-wide television broadcasting method, and thus the 60P is assumed to be used in a world-wide geographical region.

In contrast, 50P is seen as an extension of the PAL method adopting 50i. The 50i PAL method is a European scanning method, and thus the use of 50P is restricted to the geographical region of Europe. The 50P, like the 60P, has an optional frame rate, but the usable geographical region is narrower than that of 60P. For this reason, in the present embodiment, a playlist including both 50P and 60P is treated as a 50P playlist, and the 50P playlist is treated as a sub set of the 60P playlist. That is to say, the 50P playlist is dependent on the 60P playlist. The stream selection table is set such that a playlist permitting a playback of a 50P digital stream is no more treated as a non-60P playlist. This prevents a 50P video stream from being played back when the first play title or the top menu title is selected. This further prevents a 50P video stream from being entered into the video decoder of a playback device which does not have the 50P capability, thereby preventing the video decoder from taking a heavy load.

Figure 5:
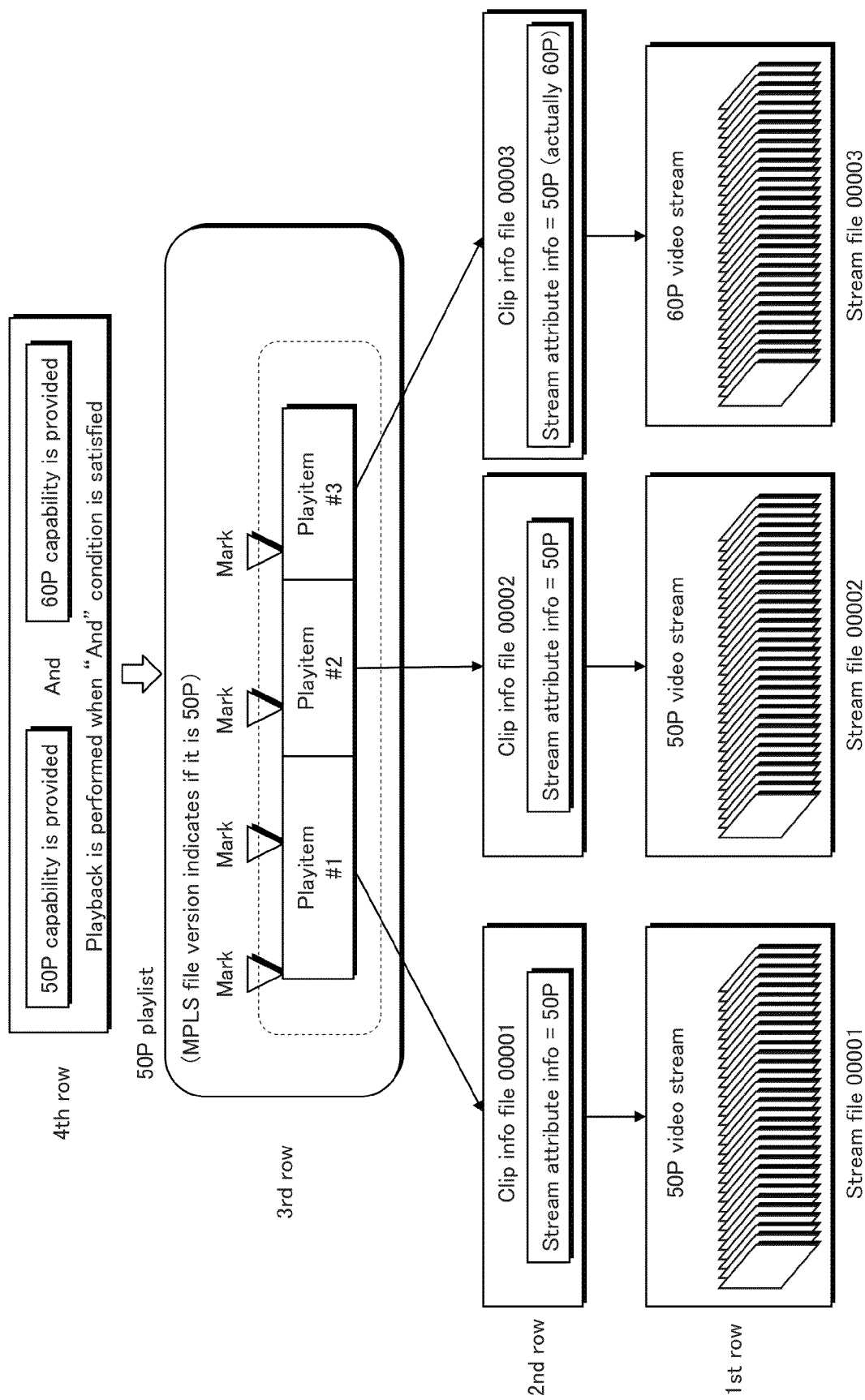
FIG. 5 illustrates an improvement in solving the problem with a data structure of a 50P playlist.

FIG. 5 illustrates an improvement in solving the problem with a data structure of a 50P playlist. The first row illustrates stream files. The second row illustrates clip information files. The third row illustrates the playlist information composed of a plurality of pieces of playitem information #1 to #3. The fourth row illustrates the internal state of the playback device. As illustrated in the third row, the playlist version number in the playlist information is set to a predetermined value indicating 50P, so that the playlist illustrated in FIG. 5 is defined as a 50P playlist. Among a plurality of pieces of playitem information constituting the playlist information, the last one, namely playitem information #3, specifies a 60P video stream, but playitem information #1 and #2 specify 50P video streams as the target of playback. However, the stream video attributes of the clip information files corresponding to playitem information #1 to #3 are united to the 50P video attribute in a virtual manner. This is because the playlist version in the playlist information is set to the predetermined value indicating 50P. With this structure, the attribute of the playlist as a whole is set to the 50P video attribute.

A playlist, which includes one or more 50P video stream that constitute only a part thereof, is, as a while, treated as a 50P playlist since the playlist version in the playlist information is set to the predetermined value indicating 50P. Therefore, the three video streams illustrated in FIG. 5 can be played back as far as the playback device has both the 60P capability and the 50P capability, as indicated in the fourth row thereof. With this structure, even when the playlist information includes a piece of playitem information specifying a video stream that can be played back by a non-60P-supporting playback device, when it is judged that the playback device lacks at least one of the 60P capability and the 50P capability, the playlist having the 60P video attribute is not played back.

As described above, by imposing a strict requirement that progressive pictures having a second optional rate are not permitted to be played back unless progressive pictures having a first optional rate can be played back, a playback path, which includes both the first optional rate and the second optional rate as the optional video attributes of frame rates higher than 24P, is played back without interruption. This promotes uniting various materials having various attributes into one.

Embodiment 6

The present embodiment relates to the 60P capability of the display device. The display device manufactures have different attitudes toward providing display devices with the capability to display 60P. Some manufacturers have marketed, from many years ago, display devices supporting 60P video display, in prospect of the demand for high quality coming in the future. On the other hand, other manufacturers, who consider it best to produce products at the lowest cost, are planning to market display devices that can display 60P video, in the future. In these circumstances, some users may have a halfway connection format between a playback device and a display device. That is to say, a playback device having the 60P capability may be connected with a display device not having the 60P capability. The above-described embodiments leave a possibility that a 60P video stream may be entered into a display device in the above-described halfway connection format and the video may be displayed inappropriately.

It is therefore an object of the present embodiment to exclude a possibility that video may be displayed inappropriately in a halfway system in which, for example, a 60P-supporting display device is connected with a non-60P-supporting playback device.

In the case where the above problem is solved in the phase of implementing a recording medium, it is desirable to adapt the problem solving means to the phase by imposing a limitation of the recording medium in which, when playing back the progressive-optional-rate playback path, each of the plurality of control programs judges whether or not a display device has a capability to process the progressive-optional-rate playback path, and instructs the playback device to play back the progressive-optional-rate playback path, on a condition that the display device has the capability to process the progressive-optional-rate playback path.

In the case where the above problem is solved in the phase of implementing a playback device, it is desirable to adapt the problem solving means to the phase by imposing a limitation of the playback device in which the player setting register includes: a first capability register indicating whether or not the playback device has a capability to process the progressive pictures at the optional rate; and a second capability register indicating whether or not a display device has a capability to display the progressive pictures at the optional rate, and when the playback device is instructed to play back the progressive pictures at the optional rate, the playback unit plays back the progressive pictures at the optional rate on a condition that the first capability register indicates that the playback device has the capability to process the progressive pictures at the optional rate and the second capability register indicates that the display device has the capability to display the progressive pictures at the optional rate.

In the case where the above problem is solved in the phase of implementing a recording device, it is desirable to adapt the problem solving means to the phase by imposing a limitation of the recording device in which each of the plurality of control programs is generated such that, when playing back the progressive-optional-rate playback path, each of the plurality of control programs judges whether or not a display device has a capability to process the progressive-optional-rate playback path, and instructs the playback device to play back the progressive-optional-rate playback path, on a condition that the display device has the capability to process the progressive-optional-rate playback path, and then the generated control programs are written onto the recording medium.

In the present embodiment, a capability to process a 60P video stream is divided into (i) a decode capability to decode a plurality of access units constituting the GOPs of the 60P video stream at a time interval of 1/60 seconds, and (ii) a presentation capability to display each group of 1920×1080 pixels representing non-compressed pictures obtained by the decoding, at the time interval of 1/60 seconds, and the decode capability is set in the player setting register as a 60P video stream capability, and the presentation capability is set in the display device.

The playback device obtains the "presentation capability to display each group of 1920×1080 pixels at the time interval of 1/60 seconds" from the display device connected with the playback device, via an inter-device interface such as an HDMI. It is judged that a 60P playlist can be played back and the presentation capability is provided when it is judged that both the 60P capability of the playback device and the 60P display capability of the display device are valid.

As one variation of the above structure, when it is judged that the 60P display capability is invalid, the player device may convert the video data into 60i or the like and output the converted video data to the display device. In this case, when the player device can convert a 60P video stream to a 60i video stream or the like, it is possible to set the 60P display capability to "valid" regardless of the actual 60P display capability of the display device connected with the player device, and judge that the "presentation capability to display each group of 1920×1080 pixels at the time interval of 1/60 seconds" is "provided".

Also, the 60P display capability may be set to "invalid", but a "60P→60i conversion capability flag" may be set in the display device. The player device may obtain the flag via an inter-device interface, and when the obtained 60P→60i conversion capability flag has been set to "valid", the player device may judge that the "presentation capability to display each group of 1920×1080 pixels at the time interval of 1/60 seconds" is "provided".

As described above, according to the present embodiment, a 60P-video-attribute playlist is played back on a condition that both the playback device and the display device have the 60P capability. With this structure, it is possible to prevent progressive pictures from being supplied to the display device at the frame rate of 60 Hz in a halfway connection format in which a playback device having the 60P capability is connected with a display device not having the 60P capability. It is possible to prevent a quality problem from occurring on the display device side connected with the playback device.

Embodiment 7

The present embodiment relates to exclusion of 60P titles. In a typical disc structure, the top menu title is displayed for a user to select a video stream to be played back. If the displayed top menu suggested the presence of a 60P playback path that might be played back inappropriately, the structure would not dispel the manufacturers's fear that progressive pictures might be started to be played back at the frame rate of 60 Hz.

It is therefore an object of the present embodiment to hide the presence of a 60P video stream from users when the recording medium is loaded into a non-60P-supporting playback device.

In the case where the above problem is solved in the phase of implementing a recording medium, the recording medium in this phase is the recording medium in which a top menu displayed by the top menu title includes two or more button objects which correspond one-to-one to two or more titles and each receive a selection of a corresponding title on the top menu, the two or more titles include a first-type title that instructs the playback device to play back the progressive pictures at the optional rate and a second-type title that instructs the playback device to play back the progressive pictures at a frame rate other than the optional rate or to play back the interlace pictures, and a control program corresponding to the top menu title sets a button object corresponding to the first-type title among the two or more button objects to an enable state when the playback device has a capability to process the progressive-optional-rate playback path, and sets the button object corresponding to the first-type title to a disable state when the playback device does not have the capability to process the progressive-optional-rate playback path. Solving the problem with the above improvement of the structural elements is an aspect of solution to the problem in this phase.

In the case where the above problem is solved in the phase of implementing a playback device, it is desirable to adapt the problem solving means to the phase by imposing a limitation of the playback device in which a top menu displayed by the top menu title includes two or more button objects which correspond one-to-one to two or more titles and each receive a selection of a corresponding title on the top menu, the two or more titles include a first-type title that instructs the playback device to play back the progressive pictures at the optional rate and a second-type title that instructs the playback device to play back the progressive pictures at a frame rate other than the optional rate or to play back the interlace pictures, a control program corresponding to the top menu title sets a button object corresponding to the first-type title among the two or more button objects to an enable state when the playback device has a capability to process the progressive-optional-rate playback path, and sets the button object corresponding to the first-type title to a disable state when the playback device does not have the capability to process the progressive-optional-rate playback path, and the playback device further comprises: a receiving unit configured to receive a user operation; and a graphics decoder configured to decode a graphics stream and display a top menu including a plurality of buttons, and change the plurality of buttons in state in accordance with the user operation.

In the case where the above problem is solved in the phase of implementing a recording device, it is desirable to adapt the problem solving means to the phase by imposing a limitation of the recording device in which a top menu displayed by the top menu title includes two or more button objects which correspond one-to-one to two or more titles and each receive a selection of a corresponding title on the top menu, the two or more titles include a first-type title that instructs the playback device to play back the progressive pictures at the optional rate and a second-type title that instructs the playback device to play back the progressive pictures at a frame rate other than the optional rate or to play back the interlace pictures, and a control program, which sets a button object corresponding to the first-type title among the two or more button objects to an enable state when the playback device has a capability to process the progressive-optional-rate playback path and sets the button object corresponding to the first-type title to a disable state when the playback device does not have the capability to process the progressive-optional-rate playback path, is generated, and the generated control program is made to correspond to a top menu title in the index table, and then is written onto the recording medium.

The following describes the problem solving process performed by the above problem solving means with reference to FIGS. 6A-6D.

FIGS. 6A-6D illustrate the structure of the top menu. In FIG. 6A, a frame win3 indicates a closeup of the top menu. The top menu in this example includes a sports day button and a cultural fest button, wherein the sports day button receives an instruction to transition to the title 1 containing video of the sports day, and the cultural fest button receives an instruction to transition to the title 2 containing video of the cultural fest. When the sports day button is entered on the screen displayed by the top menu title, a 60P video of the sports day having been recorded in 60P is played back; and when the cultural fest button is entered, a 60P video of the cultural fest having been recorded in 60i is played back.

That is to say, the top menu includes the sports day button for receiving a selection of the title 1 containing video of the sports day and the cultural fest button for receiving a selection of the title 2 containing video of the cultural fest, and 00002.PRG, which is a control program corresponding to the top menu title, includes a code that changes the status of a button object depending on whether or not the playback device has the 60P capability.

FIGS. 6B and 6C illustrate the status change of the button object. FIG. 6B illustrates a sample image of the top menu screen in which the sports day button is not displayed since the playback device does not have the 60P capability. FIG. 6C illustrates a sample image of the top menu screen in which the sports day button is displayed in grayout since the playback device does not have the 60P capability.

A specific example of the status change of the object is as follows. That is to say, first it is judged by referring to the above-mentioned 60P-capability flag whether or not progressive pictures can be played back at the frame rate of 60 Hz. When it is judged that progressive pictures can be played back at the frame rate of 60 Hz, the top menu title is structured to display a top menu, as illustrated in FIG. 6A, that includes the sports day button for receiving an instruction to transition to the title 1 and the cultural fest button for receiving an instruction to transition to the title 2. When it is judged that progressive pictures cannot be played back at the frame rate of 60 Hz, the top menu title is structured to display a top menu, as illustrated in FIG. 6B, that does not include the sports day button, but includes only the cultural fest button for receiving an instruction to transition to the title 2.

Also, as illustrated in FIG. 6C, the sports day button for receiving an instruction to transition to the title 1 may be displayed in grayout. In this case, the top menu is composed of the sports day button displayed in grayout and the cultural fest button for receiving an instruction to transition to the title 2. As illustrated in FIGS. 6B and 6C, a button for receiving a selection of a 60P title is not displayed, or displayed in grayout. This prevents the 60P title from being played back when the playback device does not have the 60P capability.

As another method for notifying the user of the unavailability of the 60P video playback, the content of display on the screen may be changed when the button object is entered. FIG. 6D illustrates a sample of such a screen that is displayed when the playback device does not have the 60P capability. As illustrated in FIG. 6D, when the button object is entered, a screen indicating the unavailability of the playback is displayed. With this structure, it is possible to prevent a 60P stream from being sent into the video decoder even if the user selects a title corresponding to a 60P playback path.

As described above, it is possible to change the structure of the top menu screen, which manages the transition to each title, depending on whether or not progressive pictures can be played back at the frame rate of 60 Hz, by embedding, into a button for receiving an instruction to transition to the title 1, any combination of the above-described methods including "when the button for receiving an instruction to transition to the title 1 is pressed, an image is displayed to notify the user that the player device cannot play back the title" (FIG. 6D). With this structure, it is possible to prevent a 60P playback path from being played back by a player device that does not support 60P.

As described above, the structure of the top menu is changed depending on whether or not the playback device has the 60P capability. With this structure, it is possible to prevent the 60 Hz progressive pictures from being played back by a playback device that does not support a progressive playback at an optional rate. Also, a video stream in a video format that can be played back by a non-60P-supporting player device is provided as the video stream for displaying the top menu title. With this structure, by referring to the top menu, the viewer can recognize in a reliable manner what is recorded on the recording medium.

Embodiment 8

The present embodiment describes a specific structure of the recording mediums described in Embodiments 1 to 7.

The present embodiment provides, as an aspect of the recording medium, a recording medium on which are recorded: an index table; a plurality of digital streams respectively including a plurality of video streams; a plurality of pieces of playlist information respectively defining a plurality of playback paths of the plurality of video streams; and a plurality of control programs, wherein the plurality of video streams include (i) a video stream that is composed of progressive pictures and has a mandatory frame rate, (ii) a video stream that is composed of interlace pictures, and (iii) a video stream that is composed of progressive pictures and has an optional frame rate, among a plurality of titles described in the index table, a first play title and a top menu title each correspond to a control program that instructs to play back in accordance with a playback path defined with regard to the video stream that is composed of progressive pictures and has the mandatory frame rate or the video stream that is composed of interlace pictures, and among the plurality of control programs, one or more control programs, which respectively correspond to one or more general titles that include neither the first play title nor the top menu title, instruct to play back in accordance with a playback path defined with regard to the video stream that is composed of progressive pictures and has the optional frame rate, and a control code, which instructs a playback device to play back the progressive pictures on a condition that the playback device has a capability to play back the progressive pictures at the optional frame rate, is embedded in each of the one or more control programs. The format of the recording medium includes a movie recording format and an AV recording format. It is desirable that the video stream, the playlist information, the control program, and the index table are recorded in a recording area to which the movie recording format is applied.

The internal structure of the recording medium disclosed in the present embodiment may include any of the problem solving means described in Embodiments 1 to 7, or a combination of two or more of the problem solving means described in Embodiments 1 to 7.

Describing all of the possible internal structures incorporating the problem solving means described in the above embodiments and combinations of two or more of the problem solving means described therein would require an enormous number of pages of the Description, and thus is not preferable. Thus, the following discloses an internal structure that includes all the problem solving means described in the above embodiments, as the representative thereof.

Figure 7:
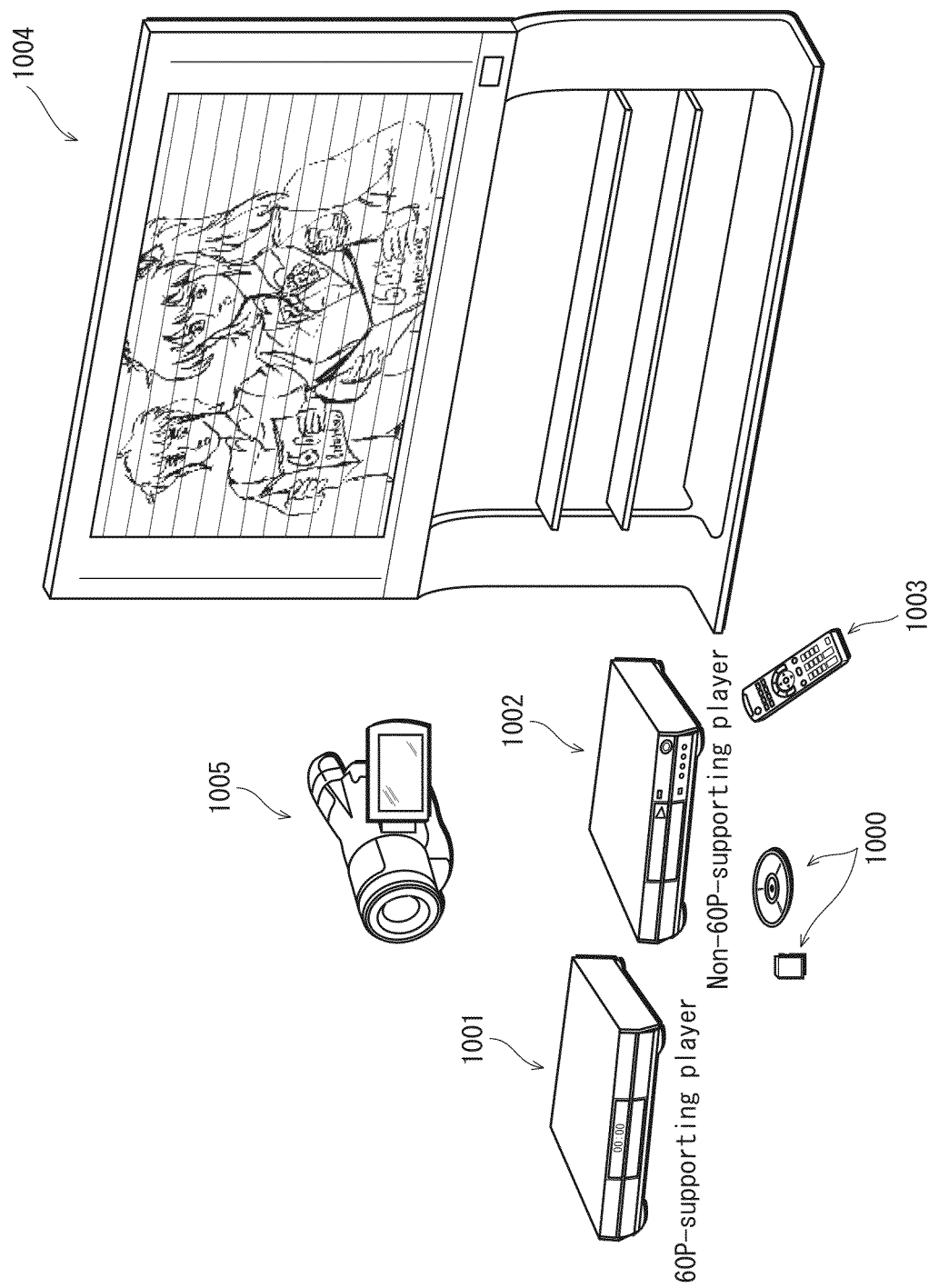
FIG. 7 illustrates a home theater system in which the recording medium, playback device and recording device described in Embodiments 1-7 are used.

First, an explanation is given of a specific system in which the above recording medium is presumed to be used. FIG. 7 illustrates a home theater system in which the recording medium, playback device and recording device described in Embodiments 1-7 are used. The home theater system includes a removable medium 1000, playback devices 1001 and 1002, a remote control 1003, and a display device 1004.

The removable medium 1000 is an optical disc or a semiconductor memory card for storing stream files storing 60P video streams and stream files storing non-60P video streams in an application format of a Blu-ray Recording disc, an application format of a Blu-ray ReadOnly disc, and an application format of a Blu-ray Rewritable disc.

The playback device 1001 is a 60P player supporting 60P, reads a stream file containing a 60P video stream or a stream file containing a non-60P video stream in accordance with a program defined in any of the above application formats, playlist information, or clip information, and performs a decoding process and a playback process on the read stream file.

The playback device 1002 is a non-60P player not supporting 60P, reads a stream file containing a non-60P video stream in accordance with a program defined in any of the above application formats, playlist information, or clip information, and performs a decoding process and a playback process on the read stream file. The playback device 1002 does not perform the decoding process and the playback process on a stream file containing a 60P video stream.

The remote control 1003 allows the user to enter an operation to change the status of the interactive screen, and includes a MoveUp key, a MoveDown key, a MoveRight key, a MoveLeft key, and an Enter key. Here, a button included in the interactive screen transitions among a normal status, a selected status and an active status. The MoveUp key, MoveDown key, MoveRight key and MoveLeft key are used by the user to change the status of the button as: the normal status→the selected status→the active status. The normal status refers to a status in which the button is merely displayed. In contrast, the selected status refers to a status in which the button is focused by a user operation, but has not been entered. The active status refers to a status in which the button is entered. The MoveUp key is used to move the setting of the selected status from a currently set button to another button that is located above the currently set button in the interactive screen. The MoveDown key is used to move the setting of the selected status from a currently set button to another button that is located below the currently set button; the MoveRight key is used to move the setting of the selected status from a currently set button to another button that is located on the right-hand side of the currently set button; and the MoveLeft key is used to move the setting of the selected status from a currently set button to another button that is located on the left-hand side of the currently set button.

The Enter key is used to change the status of a button in the selected status to the active status, namely to activate the button. Numeric keys "0" to "9" are used to request a title direct search of a title having a corresponding title number.

The display device 1004 receives pixel bit values of one screen from the playback devices 1001 and 1002 via an inter-device interface, and displays an image by driving display elements of the display panel in accordance with the received pixel bit values. Note that 60 images are displayed per second in 60P, and 24 images are displayed per second in 24P.

This completes the explanation of the home theater system.

Next, a detailed explanation is given of the removable medium. In the following explanation, a multi-layered optical disc is taken as one example of the removable medium. The reason why the multi-layered optical disc is taken as one example of the removable medium is that it has the strictest physical restriction for writing and reading, and when writing to the multi-layered optical disc has no problem, the writing is applicable to the other mediums. The structural elements as the means for solving the problem are on the premise of the internal structure of an existing recording medium. To enhance the understanding, the following describes existing data elements that are the premise of the structural elements indispensable for solving the problem.

Figure 8:
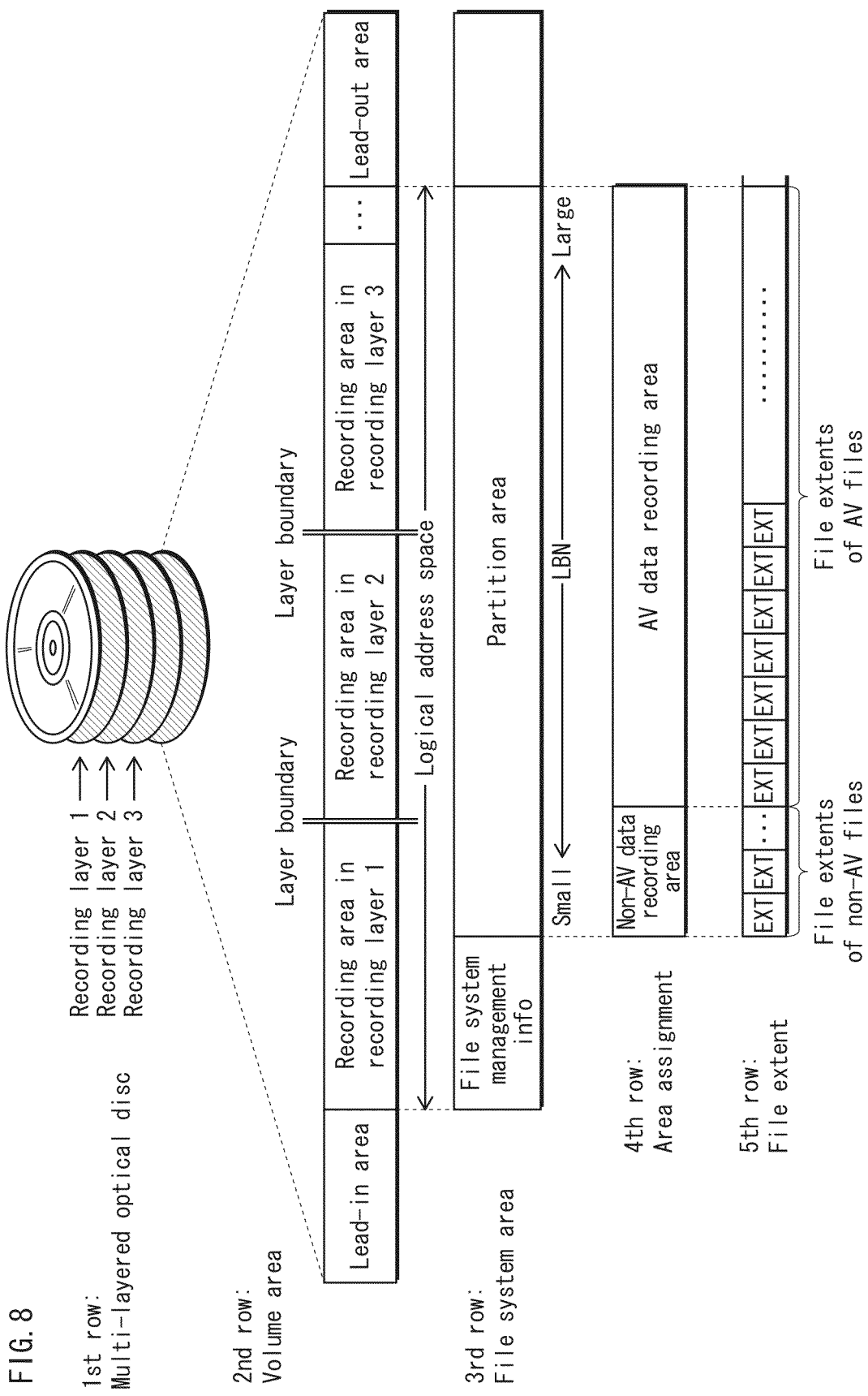
FIG. 8 illustrates an internal structure of a multi-layered optical disc.

FIG. 8 illustrates an internal structure of a multi-layered optical disc.

In this figure, the first row illustrates one example of a multi-layered optical disc, and the second row shows tracks in the horizontally extended format though they are in reality formed spirally in the recording layers. These spiral tracks in the recording layers are treated as one continuous volume area. The volume area is composed of a lead-in area, recording layers of recording layers 1 through 3, and a lead-out area, where the lead-in area is located at the inner circumference, the lead-out area is located at the outer circumference, and the recording layers of recording layers 1 through 3 are located between the lead-in area and the lead-out area. The recording layers of recording layers 1 through 3 constitute one consecutive logical address space.

The volume area is sectioned into units in which the optical disc can be accessed, and serial numbers are assigned to the access units. The serial numbers are called logical addresses. A data reading from the optical disc is performed by specifying a logical address. Here, in the case of a read-only disc such as the Blu-ray ReadOnly disc, basically, sectors with consecutive logical addresses are also consecutive in the physical disposition on the optical disc. That is to say, data stored in the sectors with consecutive logical addresses can be read without performing a seek operation. However, at the boundaries between recording layers, consecutive data reading is not possible even if the logical addresses are consecutive. It is thus presumed that the logical addresses of the boundaries between recording layers are registered in the recording device in advance.

In the volume area, file system management information is recorded immediately after the lead-in area. Following this, a partition area managed by the file system management information exists. The file system is a system that expresses data on the disc in units called directories and files. In the case of the Blu-ray ReadOnly disc, the file system is a UDF (Universal Disc Format). Even in the case of an everyday PC (personal computer), when data is recorded with a file system called FAT or NTFS, the data recorded on the hard disk under directories and files can be used on the computer, thus improving usability. The file system makes it possible to read logical data in the same manner as in an ordinary PC, using a directory and file structure.

The fourth row shows how the areas in the file system area managed by the file system are assigned. As shown in the fourth row, a non-AV data recording area exists on the innermost circumference side in the file system area. Also, an AV data recording area exists immediately after the non-AV data recording area. The fifth row shows the contents recorded in the non-AV data recording area and the AV data recording area. As shown in the fifth row, Extents constituting the AV files are recorded in the AV data recording area. Also, Extents constituting non-AV files, which are files other than the AV files, are recorded in the non-AV data recording area.

Figure 9:
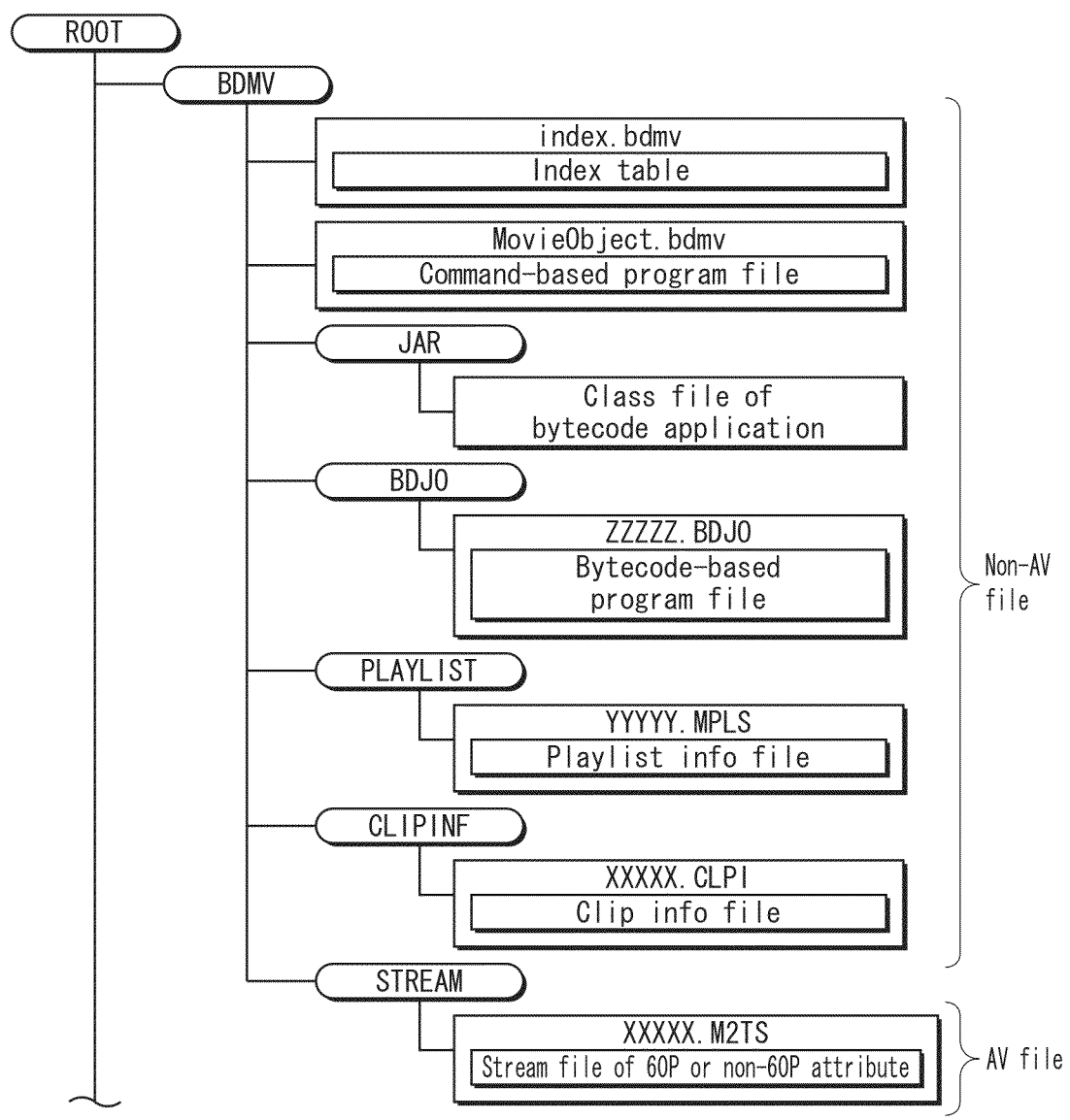
FIG. 9 illustrates the application format of the optical disc based on the file system.

FIG. 9 illustrates the application format of the optical disc based on the file system. This application format is called the BDMV format. The BDMV directory is a recording area in which non-AV files and AV files are stored in the directory/file structure of the BDMV format. It is presumed that data in the application layer format of the Blu-ray ReadOnly disc is stored in the BDMV directory, and thus a playback device supporting the Blu-ray disc accesses the BDMV directory first when the recording medium is loaded therein. Conventionally, in a device supporting a 1080/60P shooting, when a 1080/60 shooting mode is selected, a special recording area for the 1080/60 mode is created, and a 60P video stream is stored in the special recording area. In contrast, in the present embodiment, the 60P video stream is included in the BDMV directory for the BDMV format.

That is to say, the BDMV format of the present embodiment differs from conventional BDMV formats realized in the Blu-ray ReadOnly disc in that it supports recording an AV stream that has a resolution of 1920×1080 and a frame rate of 60P. The following describes the directory structure of the BDMV format in the present embodiment.

In FIG. 9, the BDMV directory is a directory for storing data such as management information and transport streams that can be written on the Blu-ray ReadOnly disc. Five subdirectories called "BDJO directory," "JAR directory," "PLAYLIST directory," "CLIPINF directory," and "STREAM directory" exist below the BDMV directory. Also, two types of files (i.e. index.bdmv and MovieObject.bdmv) are arranged under the BDMV directory.

The file "index.bdmv" (the file name "index.bdmv" is fixed) stores an index table.

The file "MovieObject.bdmv" (the file name "MovieObject.bdmv" is fixed) stores one or more movie objects. The movie object is a program file that defines a control procedure to be performed by the playback device in the operation mode (HDMV mode) in which a command interpreter is a controller. The movie object includes one or more commands and mask flags (a menu call mask flag, a title search mask flag, etc.), where the mask flags each define whether or not to mask a menu call or a title call when the call is performed by the user onto the GUI.

The BDJO directory stores a program file with extension "bdjo" (xxxxx.bdjo ["xxxxx" is variable, the extension "bdjo" is fixed]). This program file stores a BD-J object, which is a program file defining a control procedure to be performed by the playback device in an operation mode of an object-oriented programming language.

A substance of such a Java™ application is a Java™ archive file (YYYYY.jar) stored in the JAR directory under the BDMV directory. An application may be, for example, a Java™ application that is composed of one or more xlet programs having been loaded into a heap area (also called work memory) of a virtual machine. The application is constituted from the xlet programs having been loaded into the work memory, and data.

The "PLAYLIST directory" stores a playlist information file with extension "mpls" ("xxxxx.mpls" ["XXXXX" is variable, and the extension "mpls" is fixed]). Such a playlist information file that is added with extension "mpls" and stored in the BDMV directory is called "MPLS file". The version number of each MPLS file in the PLAYLIST directory is set to a predetermined value that indicates a 60P playlist or a 50P playlist.

The "CLIPINF directory" stores a clip information file with extension "clpi" ("xxxxx.clpi" ["xxxxx" is variable, and the extension "clpi" is fixed]).

The Extents constituting the files existing in the above directories are recorded in the non-AV data area.

The "STREAM directory" is a directory storing a stream file, and stores a stream file ("xxxxx.m2ts" ["XXXXX" is variable, and the extension "m2ts" is fixed]). The extension "m2ts" indicates that the stream file with this extension is in a transport stream format. Such a stream file with extension "m2ts" is called "M2TS file". A stream file and a clip information file having the same file name make a pair. Such a pair of files (a stream file and a clip information file that have the same file name and make a pair) is called "AV clip stream file".

Figure 10:
FIG. 10 illustrates the internal structure of the digital stream.

The following describes stream files storing digital streams. FIG. 10 illustrates the internal structure of the digital streams. As shown in FIG. 10, the digital streams are composed of transport streams each of which includes one or more of: a video stream; an audio stream; a presentation graphics (PG) stream; and an interactive graphics (IG) stream.

Each digital stream stored in the stream files is identified by a PID. For example, an alignment 0x1011 is allocated to a 60P video stream, alignments 0x1100 to 0x111F are allocated to audio streams, alignments 0x1200 to 0x121F are allocated to presentation graphics, alignments 0x1400 to 0x141F are allocated to interactive graphics streams, alignments 0x1B00 to 0x1B1F are allocated to video streams used as child-screen video of the movie, and alignments 0x1A00 to 0x1A1F are allocated to audio stream used as secondary audio mixed with the primary audio. The headers of the TS packets constituting the elementary streams illustrated in FIG. 10 includes PIDs each including a value in the above numerical ranges.

The following explains each of the elementary streams multiplexed in the transport streams.

Video Stream

The video stream is classified into a parent-screen video stream and a child-screen video stream, wherein the parent-screen video stream and the child-screen video stream represent the parent-screen image and the child-screen image in the picture-in-picture (PiP), respectively. The parent-screen video stream is a video stream including pictures in which a child screen is to be inserted in the picture-in-picture. Note that the playback device decides whether or not to perform the picture-in-picture. When the playback device selects a non-picture-in-picture display, only the parent-screen video stream is used to display images on the screen. When the 60P video stream is adopted as the parent-screen video stream, the parent-screen of the picture-in-picture is also a progressive picture and is displayed at the frame rate of 60 Hz.

The following describes a structure that is common to the parent-screen video stream and the child-screen video stream. According to video compress encoding methods such as MPEG-2, MPEG-4AVC, and SMPTE VC-1, data is compressed in size by taking advantage of spatial and temporal redundancy of the video. One method that takes advantage of temporal redundancy of the video is inter-picture predictive encoding. According to the inter-picture predictive encoding, when a certain picture is encoded, another picture to be displayed before or after said certain picture is designated as a reference picture. An amount of motion, which is a difference between the encoding-target picture and the reference picture, is then detected, and the detected motion amount is compensated, with the spatial redundancy between the pictures being removed. In this way, the data amount is compressed.

An intra-picture (I-picture) is a picture that is encoded by inter-picture predictive encoding—i.e., by only using information present in itself without referring to a reference picture. It should be noted that a "picture" is a unit of encoding and denotes both of a frame and a field. A predictive picture (P-picture) is a picture that is encoded by inter-picture predictive encoding by referring to another picture that has already been processed. A bi-directive picture (B-picture) is a picture that is encoded by inter-picture predictive encoding by simultaneously referring to other two pictures that have already been processed. A Br-picture is a B-picture that is referred to by another picture. Also, a frame in the case of the frame structure and a field in the case of the field structure are called video access units.

Figure 12A:
FIGS. 12A and 12B illustrate, in comparison, pictures displayed with the 60P video stream and the 60i video stream.
Figure 12B:
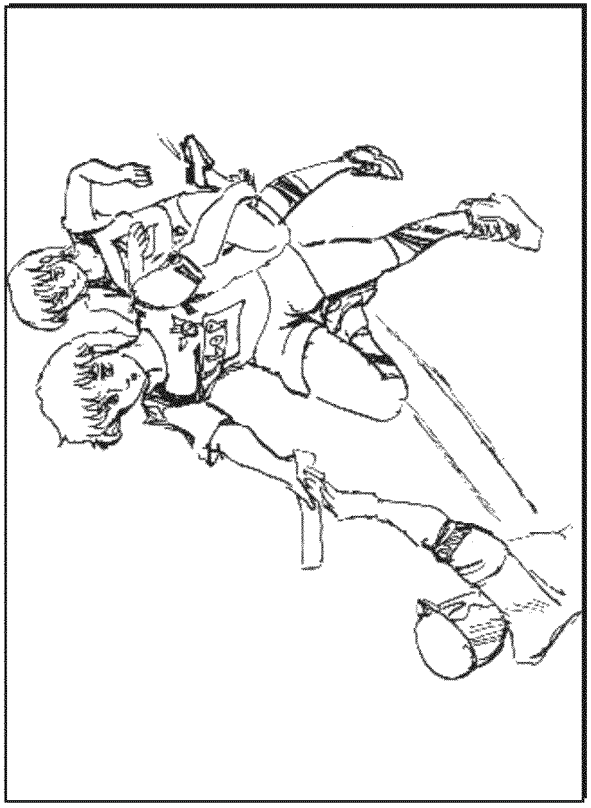

FIGS. 11A and 11B illustrate typical three types of video streams. FIG. 11A illustrates the 60P video stream, and FIG. 11B illustrates non-60P video streams. The non-60P video streams include a 60i video stream illustrated in the upper portion of FIG. 11B and a 24P video stream illustrated in the lower portion of FIG. 11B. FIGS. 12A and 12B illustrate, in comparison, pictures displayed with the 60P video stream and the 60i video stream. As illustrated in FIG. 12B, each picture included in the 60i video stream is an interlace image. The interlace image is composed of two fields: an odd field; and an even field. It is assumed here that an image with horizontal lines, such as the one illustrated in FIG. 12B, represents an interlace picture. On the other hand, it is assumed that an image without horizontal lines, such as the one illustrated in FIG. 12A, represents a progressive picture.

Also, compared with the 60P video stream which displays 60 images per second as illustrated in FIG. 11A, the 24P video stream displays 24 images per second as illustrated in the lower portion of FIG. 11B, providing a lower level of reproduction of a small movement, and in this example, a jumpy movement of the runners in the image. On the other hand, the 60P video stream, which displays more than double the images of the 24P video stream per second, represents details of the movement of the runners and conveys the dynamics.

Audio Stream

The audio stream is classified into a primary audio stream and a secondary audio stream. The primary audio stream is an audio stream that is to be a main audio when the mixing playback is performed; and the secondary audio stream is an audio stream that is to be a sub-audio when the mixing playback is performed. The secondary audio stream includes information for downsampling for the mixing, and information for the gain control.

Presentation Graphics (PG) Stream

The PG stream is a graphics stream that can be synchronized closely with the video, with the adoption of the pipeline in the decoder, and is suited for representing subtitles. Since a close synchronization of the graphics stream and the video is achieved by the pipeline decoding, the use of the PG stream is not limited to the playback of characters such as the subtitle characters. For example, it is possible to display a mascot character of the movie that is moving in synchronization with the video. In this way, any graphics playback that requires a close synchronization with the video can be adopted as a target of the playback by the PG stream.

Interactive Graphics (IG) Stream

The IG stream is a graphics stream which, having information for interactive operation, can display menus with the progress of playback of the video stream and display pop-up menus in accordance with user operations. The IG stream includes a plurality of display sets, and each display set includes a plurality of functional segments. The display sets includes an epoch-start display set, a normal-case display set, an acquisition-point display set, and an epoch-continue display set.

The plurality of functional segments belonging to these display sets fall into the following types.

(1) Object Definition Segment

The object definition segment defines the in-effect and out-effect of pages, the normal, selected, and active statuses of the button members. The object definition segments are grouped into those that define the same status of the button members, and those that constitute the same effect image. The group of object definition segments defining the same status is called "graphics data set". These object definition segments define the graphics object by using a code value and a run length of the code value.

(2) Pallet Definition Segment

The pallet definition segment includes pallet data that indicates correspondence among each code value, luminance, and red color difference/blue color difference.

(3) Interactive Control Segment

The interactive control segment includes a plurality of pieces of page information. The page information is information that defines a screen composition of the multi-page menu. Each piece of page information includes an effect sequence, a plurality of pieces of button information, and a reference value of a pallet identifier.

The button information is information that realizes an interactive screen composition on each page constituting the multi-page menu by displaying the graphics object as one status of a button member.

The effect sequence constitutes the in-effect or the out-effect with use of the graphics object, and includes effect information, where the in-effect is played back before a page corresponding to the page information is displayed, and the out-effect is played back after the page is displayed.

The effect information is information that defines each screen composition for playing back the in-effect or the out-effect. The effect information includes: a screen composition object that defines a screen composition to be executed in the window (partial area) defined by the window definition segment on the graphics plane; and effect period information that indicates a time interval between the current screen and the next screen in the same area. Among the plurality of object definition segments, an object definition segment that defines the graphics object used for the in-effect is disposed at a location that precedes an object definition segment that defines the graphics object used for the button member.

Each piece of button information in the page information is information that realizes an interactive screen composition on each page constituting the multi-page menu, by displaying the graphics object as one status of a button member. The button information includes button proximity information and a navigation command. The button proximity information is information that specifies a button to be set to the selected status when any of upward, downward, leftward and rightward directions is specified by a key operation while a certain button is in the selected status. The navigation command is a command that is executed when a corresponding button member transitions to the active status. A typical navigation command is a branch command. The branch commands include a title jump command and a title call command. The title jump command is a command that sets, in the title number register, a title number that is specified as an operand. The title call command also sets, in the title number register, a title number that is specified as an operand, but differs from the title jump command in that it is accompanied with the status save process or the status restore process. In the status save process, a plurality of values stored in a plurality of player status registers are saved in a stack before a title number specified by an operand is set in the title number register.

In the status restore process, the values are restored from the stack to the plurality of player status registers after a playback of a title with the title number specified by the operand ends and the execution of the control program corresponding to the title number ends. With the execution of the status save process and the status restore process, a playback status before a call can be restored.

(4) End Segment

The end segment is a functional segment that is located at the end of a plurality of functional segments belonging to one display set. The playback device recognizes a series of segments from the interactive control segment to the end segment as the functional segments that constitute one display set.

This completes description of the elementary streams constituting the transport streams that are digital streams. The following explains the process of forming a transport stream. FIGS. 13A-13D illustrate the transport stream formation process. FIG. 13A illustrates how the transport stream is formed by multiplexing. First, a video stream 501 composed of a plurality of video frames is converted into a PES packet sequence 502 and a TS packet sequence 503, and an audio stream 504 composed of a plurality of audio frames is converted into a PES packet sequence 505 and a TS packet sequence 506. Similarly, a presentation graphics stream 507 is converted into a PES packet sequence 508 and a TS packet sequence 509, and an interactive graphics stream 510 is converted into a PES packet sequence 511 and a TS packet sequence 512. A stream file 513, which stores the digital stream, is one stream in which these TS packets are multiplexed.

FIG. 13B illustrates in detail how the video stream is stored in the PES packet sequence. The first row of FIG. 13B indicates a video frame sequence of the video stream. The second row of FIG. 13B indicates a PES packet sequence. As indicated by arrows yy1, yy2, yy3 and yy4 in FIG. 13B, the I-pictures, B-pictures and P-pictures, which are a plurality of video presentation units in the video stream, are separated from each other and stored in the payloads of the PES packets. Each PES packet has a PES header in which a PTS (Presentation Time-Stamp), which indicates the presentation time of the picture, and a DTS (Decoding Time-Stamp), which indicates the decoding time of the picture, are stored.

FIG. 13C illustrates the format of the TS packets that are ultimately written in the stream file storing the digital stream. Each TS packet is a fixed-length, 188-byte packet composed of a 4-byte TS header carrying information such as a PID identifying the stream, and a 184-byte TS payload storing data. The PES packets are stored in the divided form in the TS payloads. In the case of the Blu-ray ReadOnly disc, each TS packet is attached a 4-byte TP_Extra_Header, thus constituting a 192-byte source packet. The source packets are written in the stream file. The TP_Extra_Header stores information such as an ATS (Arrival_Time_Stamp). The ATS shows a transfer start time at which the TS packet is to be transferred to a PID filter of a system target decoder, which will be described later. The source packets are arranged in the stream file as illustrated in the lower row of FIG. 13C, where the numbers incrementing by one starting with the head of the stream file are called SPNs (Source Packet Numbers).

In addition to TS packets of audio, video, subtitles and the like, the stream file also includes TS packets of a PAT (Program Association Table), a PMT (Program Map Table) and a PCR (Program Clock Reference). The PAT shows a PID of a PMT used in the stream file storing the digital stream, and is registered with the PID arrangement of the PAT itself. The PMT stores the PIDs in the streams of video, audio, subtitles and the like, and attribute information corresponding to the PIDs. The PMT also has various descriptors relating to the stream file storing the digital stream. The descriptors include copy control information indicating whether or not copying of the stream file storing the digital stream is permitted. The PCR stores STC time information corresponding to an ATS showing when the PCR packet is transferred to a decoder, in order to achieve synchronization between an ATC (Arrival Time Clock) that is a time axis of ATSs, and an STC (System Time Clock) that is a time axis of PTSs and DTSs. A PAT packet and a PMT packet are stored at the head of a transport stream of the stream file storing the digital stream.

FIG. 13D illustrates the data structure of the PMT in detail. A PMT header is disposed at the head of the PMT. Information such as the length of data included in the PMT is written in the PMT header. The PMT header is followed by a plurality of table descriptors relating to the transport stream that is the digital stream. Information such as the above-mentioned copy control information is described in the table descriptors. The table descriptors are followed by a plurality of pieces of stream information relating to the stream included in the stream file storing the digital steam. The lead line cu1 indicates a closeup of the internal structure of the stream information. Each piece of stream information is composed of: a stream type for identifying, for example, the compression codec of the stream; the PID of the stream; and a plurality of stream descriptors describing the attributes (frame rate, aspect ratio, etc.) of the stream. The number of stream descriptors is equal to the number of streams that are present in the stream file storing the digital stream.

This completes the explanation of the transport stream. To realize random accesses to the transport streams, clip information is provided in the recording medium, as information dedicated to the transport streams. The clip information is stored in the clip information file that is included in the above-described file structure.

FIG. 14A illustrates the internal structure of the clip information file. The lead line cu2 indicates a closeup of the internal structure of the clip information file. As indicated by this lead line, the clip information file is composed of clip information, stream attribute information, an entry map, and sequence information.

As indicated by the lead line cu3, the clip information is composed of a system rate, a playback start time, and a playback end time.

The system rate represents a maximum transfer rate at which the stream file storing the digital steam is transferred to the PID filter of the system target decoder, which is described below. The interval between the ATSs in the stream file storing the digital steam is equal to or lower than the system rate. The playback start time is the PTS of the first video frame in the stream file storing the digital steam. The playback end time is obtained by adding a per-frame playback interval to the PTS of the last video frame in the stream file storing the digital steam.

The lead line cu4 in FIG. 14B indicates a closeup of the internal structure of the stream attribute information. As indicated by the lead line cu4, the stream attribute information is composed of a plurality of pieces of attribute information of the respective streams included in the stream file storing the digital steam, the plurality of pieces of attribute information being registered in one-to-one correspondence with the PIDs. The stream attribute information includes respective information of a video stream, an audio stream, a presentation graphics stream, and an interactive graphics stream. The lead line cu5 indicates a closeup of the internal structure of the video stream attribute information. As indicated by this lead line, each piece of video stream attribute information carries information concerning what kind of compression codec the video stream was compressed with, and the resolution, aspect ratio and frame rate of picture data that compose the video stream.

The lead line cu6 indicates a closeup of the internal structure of the audio stream attribute information. As indicated by the lead line cu6, each piece of audio stream attribute information carries information concerning what kind of compression codec the audio stream was compressed with, how many channels are included in the audio stream, what language the audio stream corresponds to, and the sampling frequency of the audio stream. These information are used when, for example, the decoder is initialized before the player is started to perform a playback.

FIG. 14C illustrates the frame rates and resolutions indicated by the stream attribute information. As illustrated in FIG. 14C, the frame rates include 23 Hz, 24 Hz (23.976 Hz), 25 Hz, 30 Hz, 50 Hz, and 60 Hz. These frame rates are each identified by a four-bit code.

The resolutions include 1920×1080, 1280×720, 960×540, 720×576, and 720×480. For each of the resolutions 720×480, 720×576 and 1920×1080, the progressive display method and the interleave display method are available. For the resolution 1280×720, only the interleave display method is available. A combination of a resolution and a display method is called a "video format", and the video format is identified by a 4-bit format code.

The clip information of the present embodiment is characterized in that it makes it possible to set an image quality by the combination of resolution 1920×1080 and frame rate 60P, which is represented as 1920×1080/60P (in general, it is often represented as "1080/60P"). This combination of the maximum resolution and the highest frame rate provides a high-definition image recording.

FIG. 14D illustrates the internal structure of the entry map. The lead line cu7 indicates a closeup of the internal structure of the entry map. As indicated by the lead line cu7, the entry map is composed of a plurality of entry maps that are each provided for a PID value, and the entry maps each include entry map header information 1101. Each entry map set for a PID value is map information that indicates correspondence between PTSs and SPNs, wherein the PTSs are PTSs of the video stream included in the stream file storing the digital steam.

The lead line cub indicates a closeup of the internal structure of the PTS-SPN pairs in the entry map. Each PTS here indicates a display time of an IDR picture or a non-IDR I-picture that is at the head of a closed GOP or an open GOP included in the video stream of MPEG4-AVC, or a display time of an I-picture of MPEG2-Video.

Each SPN provided in correspondence with a PTS in the entry map indicates a source packet number of a source packet storing an access unit delimiter that is positioned at the head in the access unit structure of the IDR picture or non-IDR I-picture of MPEG4-AVC, or indicates a source packet number of a source packet storing a picture header that is positioned at the head of an I-picture of MPEG2-Video. Each pair of PTS and SPN provided in the same row in the entry map is referred to as an entry point. Also, each entry point is identified by an entry point ID (denoted as "EP_ID"), the entry point IDs incrementing by one with each entry point, starting with "0". Using the entry map, the player can specify the location of a file of the stream file storing the digital steam corresponding to an arbitrary point on the playback axis of the video stream. For instance, when performing a special playback such as fast forward or rewind, the player can perform the random access efficiently without analyzing the stream file storing the digital steam, by specifying, selecting and playing back an I-picture registered in the entry map. An entry map is created for each video stream multiplexed in the digital stream, and managed by the PID. The entry map header information 1101 is stored at the head of each entry map. The entry map header information 1101 carries information such as: the PID of the video stream corresponding to the entry map; and the number of entry points.

Lastly, the sequence information is explained. The sequence information indicates detailed information of ATC sequences and STC sequences that are present in the stream file. More specifically, the sequence information indicates the number of ATC sequences and the source packet numbers (SPN_ATS_start) of the source packets that are at the head of each ATC sequence, as the detailed information of ATC sequences. Also, the sequence information indicates, as the detailed information of STC sequences, the playback start time (STC_Start_time) and the playback end time (STC_End_time) of each STC sequence, and the number of STC sequences.

The following describes the playlist file (YYY.MPLS).

The playback path defined by the playlist file is a so-called "multipath". The multipath is a bundle of one or more main paths and one or more sub-paths, wherein the main paths are playback paths defined for the main transport streams, and the sub-paths are playback paths defined for the secondary transport streams. The playlist information has a hierarchical structure including playitem information and a clip stream file. This structure enables one transport stream to be referred to by a plurality of pieces of playitem information by setting the ratio of the clip stream file to the playitem information to "one-to-many". This makes it possible to create a plurality of variations of a movie effectively by adopting, as a bank film, a transport stream created for a playlist so that the bank film can be referred to by a plurality of pieces of playitem information in a plurality of playlist information files.

FIG. 15A-15D illustrate one example of the internal structure of the playlist information. As illustrated in FIG. 15A, the playlist information includes: main-path information indicating the main paths that are playback paths defined for the main transport streams; sub-path information indicating the sub-paths that are playback paths defined for the secondary transport streams; playlist mark information for setting entry marks and link points for the playback paths; and metadata for picture-in-picture.

As illustrated in FIG. 15B, a main path in the playlist is composed of one or more playitems 1201, each playitem indicating a playback section of a clip stream file. The playitems 1201 are identified by the playitem IDs, and are described in the playlist in the order of playback. Also, the playlist includes playlist marks 1202 that indicate playback start points. The playlist marks 1202 can be set in the playback section defined by the playitem. Each playlist mark is set at a position from where a playback can be started, so that the playlist marks are used for the random access play. The playlist mark information includes: time stamps indicating the positions of the mark points in the playitem; and attribute information indicating attributes of the mark points. The attribute information indicates whether a mark point defined by the playlist mark information is a link point or an entry mark.

The link point is a mark point that can be linked by the link command, but cannot be selected when the chapter skip operation is instructed by the user. The entry mark is a mark point that can be linked by the link command, and can be selected even if the chapter skip operation is instructed by the user.

The link command embedded in the button information of the IG stream specifies a position for a random access playback, in the form of an indirect reference via the playlist mark information.

The following describes the content of the playitem information with reference to FIG. 15C. The playitem includes a clip information specifier 1301, an AV clip playback start time 1302, an AV clip playback end time 1303, user operation control information 1304, a connection condition 1310, and a stream selection table 1305. The clip information specifier 1301 specifies, by using a file name of clip information (clip_information_file_name), a piece of clip information that is to be referred to when a video stream is played back. The AV clip playback start time 1302 specifies a playback start time (In_Time) on the STC time axis of the video stream. The AV clip playback end time 1303 specifies a playback end time (Out_Time) on the STC time axis of the video stream. Since the playback start time and the playback end time are time information, the playback device obtains SPNs that correspond to the specified playback start time and end time by referring to the entry map of the clip information file, and performs the playback process by identifying the read start position.

When the control program operates in the command-interpreter-based operation mode, the instruction to play back a 60P-video-attribute playlist may include: a playitem playback command; a chapter playback command; and a resume command, wherein the playitem playback command includes an operand specifying a playitem number, the chapter playback command includes an operand specifying a chapter number defined by the playlist mark information, and the resume command instructs to play back the progressive picture at the frame rate of 60 Hz from a resume point on the playlist. With the specification of the playitem number, the playitem playback command can instruct to play back the progressive picture at the frame rate of 60 Hz from the specified playitem. With the specification of the chapter number, the chapter playback command can instruct to play back the progressive picture at the frame rate of 60 Hz from a playlist mark having the specified chapter number in the playlist. The playlist information, with definitions in the playitem information and the playlist mark information, enables random accesses at various positions in the playlist.

The connection condition 1310 indicates the type of connection between the playitem including the connection condition 1310 itself and a preceding playitem. When set to "1", the connection condition 1310 of the playitem indicates that a seamless connection is not ensured between of a digital stream specified by the playitem and a digital stream specified by a preceding playitem that precedes the playitem. When set to "5" or "6", the connection condition 1310 of the playitem indicates that a seamless connection is ensured between a digital stream specified by the playitem and a digital stream specified by a preceding playitem that precedes the playitem. When set to "5", the connection condition 1310 indicates a seamless connection associated with a clean break. Here, the "clean break" means that the STC continuity may be interrupted between two succeeding playitems, that is to say, the video display time at the end of the stream file storing the digital steam specified by the preceding playitem may be discontinuous with the video display time at the start of the stream file storing the digital steam specified by the subsequent playitem.

However, there are restrictive conditions for the above. That is to say, the digital streams need to be created in such a manner that the decoding performed by a system target decoder, which is described below, does not fail when the digital stream specified by the preceding playitem is input to the PID filter of the system target decoder, then the digital stream specified by the subsequent playitem is input to the PID filter and then a playback is performed. Also, the last audio frame of the digital stream specified by the preceding playitem needs to be overlapped, on the playback time axis, with the first audio frame of the digital stream specified by the subsequent playitem.

When set to "6", the connection condition 1310 indicates a "seamless connection with continuous ATSs and PTSs", which means that a stream file, which is obtained by linking together the stream file storing the digital steam specified by the preceding playitem and the stream file storing the digital steam specified by the subsequent playitem, must to be able to be played back as a stream file storing one digital stream. That is to say, the ATSs and the PTSs are respectively continuous between the stream file storing the digital steam specified by the preceding playitem and the stream file storing the digital steam specified by the subsequent playitem.

With regard to a 60P playlist, the connection condition is set as follows. That is to say, when the two playitems to be played back successively have the same video attribute such as 60i or 24P, the connection condition is set to 5 or 6. This is because, to realize a seamless connection, the two succeeding playitems need to have the same video attribute.

This means that the connection condition is set to "1" when two succeeding playitems respectively have video attributes 60P and 60i or 60P and 24P. In the case of a 60P playlist, if it includes even one 60P playitem, the whole playitems are 60P, and basically the setting for the seamless connection is allowed. On the other hand, for a combination of playitems having different video attributes, the connection condition must be set to "1 (non-seamless)". Thus, a 60P playlist may include a pair of succeeding playitems associated with both the seamless connection and the non-seamless connection.

This completes description of the connection condition. The following is a detailed explanation of the stream selection table. The stream selection table 1305 includes a plurality of stream entries 1309, each of which is composed of a stream selection number 1306, stream path information 1307, and stream identification information 1308. The stream selection numbers 1306 are numbers that increment by one with each insertion of a first stream entry 1309 in the stream selection table, and are used for identification of streams in the player.

The stream path information 1307 is information indicating which digital stream the stream indicated by the stream identification information 1308 is multiplexed on. For example, when the stream path information 1307 is "main path", it indicates that the stream indicated by the stream identification information 1308 is multiplexed on the stream file storing the digital stream specified by the playitem thereof, and when the stream path information 1307 is "sub-path ID=1", it indicates that the stream indicated by the stream identification information 1308 is multiplexed on the stream file storing the digital stream specified by a sub-playitem corresponding to a playitem playback section in a sub-path identified by the sub-path ID. The stream identification information 1308 is information such as PIDs, and indicates streams multiplexed on the stream file storing the digital steam that is referred to. Furthermore, attribute information of each stream is also recorded in the stream entries 1309. Here, the attribute information is information indicating the property of each stream, and for instance includes a language attribute in the case of audio, presentation graphics, and interactive graphics.

As shown in FIG. 15D, a playlist may include one or more sub-paths. The IDs are assigned to the sub-paths in the order of their registration in the playlist. These IDs are used as sub-path IDs for identifying the sub-paths. Each sub-path indicates a stream playback path by a series of sub-playitems to be played back in synchronization with the main path. Each sub-playitem, as is the case with the playitem, has the clip information 1301, playback start time 1302 and playback end time 1303. The playback start time 1302 and the playback end time 1303 of the sub-playitem are expressed based on the same time axis as that of the main path.

For example, if a certain stream entry 1309 registered in the stream selection table 1305 of the playitem #2 shows sub-path ID=0 and presentation graphics 1, the presentation graphics 1 multiplexed on the stream file storing the digital steam of the sub-playitem #2 played back in synchronization with the playback section of the playitem #2, among the sub-paths of sub-path ID=0, will be played back in the playitem #2 playback section. Furthermore, each sub-playitem includes a field called a sub-path connection condition, which has the same meaning as a connection condition of a playitem. A digital stream on a boundary between sub-playitems whose sub-path connection conditions are "5" or "6" needs to meet the same conditions as for connection conditions "5" or "6".

When a 60P video stream is specified by a main path, a 60P video stream can be specified by a sub-path, In this case, metadata for picture-in-picture defines how a child-screen image is overlaid on a parent-screen image.

The following describes the "metadata for picture-in-picture". The metadata for picture-in-picture is composed of a data block corresponding to one piece of playitem information in the main path information, the data block including: a reference to the piece of playitem information; and a plurality of entries. The plurality of entries respectively define the contents of structuring a plurality of screens that are to be performed when the corresponding playitem information are played back. Each of the plurality of entries defines: a time stamp indicating a timing of structuring a screen; a horizontal coordinate and a vertical coordinate of a secondary video in the screen overlay; and a scale ratio of the secondary video.

The playback device controls an overlay unit to display a secondary video that has been enlarged or reduced in accordance with a scale ratio included in one of the plurality of entries in the data block that has a time stamp corresponding to the current playback time point, at a position defined by the horizontal coordinate and vertical coordinate included in the entry. With this structure, the control unit of the playback device displays a secondary video that has been enlarged or reduced in accordance with a scale ratio included in one of the plurality of entries in the data block that has a time stamp corresponding to the current playback time point, at a position defined by the horizontal coordinate and vertical coordinate included in the entry. With the structure described above, it is possible to change the horizontal coordinate and vertical coordinate in the picture-in-picture as the current playback time point progresses, or to change the size of the secondary video in the picture-in-picture as the current playback time point progresses.

Also, the header of the data block includes: a chroma key flag that defines whether or not a chroma key overlay by the overlay unit is permitted; and a chroma key upper-limit value. When the header of the data block indicates that a chroma key overlay is permitted, the overlay unit of the playback device performs a chroma key overlay to overlay each piece of picture data constituting the primary video stream with each piece of picture data constituting the secondary video stream. The control unit sets a transmittance in the overlay unit such that, among a plurality of pixels constituting a secondary video image, only such pixels that are lower in luminance than the chroma key upper limit value in the data block corresponding to the current play item information can transmit. This structure realizes a high-definition picture-in-picture because the metadata can define the overlay timing at the accuracy of 1/60 seconds when both parent-screen and child-screen images adopt 60P video streams.

This completes the description of the data structure of the removable medium.

Figure 16:
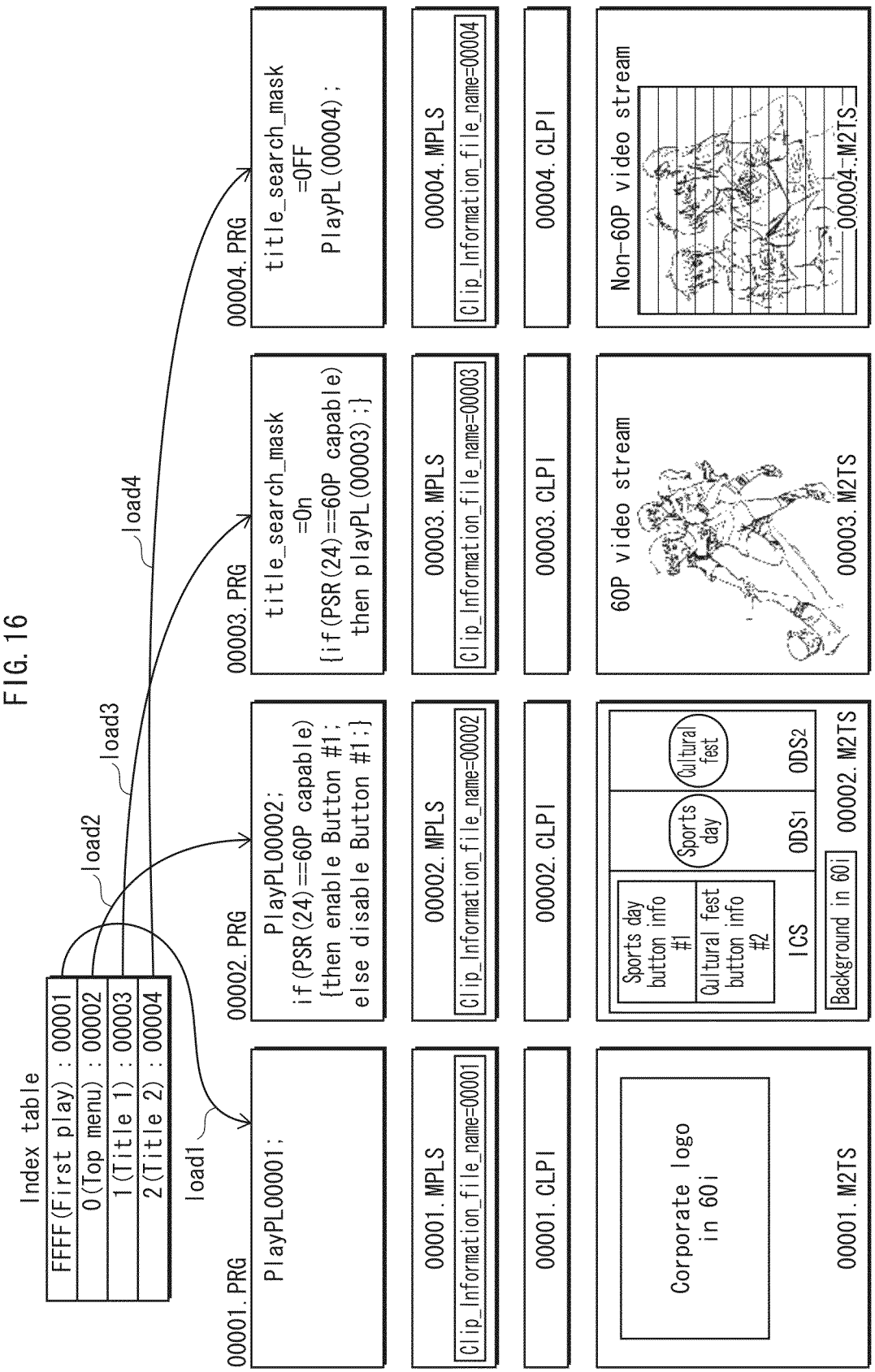
FIG. 16 illustrates specific settings of the data structures of the index table, program, and playlist information.

The following describes how parameters are set in the above-described data structure to realize the specific examples illustrated in FIGS. 6A-6D. To realize the top menu among the specific examples illustrated in FIGS. 6A-6D, two pieces of button information defining the sports day button for selection of the sports day title and the cultural fest button for selection of the cultural fest title are prepared. With regard to the sports day button among these, a correspondence is made between the playlist playback command and a command for judging whether or not the 60P capability is provided. FIG. 16 illustrates specific parameters that are set based on the above scheme.

FIG. 16 illustrates specific settings of the data structures of the index table, program, and playlist information. In the data structures illustrated in FIG. 16, the index table indicates correspondence between title numbers 0xFFFF, 0, 1 and 2 and program identifiers 00001-00004. A file "00001.M2TS" is a stream file representing a corporate logo of the 60i attribute and is combined with a file "00001.CLPI" to constitute a clip stream file. The file "00001.MPLS", with its "clip_information_file_name" set to 00001, defines a playback path corresponding to a digital stream "00001". A program "00001.PRG" specifies a stream playback to be performed in accordance with the playback path defined by "00001.MPLS" such that a playback by "00001.MPLS" is automatically started when the current title number is set to 0xFFFF, and the corporate logo of the 60i attribute is played back.

A title number "0" is made to correspond to "00002" which is the identifier of a program "00002.PRG". A file "00002.M2TS" includes: a video stream file representing a background image of the 60i attribute; and an interactive graphics stream. This interactive graphics stream includes: an object definition segment (ODS1); an object definition segment (ODS2); and an interactive control segment (ICS), wherein the ODS1 represents an oval pattern with a character sequence "Sports day", and the ODS2 represents an oval pattern with a character sequence "Cultural fest". This ICS includes button information #1 and #2, wherein the button information #1 specifies ODS1 as a normal-status graphics of the sports day button and #2, and the button information #2 specifies ODS2 as a normal-status graphics of the cultural fest button. The 60i attribute of the video stream represents the background of these buttons. The file "00002.CLPI" is combined with this file "00002.M2TS" to constitute an AV clip stream file. The file "00002.MPLS", with "00002", an identifier of a clip information file, described therein, defines a playback path corresponding to a digital stream of "00002.M2TS".

A command "PlayPL" included in "00002.PRG" is a navigation command instructing the playback device to perform a playback in accordance with "00002.MPLS". The "if" statement in "00002.PRG" causes the sports day button to be either "Enable" or "Disable" depending on whether the 60P capability is provided or not. Since "00002.PRG" corresponds to the title "0", when the current title number is set to "0", the program "00002.PRG" is executed to cause the sports day button to be either "Enable" or "Disable".

A file "00003.M2TS" has the 60P attribute, and is combined with clip information of "00003.CLPI" to constitute an AV clip stream file. A file "00003.MPLS", with its playlist version set to a predetermined value indicating 60P, defines a progressive picture playback at the frame rate of 60 Hz by a playback path of the 60P video attribute. On the other hand, a program "00003.PRG" includes "title_search_mask" and an if statement. The "title_search_mask" prohibits a direct search of title 1 that corresponds to "00003.PRG". The if statement includes a PlayPL command that allows "00003.MPLS" to be played back on the condition that the 60P capability is provided.

A file "00004.M2TS" is a stream file including a non-60P video stream, and is combined with clip information of "00004.CLPI" to constitute an AV clip stream file. A file "00004.MPLS" defines a playback path of the 60P video attribute. On the other hand, a program "00004.PRG" includes "title_search_mask" and an if statement. The "title_search_mask" prohibits a direct search of title 2 that corresponds to "00004.PRG". The if statement includes a PlayPL command that allows "00004.MPLS" to be played back on the condition that the 60P capability is provided.

With the above structure, when a stream file storing a 60P video stream is recorded, not only corresponding clip information file and playlist information instructing a progressive picture playback at the frame rate of 60 Hz, but also various data objects (the if statements in 00003.PRG and 00004.PRG) defining conditions for an interlace picture playback or a progressive picture playback at the frame rate of 24 Hz using a non-60P playback path are recorded in the BDMV format. A specific improvement provided by this specific example of the data structure is to restrict a supply of a stream file including a 60P video stream to a non-60P-supporting playback device, during the processes of, triggered by an input of a movie object, reading playlist information, reading a stream file and clip information file, and supplying a video stream to the video decoder.

The following describes a processing procedure to be described in the movie object of the top menu title when the top menu is structured.

Figure 17A:
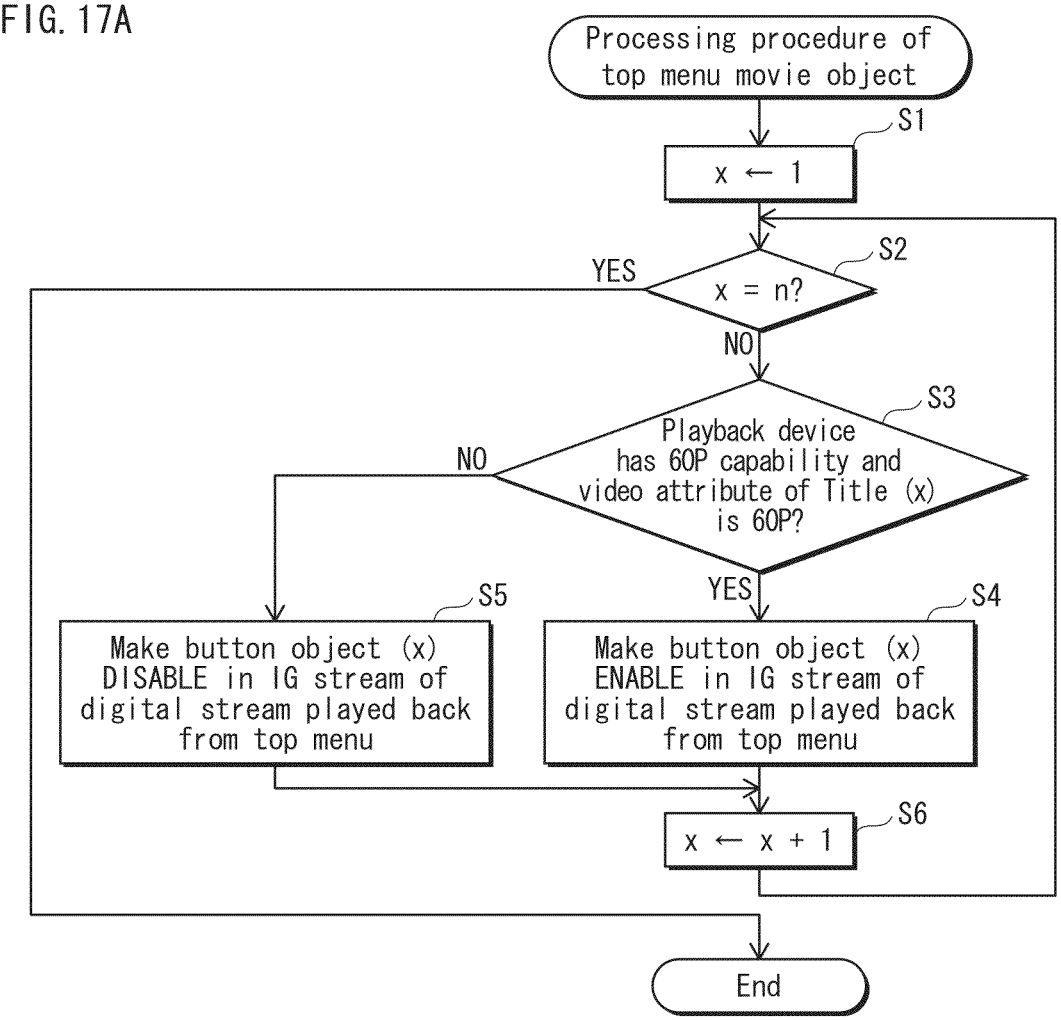
FIG. 17A is a flowchart indicating a processing procedure executed by a movie object corresponding to the top menu title.

FIG. 17A is a flowchart indicating a processing procedure executed by a movie object corresponding to the top menu title. In this flowchart, variable x is a control variable specifying each of a plurality of button objects that are present in the top menu, and the variable x also represents each of title numbers 1 to N in the index table.

In step S1, variable x is initialized to 1, and in step S2, it is judged whether or not x is equal to n. When it is judged that x is not equal to n (step S2: NO), the control proceeds to step S3 in which it is judged whether or not the playback device has the 60P capability and the video attribute of title (x) is 60P. When it is judged YES in step S3, the control proceeds to step S4 in which the button object (x) is made ENABLE in the IG stream of the digital stream played back from the top menu. When it is judged NO in step S3, the control proceeds to step S5 in which the button object (x) is made DISABLE in the IG stream of the digital stream played back from the top menu. Subsequently, variable x is incremented in step S6, and the control returns to step S2 to repeat the processes of steps S2 to S6. When it is judged in step S2 that x is equal to n, the process is ended.

Figure 17B:
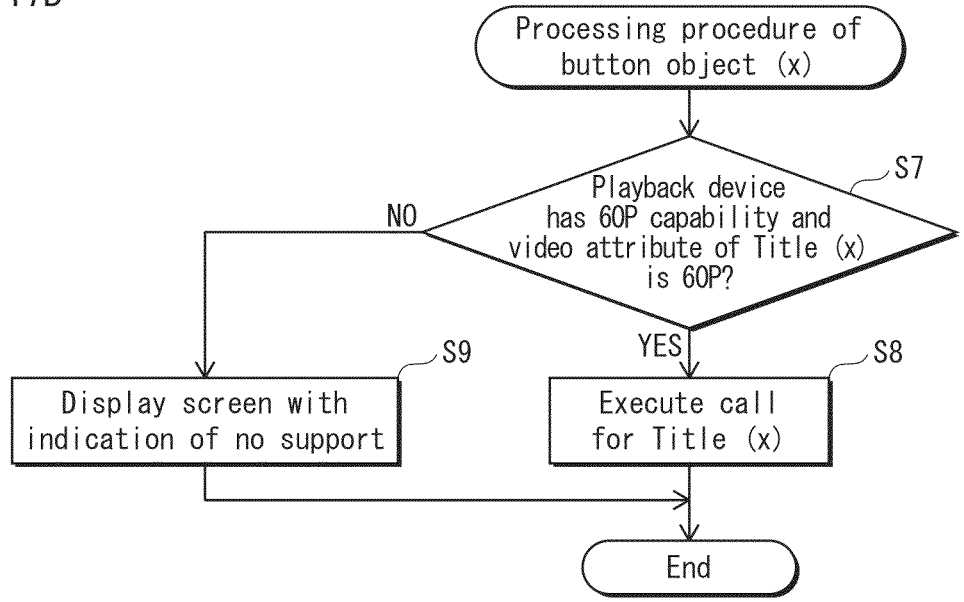
FIG. 17B is a flowchart indicating a processing procedure executed by a button object (x).

FIG. 17B is a flowchart indicating a processing procedure executed by a button object (x). In step S7, it is judged whether or not the playback device has the 60P capability and the video attribute of title (x) is 60P. When it is judged YES in step S7, the control proceeds to step S8 in which title (x) is called. When it is judged NO in step S7, the control proceeds to step S9 in which a screen with indication of no support is displayed.

The control of the top menu illustrated in FIG. 6 is realized by describing these processing procedures in (i) a movie object corresponding to the top menu title or (ii) a navigation command in the IG stream of the digital stream played back by the top menu title.

Figure 18:
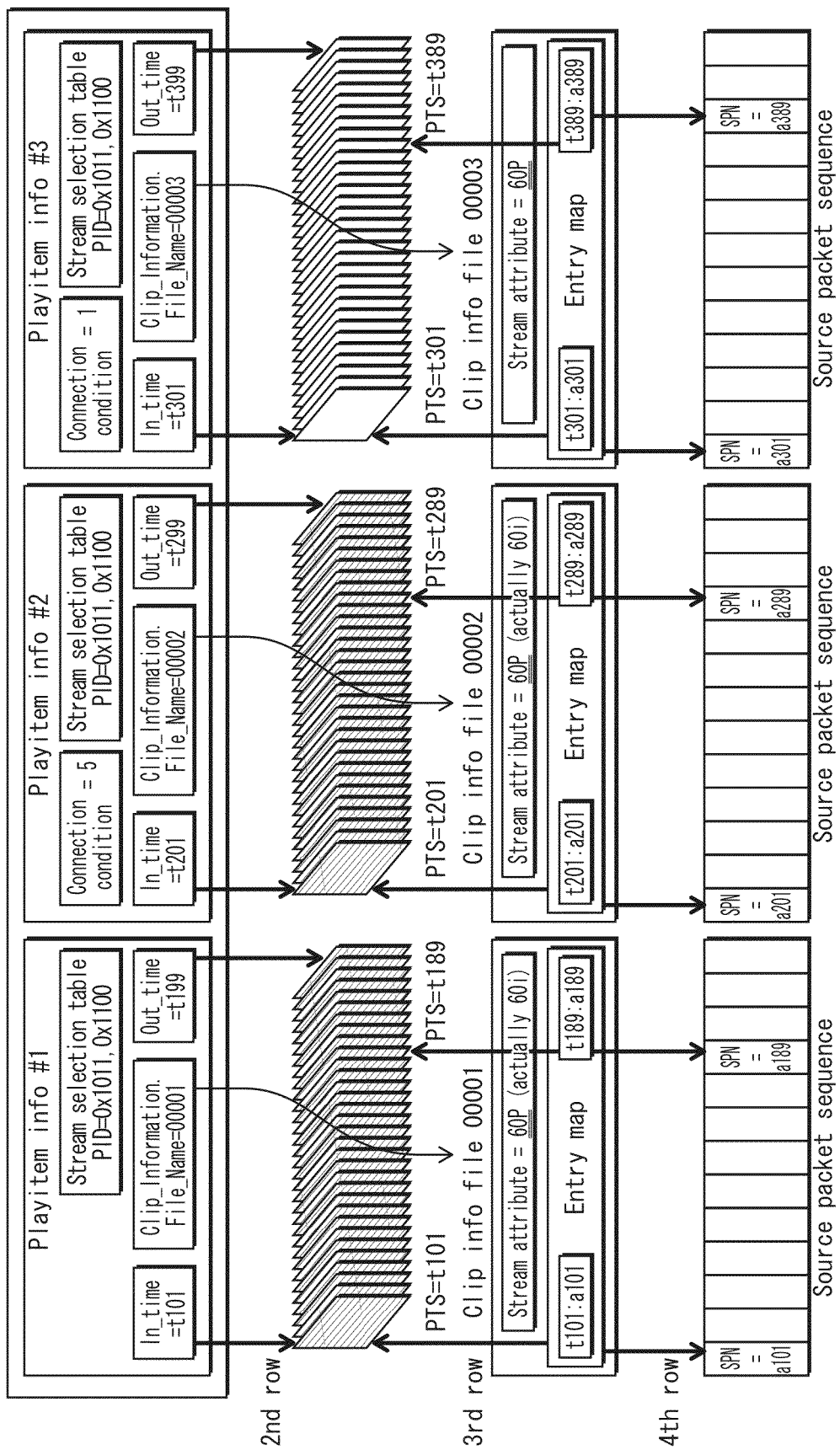
FIG. 18 illustrates parameter settings for generating a 60P playlist.

FIG. 18 illustrates parameter settings for generating a 60P playlist. The first row indicates playlist information composed of three pieces of playitem information #1, #2 and #3. The second row indicates two 60i video streams and one 60P video stream. The third row indicates three clip information files 00001-00003 that, in pairs with respective three stream files containing the three video streams of the second row, constitute three AV clip stream files. The fourth row indicates source packet sequences that constitute the stream files containing the video streams.

In the first row of FIG. 18, the version number of playlist information files (MPLS files) storing those playlist information is set to a predetermined value indicating "60P playlist". Also, each stream selection table in the playitem information #1-#3 includes PIDs 0X1011 and 0x1100. These PIDs are PIDs of the parent-screen video stream and an audio stream illustrated in FIG. 10. When the PIDs are described in the stream selection tables in the playitem information, the parent-screen video stream and the audio stream are permitted to be played back via all the playitems. With the above settings in the playitem information, the PIDs are described in the stream selection table, and the playback-permitted 60i video stream and 60P video stream are played back for a time period from In_Time to Out_Time.

In the case where the PTS of the first picture of the first GOP in the first video stream (a 60i video stream), which is on the left-hand side in the second row, is t101, the PTS of the first picture of the last GOP in the first 60i video stream is t189, the first source packet number of the first GOP of a plurality of GOPs constituting a stream file including this 60i video stream is a101 and the first source packet number of the last GOP of the plurality of GOPs constituting the stream file is a189, a correspondence "t101:a101" and a correspondence "t189:a189" are indicated in the entry map. Also, in the playitem information #1, In_Time is set to t101, Out_Time is set to t199, and clip_information_file_name is set to 00001.CLPI in correspondence with the third row.

In the case where the PTS of the first picture of the first GOP in the second video stream (a 60i video stream), which is in the middle of the second row, is t201, the PTS of the first picture of the last GOP in the second 60i video stream is t289, the first source packet number of the first GOP of a plurality of GOPs constituting a stream file including this 60i video stream is a201 and the first source packet number of the last GOP of the plurality of GOPs constituting the stream file is a289, a correspondence "t201:a201" and a correspondence "t289:a289" are indicated in the entry map. Also, in the playitem information #2, In_Time is set to t201, Out_Time is set to t299, and clip_information_file_name is set to 00002.CLPI.

In the case where the PTS of the first picture of the first GOP in the third video stream (a 60P video stream), which is on the right-hand side in the second row, is t301, the PTS of the first picture of the last GOP in the 60P video stream is t389, the first source packet number of the first GOP of a plurality of GOPs constituting a stream file including this 60P video stream is a301 and the first source packet number of the last GOP of the plurality of GOPs constituting the stream file is a389, a correspondence "t301:a301" and a correspondence "t389:a389" are indicated in the entry map. Also, in the playitem information #3, In_Time is set to t301, Out_Time is set to t399, and clip_information_file_name is set to 00003.CLPI.

In the above example case, although only the third video stream is a 60P video stream, the version number of the playlist information (MPLS file) storing the playlist information is set to a predetermined value that indicates "60P playlist". As a result, the stream attributes in all pieces of clip information are united to 60P in a virtual manner. However, in the actuality, the stream attributes of the video streams are 60i, 60i, and 60P, respectively. Since video streams whose playback permission is indicated in the playitem information #1 and #2 are 60i video streams, the connection_condition is set to "5" (seamless connection) in the playitem information #2. On the other hand, since video streams whose playback permission is indicated in the playitem information #2 and #3 have different video attributes, the connection condition is set to "1" (non-seamless) in the playitem information #3.

Although the above-described structure complies with the data structure defined in the BDMV format, the stream attribute in the clip information is set such that the playlist versions are unified to 60P in a virtual manner. With this structure, when a plurality of digital streams include one 60P stream, the whole playlist is treated as 60P. This makes it possible to allow the playback device to perform a playback on the condition that the 60P capability is provided therein.

The restrictions in the navigation level provided by the present embodiment include: (i) a restriction in the level of the index table that playlist information defining a 60i or 24P playback path is made to correspond to the first play title and top menu title; (ii) a restriction in the level of the control program that a playback of a playlist having the 60P video attribute is permitted on the condition that the 60P capability is provided; and (iii) a restriction in the level of the playlist information that the playlist versions of the playlists are set to a predetermined value indicating 60P when the playlist information constituting the playlist include at least one piece of playlist information that permits playback of a 60P video stream.

With the adoption of this hierarchical structure, it is possible to incorporate a digital stream, which displays a progressive picture at an optional frame rate, into the BDMV format.

As described above, according to the present embodiment, with the improvements made to the structural elements of the player and layer models based on an existing BDMV format, the playback device can execute the processes unique to the above embodiments. This makes it possible to incorporate the processes unique to the above embodiments into the playback device without modifying the basic structure of the playback device. This greatly reduces the number of processes required for the development of a playback device and accelerates the production of a playback device supporting the 60P video stream, thus making it possible to add momentum to the promotion thereof.

Embodiment 9

The present embodiment describes a specific structure of the playback device described in Embodiments 1 to 6. An aspect of the playback device having the specific structure is a playback device comprising: a reading unit configured to read an index table from a recording medium; a title number register storing a current title number which is a title number of a current title; an execution unit configured to execute a control program which is indicated in the index table as corresponding to the current title; and a playback unit configured to play back a video stream selected from a plurality of video streams as instructed by the execution unit, in accordance with one of a plurality of playback paths defined in playlist information, wherein, when a first play title or a top menu title is selected from among a plurality of titles, the playback unit executes a playback in accordance with a playback path defined with regard to a video stream that is composed of progressive pictures and has a mandatory frame rate or a video stream that is composed of interlace pictures, and when a general title other than the first play title or the top menu title is selected from among the plurality of titles, the playback unit judges whether the playback device has a capability to process the progressive pictures at an optional frame rate, and when the playback device has the capability, executes a playback in accordance with a playback path defined with regard to a video stream that is composed of progressive pictures and has the optional frame rate.

The format of the recording medium includes a movie recording format and an AV recording format. It is preferable for the reading unit to recognize a recording area to which the movie recording format is applied, and read the video stream, the playlist information, the control program, and the index table from the recording area.

The internal structure of the playback device disclosed in the present embodiment may include any of the problem solving means described in Embodiments 1 to 7, or a combination of two or more of the problem solving means described in Embodiments 1 to 7.

Describing all of the possible internal structures incorporating the problem solving means described in the above embodiments and combinations of two or more of the problem solving means described therein would require an enormous number of pages of the Description, and thus is not preferable. Thus, the following discloses an internal structure that includes all the problem solving means described in the above embodiments, as the representative thereof.

Figure 19:
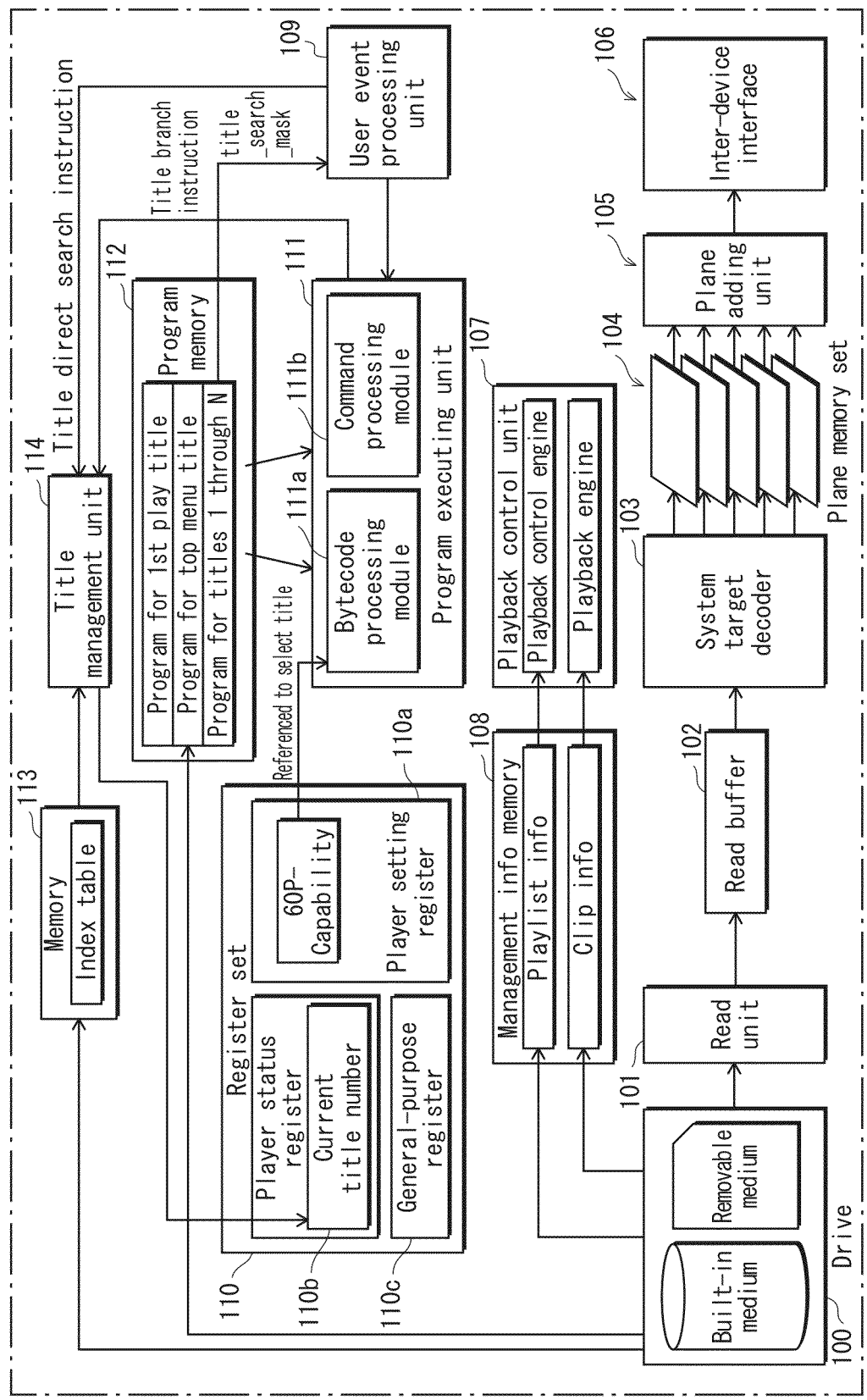
FIG. 19 illustrates the structure of a playback device 1001.

FIG. 19 illustrates the structure of a playback device 1002. The playback device includes a disc drive 100, a read unit 101, a read buffer 102, a system target decoder 103, a plane set memory 104, a plane adding unit 105, an inter-device interface 106, a playback control unit 107, a management information memory 108, a user event processing unit 109, a program executing unit 111, a program memory 112, an index memory 113, and a title management unit 114.

The disc drive 100, as is the case with an ordinary disc drive, read data from the Blu-ray ReadOnly disc, Blu-ray Recording disc, and Blu-ray REwritable disc based on a request from the playback control unit 107.

The read unit 101 executes reading from a loaded recording medium. The read unit 101 also executes a random access from an arbitrary time point on a time axis of the video stream. More specifically, when instructed to play back a stream from an arbitrary time point on the time axis of the video stream, the read unit 101 searches a source packet number of an access unit corresponding to the arbitrary time point, by using an entry map. With this search, the read unit 101 identifies a source packet number of a source packet that stores an access unit delimiter of the access unit. The read unit 101 then read and decode data based on the source packet number. When executing a scene jump, the read unit 101 executes a random access by executing the above search using the time information indicating the branch destination.

The read buffer 102 stores source packets read from the disc drive 100.

The system target decoder 103 performs a demultiplexing process onto the source packets read into the read buffer 102, and decodes streams.

The plane set memory 104 is composed of a plurality of plane memories. These plane memories constitute a layer model, and the storage contents of these plane memories are overlaid with each other by the layer overlay. A grayscale bit sequence of one screen of non-compressed image is written to these plane memories. The writing of the bit sequence is performed when a playback start time indicated by the presentation time stamp of each access unit arrives.

The plane adding unit 105 performs layer overlays in the plurality of plane memories. The layer overlay is realized by executing a superimposing process onto all combinations of the two layers in the layer model. In the superimposing process, pixel values of pixel data stored in the plane memories between layers are superimposed. The plane adding unit 105 realizes the layer overlay by executing a superimposing process onto all combinations of the two layers in the layer model. In the superimposing process, pixel values of pixel data stored in the plane memories between layers are superimposed.

The superimposing between layers is performed as follows. A transmittance α as a weight is multiplied by a pixel value in unit of a line in the plane memory of a certain layer, and a weight of (1−transmittance α) is multiplied by a pixel value in unit of a line in the plane memory of a layer below the certain layer. The pixel values with these luminance weights are added together. The resultant pixel value is set as a pixel value in unit of a line in the layer. The layer overlay is realized by repeating this superimposing between layers for each pair of corresponding pixels in unit of a line in adjacent layers in the layer model.

The inter-device interface 106 transits to a data transfer phase via a negotiation phase, when a connection with another device in the home theater system is made via an interface, and performs data transmission/reception in the data transfer phase. In the negotiation phase, the 60P capability (including the decode capability, playback capability, and display frequency) of the partner device is grasped, and the capability is set in the player setting register so that the transfer method for the succeeding data transfers is determined. The negotiation phase includes a mutual authentication phase. In this negotiation phase, the information indicating whether or not the display device has the 60P capability is set in the player setting register. After this negotiation phase, one line of the pixel data in the non-compression/plaintext format in the picture data after the layer overlay is transferred to the display device at a high transfer rate in accordance with the horizontal sync period of the display device. On the other hand, in the horizontal and vertical blanking intervals, audio data in the non-compression/plaintext format is transferred to other devices (including an amplifier and a speaker as well as the display device) connected with the playback device. With this structure, the devices such as the display device, amplifier and speaker can receive the picture data and audio data both in the non-compression/plaintext format, and a reproduced output is achieved. Furthermore, when the partner device has the decode capability, a pass-through transfer of the video and audio streams is possible. In the pass-through transfer, it is possible to transfer the video stream and audio stream in the compressed/encrypted format, as they are.

The playback control unit 107 has a function to control the progressive picture playback at the frame rate of 60 Hz, the progressive picture playback at the frame rate of 24 Hz, and the interlace picture playback, by controlling the drive 100 and the system target decoder 103. The playback control unit 107 controls the progressive picture playback or the interlace picture playback by interpreting the playlist information based on an instruction to perform a progressive picture playback at the frame rate of 60 Hz, a progressive picture playback at the frame rate of 24 Hz, or an interlace picture playback from the program executing unit 111, or a notification from the user event processing unit 109. To perform the above controls, the playback control unit 107 includes a playback control engine for interpreting the playlist information, and a playback engine for playing back a digital stream.

The management information memory 108 stores, among a plurality of pieces of playlist information and clip information recorded on the recording medium, processing targets of the playback control unit 107 (the current playlist information and the current clip information).

The user event processing unit 109, in response to a user operation that is input via a remote control, requests the program executing unit 111 or the playback control unit 107 to execute a process. For example, when the user presses a button on the remote control, the user event processing unit 109 requests the program executing unit 111 to execute a command corresponding to the button. For example, when a fast forward/rewind button on the remote control is pressed, the user event processing unit 109 requests the playback control unit 107 to execute a fast forward/rewind process onto a digital stream of a playlist that is currently played back. When the user presses a numeral key, the user event processing unit 109 refers to the title_search_mask flag of the program file that is made to correspond to the title number of the numeral key in the index table. When the title_search_mask flag is set OFF, the user event processing unit 109 outputs a user operation (UO) signal indicating a numeral value corresponding to the numeral key to the title management unit 114. The title management unit 114, upon receiving the UO signal, writes the numeral value indicated by the UO signal into the title number register as a new current title number. With this operation, the current title number is changed to a new one, and a program file corresponding to the new current title number is executed. On the other hand, when the title_search_mask flag is set ON, the user event processing unit 109 does not output a UO signal indicating a numeral value corresponding to the numeral key to the title management unit 114. With this operation, the current title number does not change. When the title_search_mask flag is set ON, even if a numeral key is pressed, a change to a title of the title number corresponding to the numeral key does not occur in a program file that instructs to play back progressive pictures at the frame rate of 60 Hz.

The register set 110 includes a plurality of player status registers 110*a*, a plurality of player setting registers 110*b*, and a general-purpose register 110*c*. Each of the player status registers and player setting registers has a word length of 32 bits, each 32-bit register is assigned with a register number, and a register to be accessed is identified by the register number.

The player status register (PSR) 110*a* is reset to initial values when an optical disc is loaded, and the validity of the stored values is checked when the status of the playback device changes, such as when the current playitem is changed. The values that can be stored in the player status register include a current title number, current playlist number, current playitem number, current stream number, current chapter number, and so on. The values stored in the player status register are temporary values because the player status register is reset to initial values each time an optical disc is loaded. The values stored in the player status register become invalid when the optical disc is ejected, or when the playback device is powered off.

The player setting register (PSR) 110*b* differs from the player status register in that it is provided with power handling measures. With the power handling measures, the values stored in the player setting register are saved into a nonvolatile memory when the playback device is powered off, and the values are restored when the playback device is powered on. The values that can be set in the player setting register include: various configurations of the playback device that are determined by the manufacturer of the playback device when the playback device is shipped; various configurations that are set by the user in accordance with the set-up procedure; and the 60P capability of a partner device which is detected through negotiation with the partner device, which is for example a TV system, stereo, amplifier or the like, when the device is connected with the partner device. The system parameters (SPRM) that can be set in the player status register and player setting register include the following.

SPRM (0): Language Code
SPRM (1): Primary audio stream number
SPRM (2): Subtitle stream number
SPRM (3): Current angle number
SPRM (4): Current title number
SPRM (5): Current chapter number
SPRM (6): Program number
SPRM (7): Current playitem number
SPRM (8): Selected key information
SPRM (9): Navigation timer
SPRM (10): Playback time information
SPRM (11): Mixing mode for Karaoke
SPRM (12): Country information for parental management
SPRM (13): Parental level
SPRM (14): Player configuration value (video)
SPRM (15): Player configuration value (audio)
SPRM (16): Language code for audio stream
SPRM (17): Language code extension for audio stream
SPRM (18): Language code for subtitle stream
SPRM (19): Language code extension for subtitle stream
SPRM (20): Player device region code
SPRM(21): Child-screen video stream number
SPRM (22): Secondary audio stream number
SPRM (23): Playback status
SPRM (24): 60P playback capability
SPRM (29): 50P playback capability Among these, SPRM(4) is a title number register for storing a current title number. Also, SPRM(7) is a playitem number register for storing a current playitem number, and SPRM (24) is a 60P capability register indicating the 60P capability.

SPRM(10) is a current playback time counter, and is updated each time picture data belonging to a digital stream is displayed. That is to say, when the playback device displays new picture data, SPRM(10) is updated to a value indicating the presentation time (PTS) of the new picture data. By referring to SPRM(10), it is possible to recognize the stream playback time point in the current playback path.

The "language code for audio stream" in SPRM (16) and "language code for subtitle stream" in SPRM (18) indicate the current language setting, can be set via the setup menu when the player device draws the setup menu using an on-screen display, and indicate a default language code of the player device. For example, the control program file may have the following function. Namely, when a playlist is played back while English is set as the "language code for audio stream" in SPRM (16), the stream selection table of the playitem is searched for a stream entry having the same language code and the corresponding audio stream is selected and played back. Furthermore, the playback control unit 107 checks the status of the system parameter while playback is performed. The SPRM (1), SPRM (2), SPRM (21) and SPRM (22) indicate the audio stream number, subtitle stream number, child-screen video stream number and secondary audio stream number, respectively. These values correspond to the stream selection number 606. For example, suppose that the audio stream number SPRM (1) is changed by the program execution unit 111. Then the playback control unit 107 makes a comparison between the stream section number 606 and the stream selection table 605 of the playitem currently being played back, refers to the matching stream entry 609, and switches audio streams to be played back. In this way, it is possible to change the audio, subtitle or child-screen video stream to be played back.

The general-purpose register (GPR) 110c is a hardware resource for storing values that are to be used as operands when the MPU of the playback device performs an arithmetic operation or a bit operation. Programs are prohibited to write values into the player status register, but are allowed to write values into the general-purpose register.

A value of an arbitrary bit range [bx:by] in a 32-bit sequence stored in a general-purpose register of a predetermined register number is treated as a player variable (general purpose parameter: GPRM) that is a variable of an operation system in which a program runs.

When a current title number is newly selected, the program executing unit 111 reads a control program corresponding to the current title number, and executes a navigation command included in the control program. The command executing module 111a includes a command interpreter, and performs the control of the HDMV mode by decoding and executing a navigation command constituting a movie object. The byte code executing module 111b is a platform unit of a so-called Java™ virtual machine. The byte code executing module 111b converts (i) the byte codes constituting the BD-J application stored in the heap memory and (ii) the byte codes constituting the system application, into native codes, and causes the MPU to execute the native codes. Upon receiving a title search operation from a user, the command executing module 111a and the byte code executing module 111b refer to the mask flag of the control program corresponding to the title number specified by the title search operation, and when the flag is set to indicate "unmasked", execute the code of the control program corresponding to the title number specified by the title search operation.

The program memory 112 stores a control program that is a target of execution by the program executing unit 111.

The index memory 113 is a memory into which the index table is read when a disc medium is loaded in the playback device.

The title management unit 114 selects a title as the current title based on the playback device status or a user operation from among a plurality of titles defined in the index table, and stores the title number of the selected title into the current title number register, which is one of player status registers. The title management unit 114 also selects a control program corresponding to the current title number, and instructs the navigation command execution module and the bytecode execution module to set the selected control program as a processing target. When the 60P capability register indicates that the 60P capability is provided, a title number of a title corresponding to a 60P playback path is set in the title number register.

Figure 20:
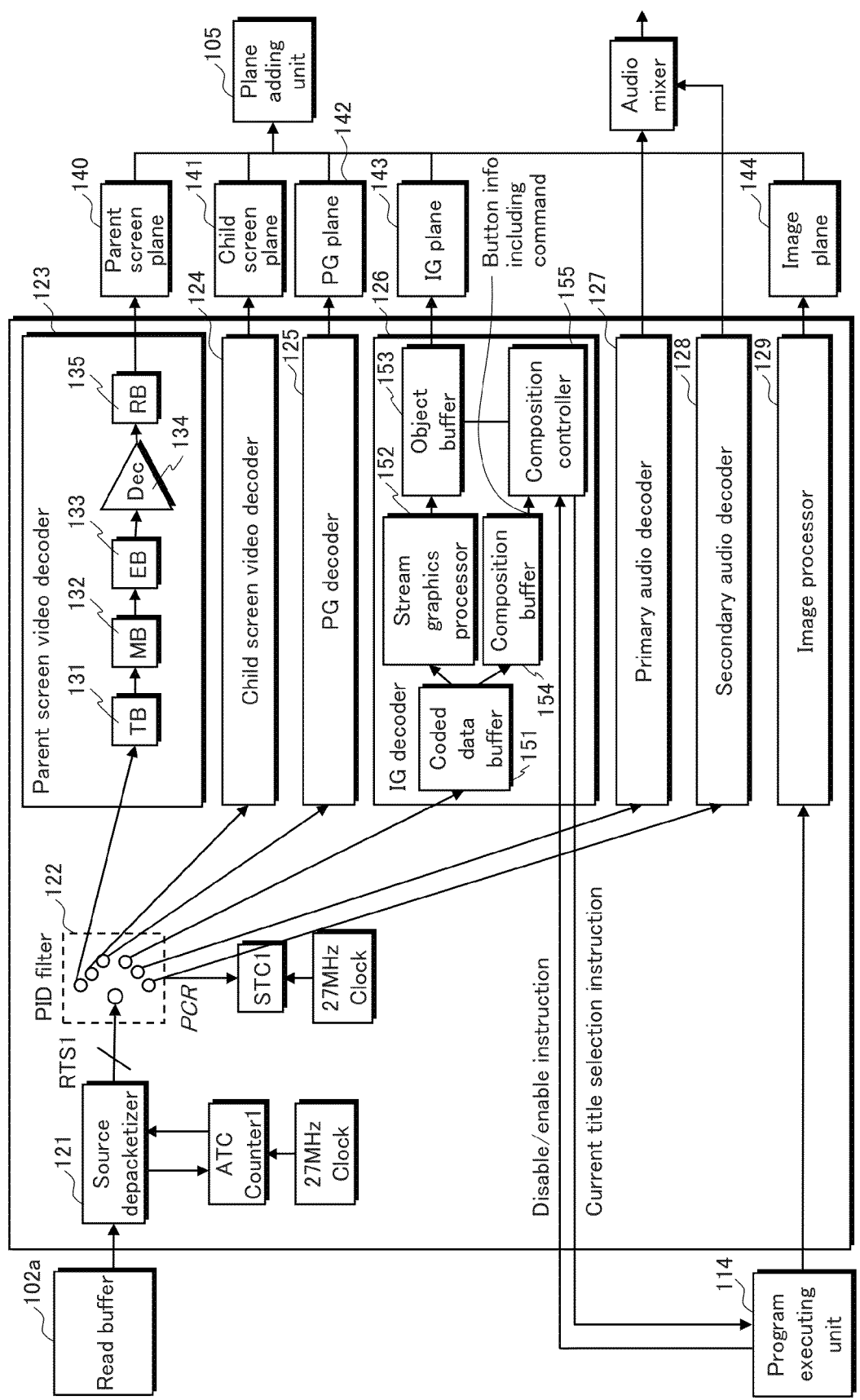
FIG. 20 illustrates the internal structure of the system target decoder 103.

The following describes the internal structure of the system target decoder 103 with reference to FIG. 20. In FIG. 20, reference signs in a range from 121 to 129 are assigned to structural elements of the system target decoder 103 for the sake of understanding. More specifically, the system target decoder 103 includes a source depacketizer 121, a PID filter 122, a parent-screen video decoder 123, a child-screen video decoder 124, a PG decoder 125, an IG decoder 126, a primary audio decoder 127, a secondary audio decoder 128, and an image processor 129.

The source depacketizer 121 interprets a source packet stored in the read buffer 102a, extracts a TS packet, and sends the TS packet to the PID filter 122.

The PID filter 122 is a demultiplexing unit and demultiplexes, from a digital stream, an elementary stream whose playback is permitted in the stream selection table in the playitem information of the current playitem. As a result, the PID filter 122 transfers, among TS packets having been output from the source depacketizer, a TS packet having a PID that matches a PID required for playback, to any of the video decoder, child-screen video decoder, IG decoder, PG decoder, audio decoder and secondary audio decoder, based on the PID of the TS packet. For instance, in the case of the Blu-ray ReadOnly disc, a TS packet having a PID 0x1011 is transferred to the parent-screen video decoder, TS packets having PIDs 0x1B00 to 0x1B1F are transferred to the child-screen video decoder, TS packets having PIDs 0x1100 to 0x111F are transferred to the primary audio decoder, TS packets having PIDs 0x1A00 to 0x1A1F are transferred to the secondary audio decoder, TS packets having PIDs 0x1200 to 0x121F are transferred to the PG decoder, and TS packets having PIDs 0x1400 to 0x141F are transferred to the IG decoder.

The parent-screen video decoder 123 is an MPEG4-AVC video decoder that decodes picture sequences of various video formats such as 60i, 24P and 60P.

The child-screen video decoder 124 has the same structure as the parent-screen video decoder. The child-screen video decoder 124 performs decoding of an input child-screen video stream, and writes resultant pictures to the child screen at the timings of display times (PTS).

The PG decoder 125 extracts a presentation graphics stream from TS packets input from the source packetizers, decodes the presentation graphics stream, and writes the resultant decompressed graphics data to the PG plane at the timing of display times (PTS).

The IG decoder 126 extracts an interactive graphics stream from TS packets input from the source packet depacketizers, decodes the interactive graphics stream, and writes the resultant decompressed graphics data to the IG plane at the timing of display times (PTS).

The primary audio decoder 127 has a buffer. While accumulating data in the buffer, the primary audio decoder 127 removes information such as a TS header and a PES header, and performs audio stream decode processing to obtain decompressed LPCM-state audio data. The primary audio decoder 127 outputs the obtained audio data to the audio mixer at the timings of playback times (PTS). Possible compression encoding formats of the audio stream multiplexed on the digital stream include AC3 and DTS, and therefore the decoding scheme used to decode the compressed audio is changed in accordance with the stream attributes.

The secondary audio decoder 128 has the same structure as the primary audio decoder. The secondary audio decoder 128 performs decoding of an input secondary audio stream, and outputs resultant decompressed LPCM-state audio data to the audio mixer at the timing of display times. Possible compression encoding formats of the audio stream multiplexed on the digital stream include DolbyDigitalPlus and DTS-HD LBR, and therefore the decoding scheme used to decode the compressed audio is changed in accordance with the stream attributes.

The audio mixer 128a mixes (superimposes) the decompressed audio data output from the primary audio decoder and the decompressed audio data output from the secondary audio decoder with each other, and outputs the resultant audio to a speaker or the like.

The image processor 129 decodes graphics data (PNG, JPEG) transferred from the program execution unit, and outputs the resultant decoded graphics data to the image plane in accordance with a display time designated by the program execution unit.

The following describes the internal structure of the parent-screen video decoder 123. In FIG. 20, reference signs in a range from 131 to 139 are assigned to structural elements of the parent-screen video decoder 123 for the sake of understanding. More specifically, the video decoder includes a TB 131, an MB 132, an EB 133, a decoder core 134, and an RB 135.

The TB (Transport Buffer) 131 is a buffer that, when a TS packet including a video stream is output from the PID filter 122, stores the TS packet temporarily as it is.

The MB (Muliplexed Bufffer) 132 is a buffer that, when a video stream is output from the TB 131 to the EB 133, stores PES packets temporarily. When data is transferred from the TB 131 to the MB 132, the TS header of each TS packet is removed.

The EB (Elementary Buffer) 133 is a buffer that stores a video access unit in an encoded state. When data is transferred from the MB 132 to the EB 133, the PES header is removed.

The decoder core 134 creates a frame/field image by decoding each video access unit in a video stream at a predetermined decoding times (DTS). Possible compression encoding formats of the video stream multiplexed on the digital stream include MPEG2, MPEG4-AVC, and VC1, and thus the decoding scheme used by the decoder core 134 can be changed based on the stream attributes. The decoder core 134 transfers each of the decoded frame/field images to the RB 139, and transfers the decoded frame/field images to the picture switch at the timing of display times (PTS). When it processes the 60P, the decoder core performs the above-described processes at the decode timing and playback timing defined by a time interval such as $\frac{1}{60}$ seconds.

The RB (Re-order Buffer) 135 is a buffer that stores the decoded frame/field images temporarily. The decoder core 134 makes use of the RB 135 to, when decoding the video access units (e.g., a P-picture and a B-picture encoded by the inter-picture predictive encoding), refer to pictures that have already been decoded. In the 60P video, one GOP is composed of 60 pictures. Accordingly, the size of the RB is of such an order that can store 60×n (n is an integer of 1 or greater) reference pictures.

The following describes the internal structure of the plane memory set. In FIG. 20, reference signs in a range from 141 to 149 are assigned to structural elements of the plane memory set for the sake of understanding. More specifically, the plane memory set includes a parent-screen video plane 140, a child-screen video plane 141, a PG plane 142, an IG plane 143, and an image plane 144.

The parent-screen video plane 140 stores decompressed picture data for the parent-screen video that is obtained by decoding the parent-screen video stream.

The child-screen video plane 141 stores decompressed picture data for the child-screen video that is obtained by decoding the child-screen video stream.

The PG plane 142 stores decompressed graphics data that is obtained by decoding the presentation graphics stream.

The IG plane 143 stores decompressed graphics data that is obtained by decoding the interactive graphics stream.

The image plane 144 stores a decompressed image that is obtained by decoding image data in a format such as JPEG, PNG, or GIF.

The following describes the internal structure of the IG decoder. In FIG. 20, reference signs in a range from 151 to 159 are assigned to structural elements of the IG decoder for the sake of understanding. More specifically, the IG decoder includes a coded data buffer 151, a stream graphics processor 152, an object buffer 153, a composition buffer 154, and a composition controller 155.

The coded data buffer 151 stores functional segments read from the IG stream.

The stream graphics processor 152 obtains a graphics object by decoding the screen composition segment.

The object buffer 153 stores the graphics object obtained by the decoding.

The composition buffer 154 stores the screen composition segment.

The composition controller 155 decodes the screen composition segment stored in the composition buffer, and performs a screen composition on the graphics plane by using the graphics object stored in the object buffer, based on the control items included in the screen composition segment. The composition controller 155 receives a specification of the disable state or enable state for each button from the program executing unit 114. Upon receiving a specification for setting a button object to the disable state, the composition controller 155 does not write a graphics corresponding to the button object, or sets the emission color of the graphics to a dark tone during the color conversion process. Upon receiving a specification for setting a button object to the enable state, the composition controller 155 performs a color conversion in accordance with pallet data defined in the pallet definition segment of the graphics stream. The composition controller 155 writes the graphics obtained by the decoding, from the object buffer to the graphics plane. The status of a button object transitions when any of the MoveUp key, MoveDown key, MoveRight key and MoveLeft key is pressed while the button is in the enable state. When the Enter key is pressed, a navigation command included in a button object in the selected status is executed. When the navigation command is a branch command, a title number specified by an operand of the branch command is passed to the title management unit 114, so that the title number is set as the current title number. With this operation, the current title number set in the player setting register is replaced with the title number specified by the operand of the branch command. This completes the description of the internal structure of the display device.

The following describes the advantages provided by the above data structure to users, explained from the position of the users. In the following description, the above structural elements of the home theater system and specific image examples are used.

Figure 21:
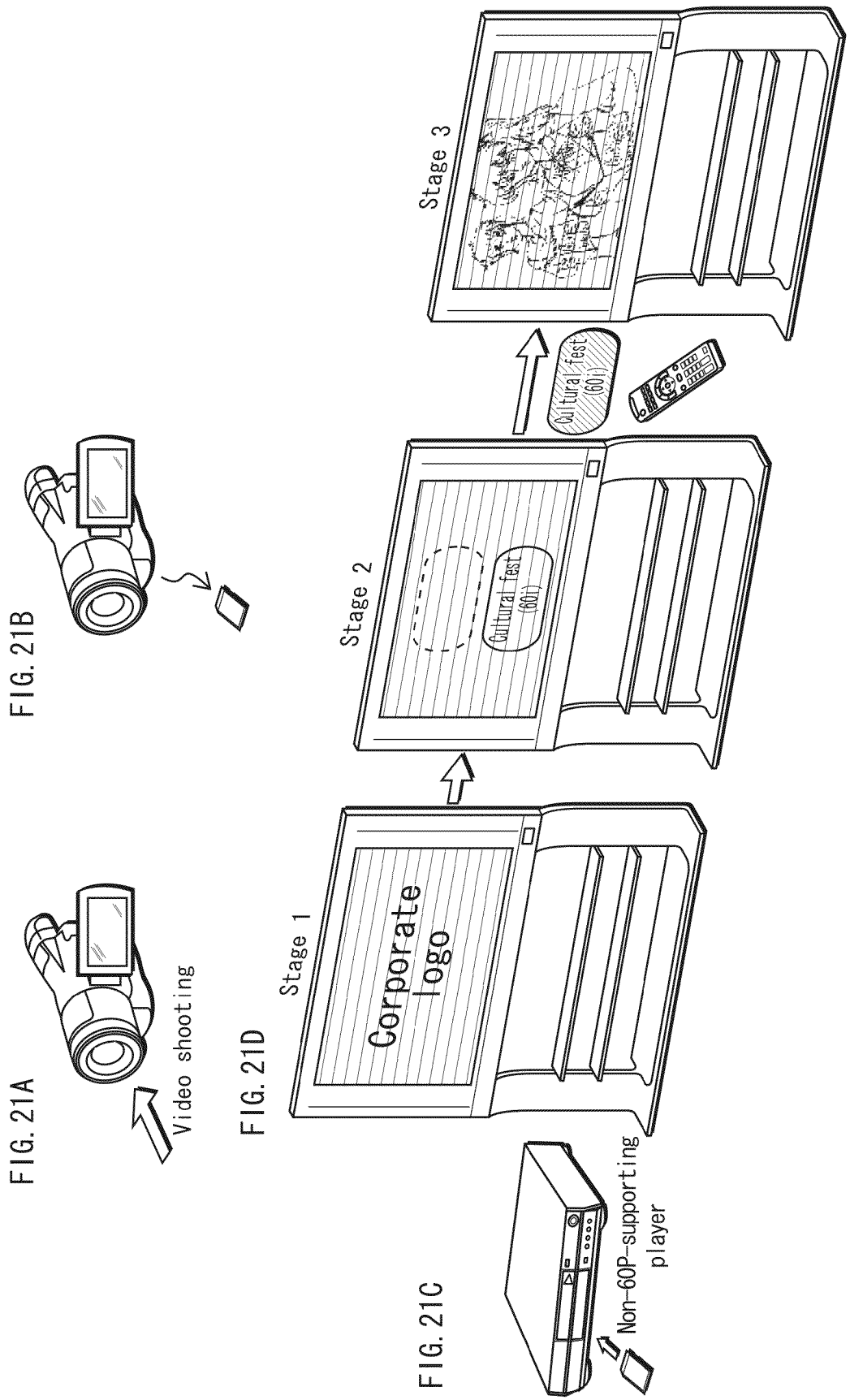
FIGS. 21A-21D illustrate a case where a video having been shot by a video camera is recorded on a removable medium and then supplied to a non-60P-supporting playback device.

FIG. 21 illustrates a case where a video having been shot by a video camera is recorded on a removable medium and then supplied to a non-60P-supporting playback device. FIG. 21A illustrates a video shooting process in which a video camera with the removable medium loaded therein is used. In this process, the above-described data structure is recorded on the removable medium. FIG. 21B illustrates removing of the removable medium, on which the data structure has been written, from the video camera. FIG. 21C illustrates loading of the removable medium into the non-60P-supporting playback device. FIG. 21D illustrates the screen transition after the removable medium is loaded in the non-60P-supporting playback device. The stage 1 is a state where a stream of the first play title is played back. The stage 2 is a state where a stream of the top menu title is played back. When an Enter operation is performed onto a button object in the stage 2, the control proceeds to the stage 3 in which interlace pictures are played back at the frame rate of 60 Hz.

With the above control program, the button object for 60P is set to the DISABLE state. This prevents the user from selecting the title 1 at an earlier stage when the top menu is presented.

Figure 22:
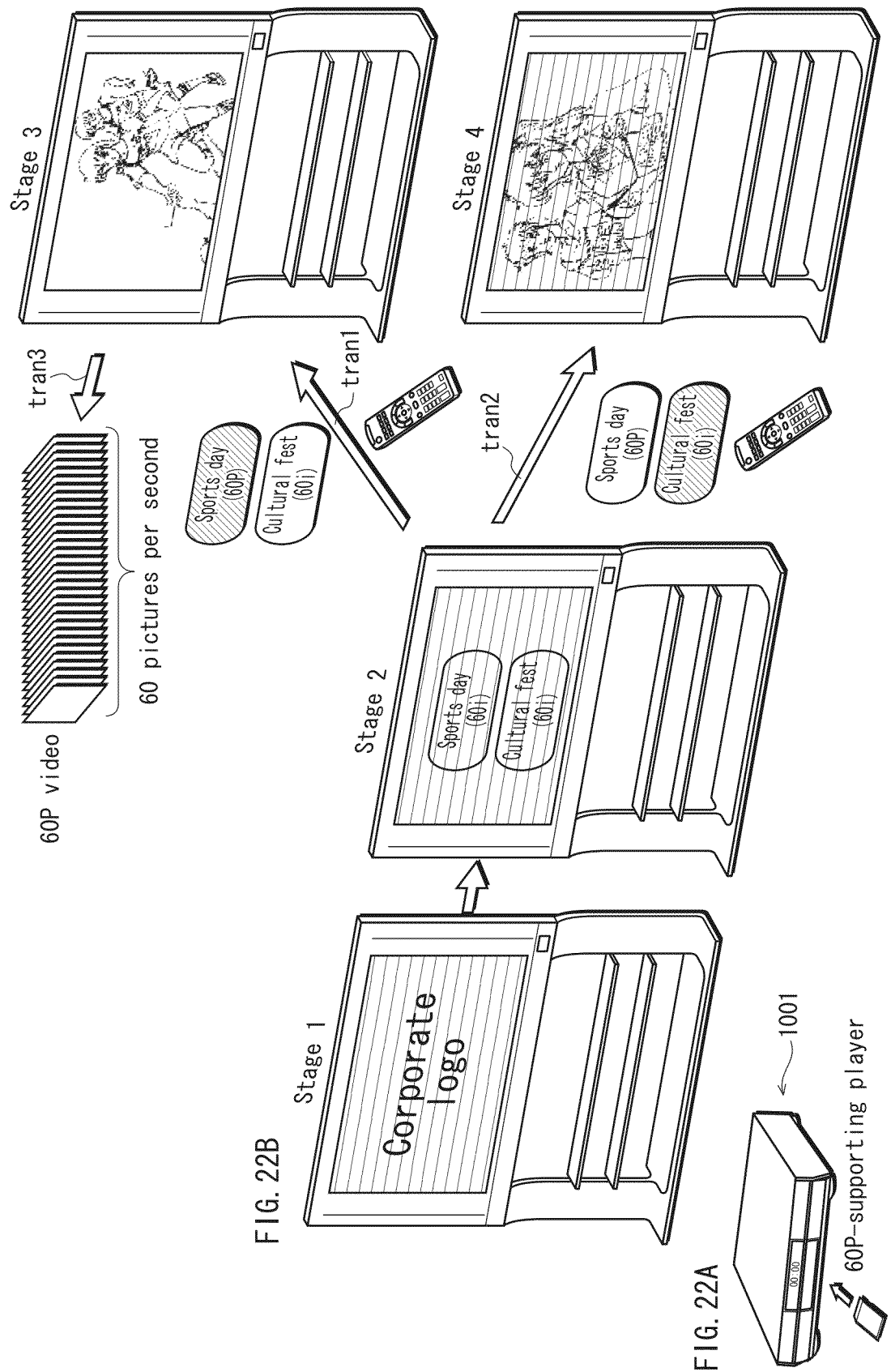
FIG. 22A and FIG. 22B illustrate a case where a removable medium is loaded into a 60P-supporting playback device.

FIG. 22 illustrates a case where a removable medium is loaded into a 60P-supporting playback device. FIG. 22A illustrates loading of the removable medium into the 60P-supporting playback device. FIG. 22B illustrates the screen transition after the removable medium is loaded in the 60P-supporting playback device. The stage 1 is a state where a corporate logo is displayed. The stage 2 is a state where the top menu is displayed. In this top menu, both the sports day button and the cultural fest button are set to the ENABLE state. The arrow tran1 indicates a transition triggered by an ENTER operation performed on the sports day button; and the arrow tran2 indicates a transition triggered by an ENTER operation performed on the cultural fest button. When an ENTER operation is performed on the sports day button, the state transitions to the stage 3 in which progressive pictures are played back at the frame rate of 60 Hz. The arrow tran3 in FIG. 22B indicates a playback of a 60P video stream on the display device. In this playback, images are displayed on the display device screen at the accuracy of 1/60 seconds, representing details of the movement of the runners on the screen, conveying the dynamics. When an ENTER operation is performed on the cultural fest button, the state transitions to the stage 4 in which progressive pictures are played back at the frame rate of 24 Hz or interlace pictures are played back.

When a removable medium, on which the above-described data structure is recorded, is loaded in a non-60P-supporting playback device, only the 60i playback is available, and when the removable medium is loaded in a 60P-supporting playback device, both 60i and 60P playbacks of streams according to the playback paths are available. This provides a fail-safe for loading of the removable medium in a non-60P-supporting playback device, thereby freeing the manufacturer from the burden of dealing with users who have loaded a removable medium, on which a 60P video stream is recorded, in a non-60P-supporting playback device.

Embodiment 10

The present embodiment describes a specific structure of the recording devices described in Embodiments 1 to 7.

The present embodiment provides, as an aspect of the recording device, a recording device comprising: a receiving unit configured to receive a selection of a high frame rate, which is a recording mode in recording progressive pictures at an optional frame rate; an encoder configured to, when the receiving unit has received a selection of the high frame rate, generate (i) a video stream that is composed of progressive pictures and has the optional frame rate and a video stream that is composed of progressive pictures and has a mandatory frame rate, or (ii) the video stream that is composed of progressive pictures and has the optional frame rate and a video stream that is composed of interlace pictures; a generating unit configured to generate a plurality of pieces of playlist information corresponding to the generated video streams, a plurality of control programs corresponding to the plurality of pieces of playlist information, and an index table; and a writing unit configured to write the generated video streams, the plurality of pieces of playlist information, the plurality of control programs, and the index table onto a recording medium, wherein when generating the index table, the generating unit makes each of a first play title and a top menu title among a plurality of titles to correspond to a control program that instructs to play back in accordance with a playback path defined with regard to the video stream that is composed of progressive pictures and has the mandatory frame rate or the video stream that is composed of interlace pictures, the generating unit makes each of one or more general titles that include neither the first play title nor the top menu title among the plurality of titles to correspond to a control program that instruct to play back in accordance with a playback path defined with regard to the video stream that is composed of progressive pictures and has the optional frame rate, and when generating the control program that is to be made to correspond to each of the one or more general titles, the generating unit embeds a control code, which instructs a playback device to play back the progressive pictures on a condition that the playback device has a capability to play back the progressive pictures at the optional frame rate, in each of the one or more control programs.

The formats available for the recording medium include a movie recording format and an AV recording format. When the receiving unit receives a selection of a high-frame-rate mode, the recording device may reserve, in the recording medium, a storage area to which the movie recording format is applied, and write the video streams, playlist information, control programs, and index table into the storage area.

The internal structure of the recording device disclosed in the present embodiment may include any of the problem solving means described in Embodiments 1 to 7, or a combination of two or more of the problem solving means described in Embodiments 1 to 7.

Figure 23:
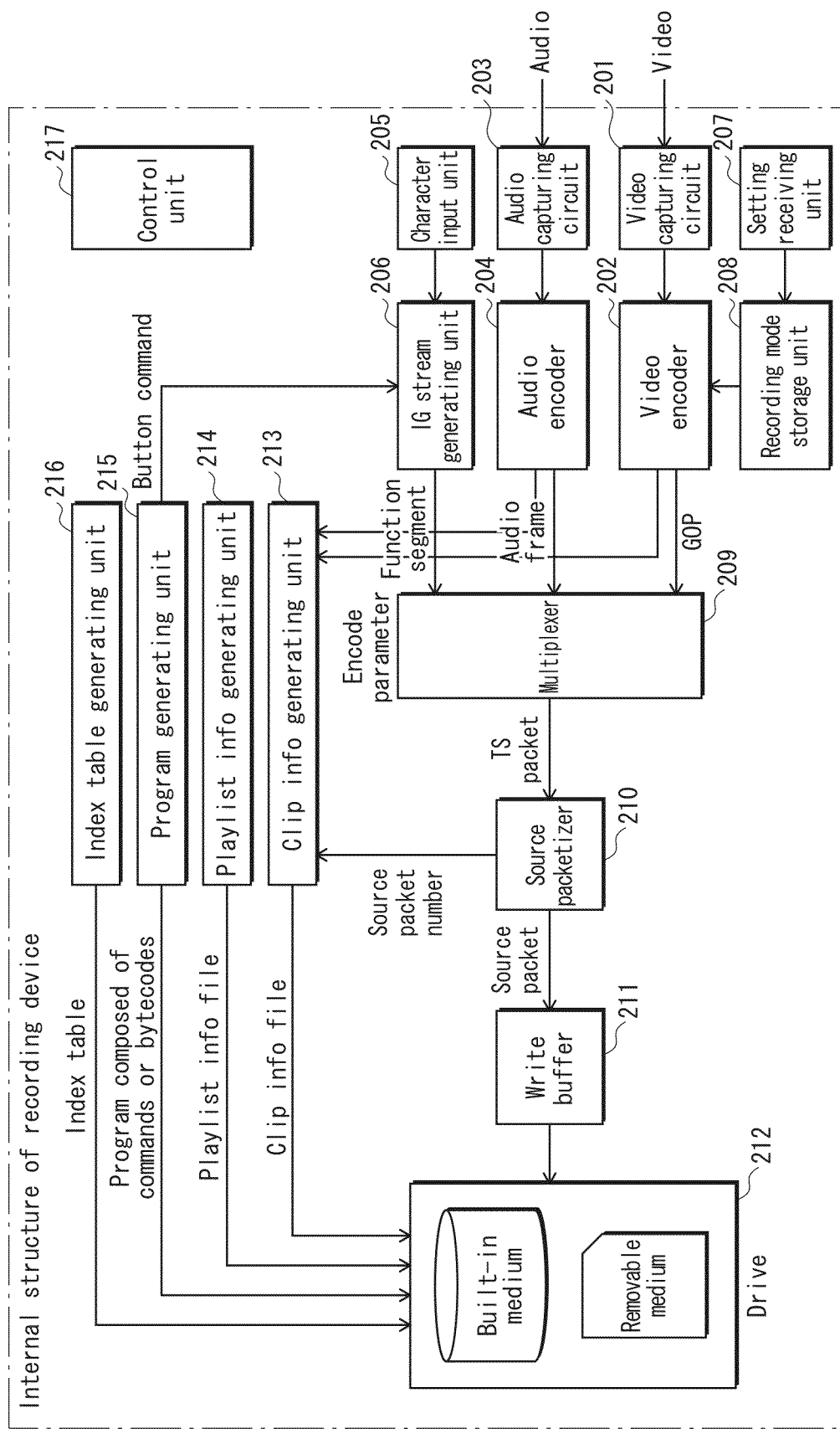
FIG. 23 illustrates the internal structure of the recording device.

Describing all of the possible internal structures incorporating the problem solving means described in the above embodiments and combinations of two or more of the problem solving means described therein would require an enormous number of pages of the Description, and thus is not preferable. Thus, the following discloses an internal structure that includes all the problem solving means described in the above embodiments, as the representative thereof. FIG. 23 illustrates the internal structure of the recording device.

As illustrated in FIG. 23, the recording device includes: a video capturing circuit 201 for receiving external light and outputting 60 progressive pictures and 60 interlace pictures per second; a video encoder 202 for encoding the pictures output from the video capturing circuit 201 in units of a second to generate a group of pictures that is a group of compressed picture data; an audio capturing circuit 203 for capturing external audio and outputting non-compressed audio data; an audio encoder 204 for encoding the non-compressed audio data; a character input unit 205 for receiving input of a character sequence to be displayed with a button object in the top menu; an IG stream generating unit 206 for generating a group of functional segments including, for example, a button on which the input character sequence is displayed; a multiplexer 209 for obtaining a TS packet sequence by multiplexing the group of pictures that is a compress-encoded video, the compress-encoded audio data, and the group of functional segments; a source packetizer 210 for converting each of the TS packets obtained by the multiplexer 209 into source packets; a write buffer 211 for storing source packets to be written to a recording medium; and a drive 212 for writing source packets to a removable medium and a built-in medium that are loaded therein.

Also, to generate information pertaining to the playback control, the recording device further includes: a clip information generating unit 213 for generating clip information which includes the entry map, sequence information, and stream attribute information, based on the encode parameters of the video and audio encoders and the first source packet number of the first GOP at the head of the group of pictures output from the source packetizer 210; a playlist information generating unit 214 for generating playlist information indicating the playback paths, by using the PTSs defining the playback times; a program generating unit 215 for generating a program that defines the disable/enable status of each button by using a value that is set in the player setting register indicating the 60P capability; an index table generating unit 216 for creating the index table and, each time a program is generated, adding an index, which defines the program and a title number, into the index table; and a control unit 217 for, each time a video stream is generated, generating and updating the clip information, playlist information, program, and index table, and performing a control to write the generated and updated clip information, playlist information, program, and index table onto the recording medium.

With the above structure, when a title name is input to the input unit 205 via the touch panel, the recording device writes, onto the recording medium in 60i or 24P, a first play title representing a corporate logo and a button object for receiving a selection of the title name.

The above recording device is assumed to perform the 1920×1080/60P recording when a special video shooting mode is selected in the recording device (by pressing the 1080/60P button). However, in the present embodiment, even if the 1920×1080/60P mode is selected, AV streams constituting the 60P playlist are recorded in the BDMV format, and the first play title and the top menu title are recorded in 60i or 24P.

Figure 24:
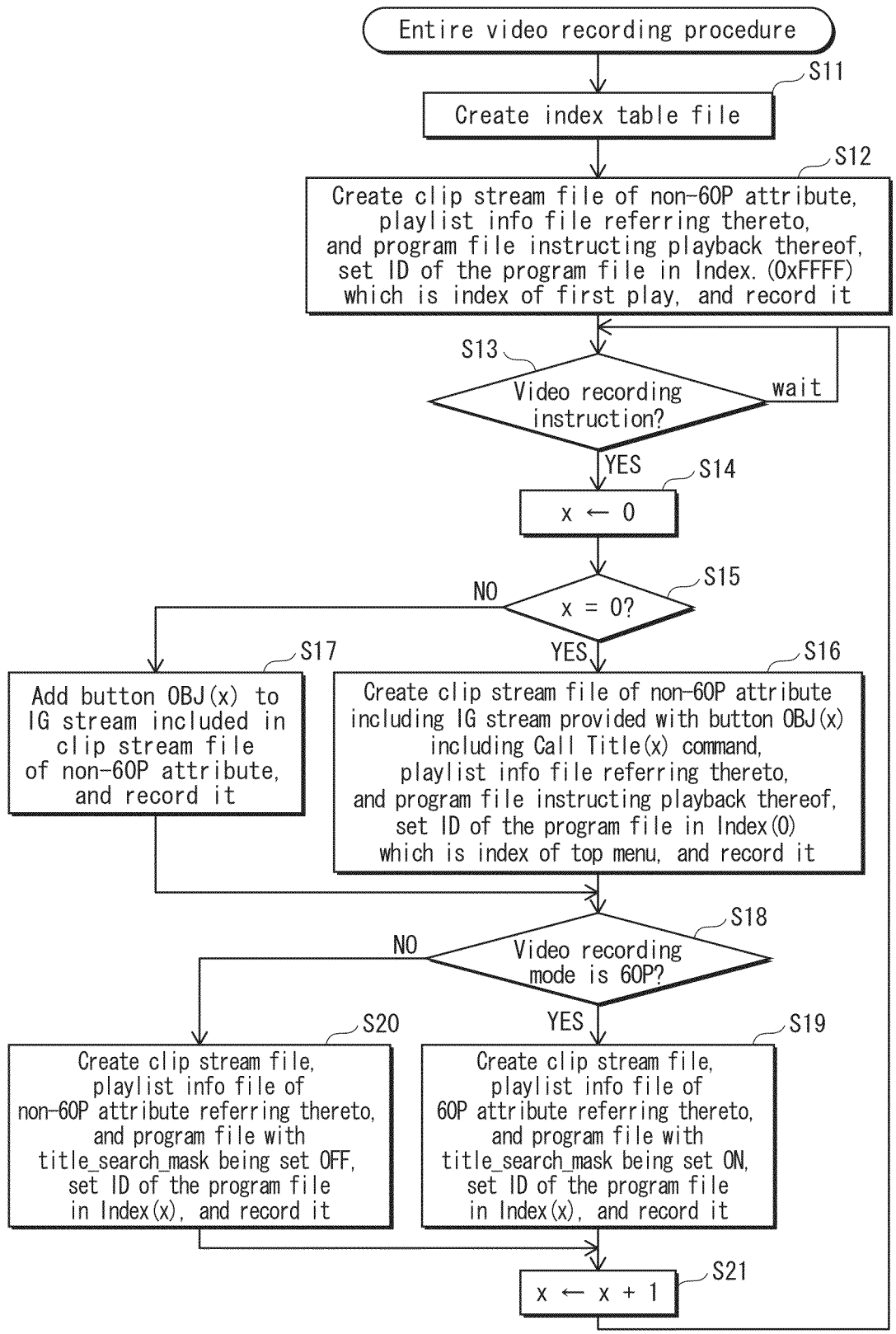
FIG. 24 is a flowchart illustrating the entire video recording procedure.

The recording device of the present embodiment can be manufactured industrially by using hardware integrated circuits such as ASICs that embody the above-described structural elements of the recording device. When general-purpose computer architectures such as CPU, code ROM, and RAM are adopted in the hardware integrated circuits, a program, in which processing procedures of the above-described structural elements are written in a computer code, may be embedded in the code ROM in advance, and the CPU in the hardware integrated circuits may be caused to execute the processing procedures of the program. The following describes processing procedures that are required in software implementation when general-purpose computer architectures are adopted. FIG. 24 is a flowchart illustrating the entire video recording procedure. In this flowchart, a variable (x) is a control variable for specifying a processing-target title. Thus, in the following flowchart, a title that is a processing target in the process of the $x^{th}$ round in the loop is denoted as a title (x).

In step S11, an index table is created. Subsequently, in step S12, a clip stream file storing a non-60P video stream, playlist information file referring thereto, and a program file instructing a playback of progressive pictures or interlace pictures at the frame rate of 24 Hz are created, the ID of the program file is set after the index of the first play title (0xFFFF) and these are recorded, and then the control proceeds to a loop of steps S13 to S21. In step S13, it is judged whether or not a recording instruction has been entered. When it is judged that a recording instruction has been entered, it is judged as YES in step S13 and the control proceeds to step S14. In step S14, the variable x is initialized to 0.

In step S15, it is judged whether or not the variable x is "0". When it is judged that the variable x is "0", the control proceeds to step S16 in which a clip stream file including an IG stream provided with a button object including a title call command instructing to call Title(x), playlist information referring thereto, and a program file are created, and the identifier of the program file is set in Index(0) which is the index of the top menu, and these are recorded. When it is judged that the variable x is not "0", the control proceeds to step S17 in which a button object (x) is added to an IG stream included in the non-60P clip stream file, and these are recorded.

In step S18, it is judged whether or not the video recording mode is 60P video stream. When it is judged that the video recording mode is 60P, the control proceeds to step S19 in which a 60P clip stream file, a playlist information file referring thereto, and a program file with title_search_mask being set ON are created, the identifier of the program file is set in Index(x), and these are recorded.

When it is judged that the video recording mode is not 60P, the control proceeds to step S20 in which a clip stream file including a non-60P video stream, a playlist information file referring thereto, and a program file with title_search_mask being set OFF are created, the identifier of the program file is set in Index(x), and these are recorded.

Figure 25:
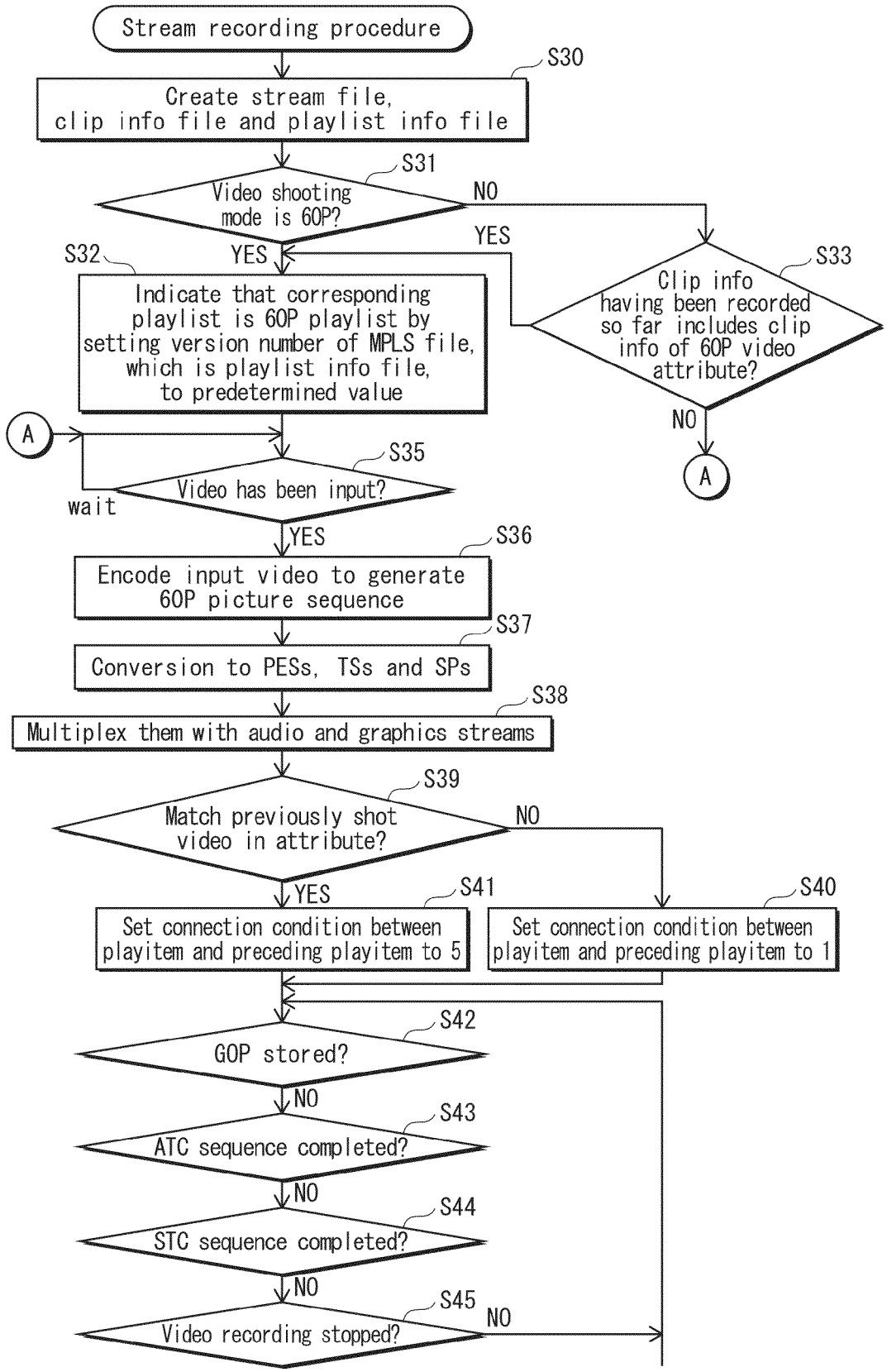
FIG. 25 is a flowchart illustrating the stream recording procedure.

FIG. 25 is a flowchart illustrating the stream recording procedure.

In step S30, a stream file, a clip information file and a playlist information file are created. Subsequently, in step S31, it is judged whether or not the recording mode is 60P. When it is judged that the recording mode is 60P, the control proceeds to step S32 in which the version number of an MPLS file, which is a playlist information file, is set to a predetermined value such that it is indicated that the corresponding playlist is a 60P playlist. With this operation, the whole playlist is treated as a 60P playlist if the video attribute of the current clip information file is 60P, even if the video attribute of all the clip information files having been recorded in the past is non-60P.

When it is judged in step S31 that the video attribute of the current clip information file is not 60P, the control proceeds to step S33 in which it is judged whether or not the clip information files having been recorded so far include a clip information file having the 60P video attribute. When it is judged that the clip information files having been recorded so far include a clip information file having the 60P video attribute, the control proceeds to step S32 in which the version number of an MPLS file, which is a playlist information file, is set to a predetermined value such that it is indicated that the corresponding playlist is a 60P playlist. With this operation, the whole playlist is treated as a 60P playlist if the clip information files having been recorded in the past include at least one clip information file whose video attribute is 60P even if the current clip information file is non-60P.

When the clip information files having been recorded in the past do not include a clip information file whose video attribute is 60P, the video attribute of a clip information file corresponding to the current piece of playitem information is set to 24P or 60i that are non-60P. Subsequently, the control proceeds to step S35.

In step S35, an input of video is waited. When it is judged in step S35 that video has been input, the control proceeds to steps S36-S48. The steps S36-S48 are performed as follows. The input video is encoded and converted into a 60P picture sequence (step S36). The picture sequence is converted to PES packets, TS packets, and source packets (step S37). The packets are multiplexed with audio and graphics streams (step S38), and the control proceeds to step S39. In step S39, it is judged whether or not the input video matches any of the previously shot videos in attribute. When it is judged that the input video does not match any of the previously shot videos in attribute, the control proceeds to step S40 in which the connection condition between the playitem and the preceding playitem is set to "1" (non-seamless). When it is judged that the input video matches a previously shot video in attribute, the control proceeds to step S41 in which the connection condition between the playitem and the preceding playitem is set to "5" (a seamless connection associated with a clean break). Subsequently, the control proceeds to a loop of steps S42-S45.

Figure 26:
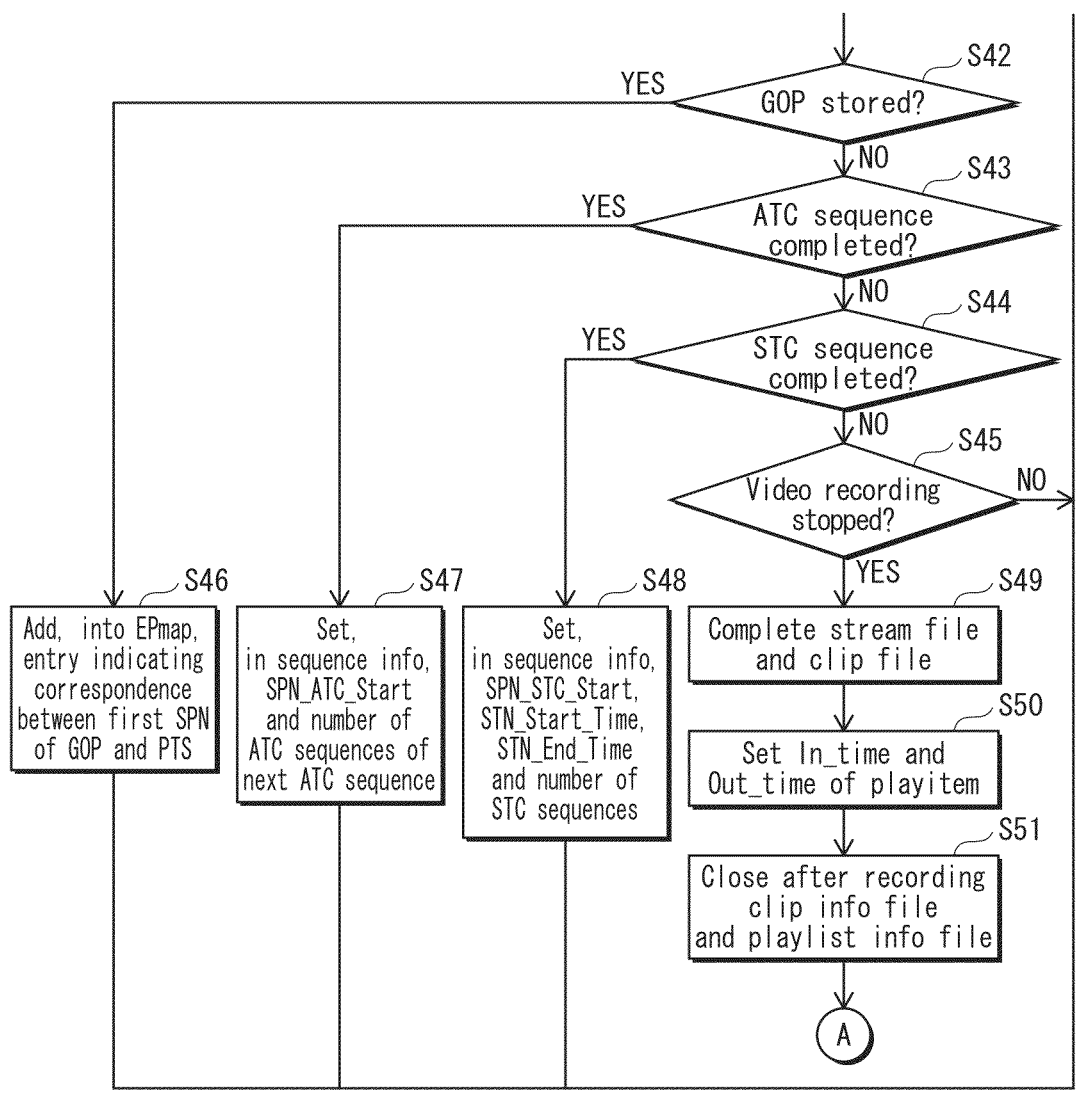
FIG. 26 is a flowchart illustrating a continuation of the stream recording procedure.

FIG. 26 is a flowchart illustrating a continuation of the stream recording procedure. In step S42, a storage state is monitored by checking whether or not storing GOPs is completed. In step S43, it is judged whether or not the ATC sequence is completed. In step S44, it is judged whether or not the STC sequence is completed. In step S45, it is judged whether or not a video recording stop operation has been entered. When it is judged in step S42 that storing GOPs is completed, the control proceeds to step S46 in which an entry indicating correspondence between the first source packet number of the first GOP and a presentation time stamp is added into the entry map. When it is judged in step S43 that the ATC sequence is completed, the control proceeds to step S47 in which SPN_ATC_Start, which is the first source packet number of the next ATC sequence and the number of ATC sequences are set in the sequence information. When it is judged in step S43 that the STC sequence is completed, the control proceeds to step S48 in which SPN_STC_Start, which is the first source packet number of the next STC sequence, STC_Start_time, which is the playback start time of the STC sequence and STC_End_time, which is the playback end time of the STC sequence, are set in the sequence information.

When it is judged in step S45 that a video recording stop operation has been entered, the stream file and the clip information file are completed (step S49), In_time and Out_time of the playitem information are set (step S50), and the clip information file and the playlist information file are recorded and then the process is closed (step S51).

As described above, according to the present embodiment, a 1920×1080/60P AV stream, which has been recorded in a format different from the BDMV format or the BDAV format by a conventional recording device, is recorded in the BDMV format after it is assured that it is not played back inappropriately upon loading into a non-60P-supporting playback device. This allows for the promotion of the synthesis of the recording formats.

Also, since the above structure does not need to bring a great change to the hardware and software structures that are the basis of the recording device, it is possible to realize a unique process for solving the above problem as an extension of an existing function. This enables the product manufacturers to produce new products while making use of the design know-how that have been acquired through the past product development, and shorten the design period for the application products. This makes it possible to shorten the product developing cycle and make product model changes more frequently. Thus, with this structure, the product manufacturers would be able to always market new products, establish the brand image, and gain market share.

Embodiment 10

The present embodiment discloses bit assignments in a register indicating the 60P capability and a register indicating the 50P capability. The word length of a player setting register for storing one system parameter is 32 bits. In the following, the bit positions of the 32 bits constituting one word of the PSR (player setting register) are identified as b0 to b31. Among these, the highest-order bit is identified as b31, and the lowest-order bit is identified as b0.

FIG. 27 illustrates a bit assignment in PSR29. The bit "b1" in PSR29 represents 50&25 Hz_video_60P capability. More specifically, when the bit "b1" is "1", it indicates that the playback device has a capability to play back video of the PAL system (1b: 50 Hz and 25 Hz Video capable); and when the bit "b1" is "0", it indicates that the playback device does not have a capability to play back 50&25 Hz video (0b: 50 Hz and 25 Hz Video incapable).

The bit "b3" in PSR29 represents 60P_video capability. More specifically, when the bit "b3" is "1", it indicates that the playback device has a capability to play back the 60P video (1b: 60P Video capable); and when the bit "b3" is "0", it indicates that the playback device does not have a capability to play back the 60P video (0b: 60P Video incapable).

As described above, according to the present embodiment, the 60P capability and the 50P capability are respectively indicated by two bits at different bit positions in the same player setting register. With this structure, it is possible to judge whether or not the 60P capability is provided by reading only the bit "b3" assigned to the 60P capability. It is also possible to judge whether or not the 60P capability is provided in the 50P playlist by reading the bits "b3" and "b1" assigned to the 60P and 50P capabilities and computing the logical AND of the two bits.

Embodiment 11

The present embodiment describes a recording method for writing the video stream described in the embodiments of the present application onto a disc medium such as a Blu-ray Recording disc or a Blu-ray Rewritable disc.

The recording method of the present embodiment can be realized as a real-time recording in which, when an original image having an N-bit grayscale bits is input, AV files (stream files) and non-AV files (files other than the stream files) are generated in real time, and are written directly into the AV data recording area and the non-AV data recording area provided in the recording medium. However, not limited to this, the recording method of the present embodiment can be realized as a pre-format recording in which bit streams to be recorded into the volume area are generated in advance, a master disc is generated based on the bit streams, and the master disc is pressed, thereby making possible a mass production of the optical disc. The recording method of the present embodiment is applicable to either the real-time recording or the pre-format recording. When the recording method is to be realized by the real-time recording technology, the recording device for performing the recording method creates a digital stream in real time as disclosed in Embodiment 9, and stores the digital stream into the Blu-ray Recording disc or the Blu-ray Rewritable disc.

The following describes the recording method by the pre-format recording.

The recording method by the pre-format recording is an optical disc manufacturing method in which the recording device executes the authoring step. The recording device for executing the authoring step includes: an inport unit for inputting an N-bit original image, video material for the child-screen video, audio material, subtitle material, and menu material; a stream generating unit for generating a video stream from the original image; a child-screen video encoder for encoding the video material for the child-screen video; an audio encoder for encoding the audio material; a PG generator for generating a PG stream from the subtitle material; an IG generator for generating an interactive graphics stream from the menu material; storages for storing the generated various types of streams after they are classified according to the file system; a multiplexer for obtaining a transport stream by multiplexing the generated various types of streams; and an authoring unit for defining, in accordance with an interactive input from the user, a stream playback structure of the data to be recorded on a Blu-ray ReadOnly disc, and based on the stream playback structure, generating a volume image in the Blu-ray ReadOnly disc.

The above storages are network drives in a campus network, and the video stream, audio stream and the like are stored as files in a predetermined directory structure in the storages. The encoder is a server computer in the campus network, accesses the storages via the campus network, and, for example, read the various types of streams and write the transport stream to/from the storages.

The files containing the video stream, audio stream, subtitle stream, transport stream and the like and being stored in the storages in the campus network are visually represented as icons, thumbnails or the like by the GUI. The user can execute various editing operations, such as copying and deleting, onto the video stream, audio stream, subtitle stream, transport stream and the like by performing operations such as dragging, dropping, clicking and the like onto the icons or thumbnails displayed by the GUI which is a user interface.

Figure 28A:
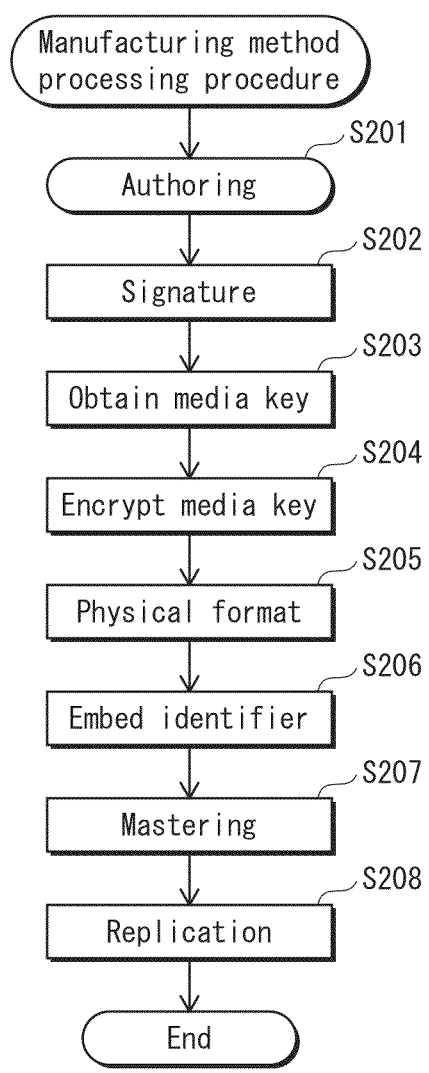
FIGS. 28A and 28B illustrate the recording method of an optical disc.
Figure 28B:
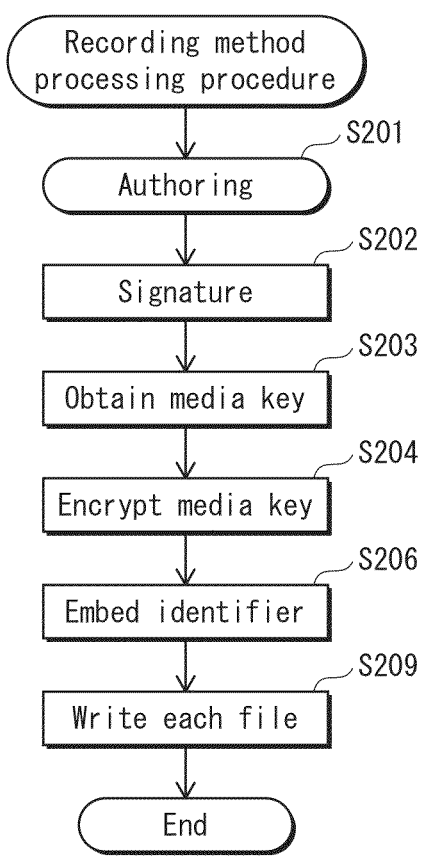

FIGS. 28A and 28B illustrate the recording method of an optical disc. FIG. 28A is a flowchart of the recording method by the pre-format recording and illustrates the procedure of the optical disc manufacturing method. The optical disc manufacturing method includes the authoring step, signature step, media key obtaining step, media key encrypting step, physical format step, identifier embedding step, mastering step, and replication step.

In the authoring step S201, a bit stream representing the whole volume area of the optical disc is generated.

In the signing step S202, a request for signature is made to the AACS LA to manufacture the optical disc. More specifically, a portion of the bit stream is extracted and sent to the AACS LA. Note that the AACS LA is an organization for managing the license of the copyrighted work protection technologies for the next-generation digital household electric appliances. The authoring sites and mastering sites are licensed by the AACS LA, where the authoring sites perform authoring of optical discs by using authoring devices, and the mastering sites execute mastering by using mastering devices. The AACS LA also manages the media keys and invalidation information. Subsequently, the portion of the bit stream to which a signature has been attached by the AACS LA is obtained.

In the media key obtaining step S203, a media key is obtained from the AACS LA. The media key provided from the AACS LA is not fixed to a predetermined one, but is updated to a new one when the number of manufactured optical discs reaches a certain number. The update of the media key makes it possible to exclude certain manufacturers or devices, and to invalidate an encryption key by using the invalidation information even if the encryption key is cracked.

In the media key encrypting step S204, a key used for encrypting a bit stream is encrypted by using the media key obtained in the media key obtaining step.

In the physical format step S205, the physical formatting of the bit stream is performed.

In the identifier embedding step S206, an identifier, which is unique and cannot be detected by ordinary devices, is embedded as an electronic watermark into the bit stream to be recorded on the optical disc. This prevents mass production of pirated copies by unauthorized mastering.

In the mastering step S207, a master disc of the optical disc is generated. First, a photoresist layer is formed on the glass substrate, a laser beam is radiated onto the photoresist layer in correspondence with desired grooves or pits, and then the photoresist layer is subjected to the exposure process and the developing process. The grooves or pits represent values of the bits constituting the bit stream that has been subjected to the eight-to-sixteen modulation. After this, the master disc of the optical disc is generated based on the photoresist whose surface has been made uneven by the laser cutting in correspondence with the grooves or pits.

In the replication step S208, copies of the optical disc are produced by a mass production by using the master disc of the optical disc. FIG. 28B illustrates the procedure of the recording method by the pre-format recording when a general user records any of the various files described in the embodiment so far onto a recording medium such as BD-R or BD-RE by using a personal computer, not when the optical disc is mass-produced. Compared with FIG. 28A, in the recording method shown in FIG. 28B, the physical format step S205, mastering step S207 and replication step S208 have been omitted, and each file writing step S209 has been added.

Embodiment 12

The above embodiments have described conditionings and button displays for playing back the playlist by using navigation commands to be embedded in the movie objects and button objects. In stead of the navigation commands, bytecodes by object-oriented programming languages may be used. In this case, the control program adopts a BD-J application whose operation is defined by a BD-J object.

In the platform unit of the BD-J application (BD-J platform), the main operating body is a group of software including a HAVi device, a stream playback control engine for playing back a playlist by the Java framework, a cache manager for the Cache-In-Cache-Out management, and an event manager for the event process, namely, a group of software that resembles a group of software in a multimedia home platform terminal for digital broadcasting (DVB-MHP).

When an extended-function-supporting application is implemented as a system application for operation on the BD-J application, usable APIs include "Java2 Micro_Edition (J2ME) Personal Basis Profile (PBP 1.0)" and "Globally Executable MHP specification (GEM1.0.2) for package media targets". Use of these APIs makes it possible to realize controls with use of the data structures and playback units described in the above embodiments by using the extension API for the BD-J platform (called "BD-J extension") such as java.net for the network process, java.awt for the GUI process, java.lang for the language process, java.io for the input/output process with the recording medium, and java.util which is a utility. The BD-J extension includes methods having been inherited from the methods of the following classes: java.net, java.awt, java.lang, java.io, java.util, and javax.media. The interface of these classes is provided as an embedded interface or a super interface. It is therefore possible to create an application that is suited for the 60P playlist playback, as an extension of a programming technique using the classes java.net, java.awt, java.lang, java.io, java.util, and javax.media.

For example, an extension API in the BD-J platform includes a setting obtaining class that instructs to obtain a status of 60P capability in the register set. The setting obtaining class is composed of a constant field that indicates values held by the 60P capability register, an obtaining method that instructs to obtain a value held by a PSR, and a setting method that instructs to set values to be held by the player setting register and the player status register.

The methods contained in the setting obtaining class include methods inherited from the java.lang.object class.

Also, when an argument in a method call is inauthentic, the java.lang.IllegalArgumentException event, which is an event of the java.lang class, is thrown. Since the class has inherited the methods and events of java.lang.object, the programmer can create a program that uses values held by the 60P capability register, as an extension of java.lang.object.

The "BD-J object" defines detailed operations of the playback device in the BD-J mode. More specifically, the detailed operations of the playback device include: (1) class load of application when the corresponding title has become the current title; (2) application signaling when the corresponding title has become the current title; (3) HAVi device configuration when the application started by the application signaling executes the GUI process; (4) playlist access in the current title; (5) Cache In Cache Out of the class archive file when the corresponding title has become the current title; and (6) event assignment in which an event, which is a trigger for the started application, is assigned to a key.

The "class load" is a process of generating an instance of a class file archived in the class archive file into the heap area of the platform. The "application signaling" is a control for defining whether to automatically start an application that is an instance of a class file, or whether to set the life cycle of the application as a title boundary or a disc boundary. Here, the title boundary is a control that erases a thread as an application from the heap area at the same time as a title ends; and the disc boundary is a control that erases a thread as an application from the heap area at the same time as a disc eject. Conversely, a control that does not erase a thread from the heap area even if a disc eject is performed is called a "disc unboundary". The "HAVi device configuration" defines the resolution of the graphics plane, fonts to be used in display of characters and the like when the application executes the GUI process.

The "playlist access" specifies a playlist that the started application can instruct to be played back, and a playlist that is to be played back automatically when a title is selected.

The automatic playback playlist that is specified by the accessible playlist of the BD-J object is a playlist having the 24P video attribute or the 60i video attribute. This is because the automatic playback playlist is automatically started to be played back when a BD-J title is selected, and thus a 60P playlist should not be the automatic playback playlist.

The "Cache In of the class archive file" is a process for reading a class archive file, which is a target of the class load, into the cache preliminarily. The "Cache Out of the class archive file" is a process for deleting a class archive file from the cache. The "event assignment to drive an application" is a process for assigning an event, which has been registered in the event listener of the application, to a key that can be operated by the user.

In each embodiment, a 60P playlist playback procedure by an object-oriented programming language is described as follows.

The procedure for playing back a playlist file 00001.MPLS, which is a 60P playlist, is described as follows.

i) An instance of a BDLocator class, which takes a file path of a playlist file of a 60P playlist (bd://1.PLAYLIST:00001) as an argument, is generated. Let "loc" denote an instance variable of the BDLocator class, and then "BDLocator loc=newBDlocator(bd://1.PLAYLIST:00001" is described.

ii) An instance of a MediaLocator class, which takes a variable name of the instance variable of the BDLocator class as an argument, is generated. Let "loc" denote the variable name of the instance variable of the BDLocator class, and let "ml" denote a variable name of an instance variable of the MediaLocator class, and the following is described:

MediaLocator ml=new MediaLocator(loc)

iii) An instance of a javax.media.Manager.creatPlayer class, which takes a variable name of the instance variable of the MediaLocator class as an argument, namely a player instance, is generated. Let "ml" denote the variable name of the instance variable of the MediaLocator class, and "Player" denote a variable name of an instance variable of the player instance, and then "Player=Manager.creatPlayer(ml)" is described.

iv) Lastly, start( ) which is a member function of a JMF player instance, is called to start the playback of the playlist. When "Player" denotes the variable name of the instance variable of the player instance, "Player.start( )" is described. By conditioning the above playlist playback with use of a 60P capability value obtained by a status obtaining method, it is possible to describe, in an object-oriented programming language, a code that causes a playlist to be played back only when a 60P capability such as the one described in Embodiment 2 is provided.

A bytecode application for creating a top menu containing two button members is described as in (h-1) to (h-9) in the following.

(h-1) An instance of a full-screen scene of the graphics device is generated, by taking an instance of the graphics device as an argument. More specifically, an instance of HsceneFactory.getinstance( ).getFullScreenScene is generated by taking an instance of Hscreen.getDefaultHscreen( ).getDefaultHGraphicsDevice( ) as an argument. Let "hs" denote an instance variable name of the instance of HsceneFactory.getinstance( ).getFullScreenScene, then the following is described:

Hscene hs=HsceneFactory.getinstance( ).getFullScreenScene(Hscreen.getDefaultHscreen( ).getDefaultHGraphicsDevice (h-2) A setLayout method of Hscene is called, by taking an instance of Flowlayout( ) of java.awt as an argument. Let "hs" denote an instance variable name of the Hscene class instance, then "hs.setLayout(new FlowLayout( ));" is described.

(h-3) An instance of a MediaTracker class of java.awt is generated, by taking an instance variable of the Hscreen class as an argument. Let "hs" denote an instance variable name of the Hscreen instance, and let "mt" denote an instance variable of the MediaTracker class, then the following is described:

MediaTracker mt=newMediaTracker(hs);

(h-4) An instance of the image class in the normal status, an instance of the image class in the focused status, and an instance of the image class in the actioned status are generated by calling StereoGraphics#drawing by taking, as an argument, a file name of an image file defining an image pattern of the button material.

For example, when "normal" denotes a variable name of an instance variable in the image class of the button material in the normal status, and "NormalButton1.bmp" denotes a file name of an image file for the sports day button, the following is described:

Image normal=StereoGraphics#drawing(x1,y1,x2,y2, NormalButton1.bmp,x3,y3,x4,y4,NormalButton2.bmp);

For example, when "focused" denotes a variable name of an instance variable in the image class of the button material in the focused status, "FocusedButton1.bmp" denotes a file name of an image file for the sports day button, and "FocusedButton2.bmp" denotes a file name of an image file for the cultural fest button, the following is described:

Image focused=StereoGraphics#drawing (x1,y1,x2,y2, FocusedButton1.bmp,x3,y3,x4,y4, FocusedButton2.bmp);

For example, when "actioned" denotes a variable name of an instance variable in the image class of the button material in the actioned status, "actionedButton1.bmp" denotes a file name of an image file for the sports day button, and "actionedButton2.bmp" denotes a file name of an image file for the cultural fest button, the following is described:

Image actioned=StereoGraphics#drawing(x1,y1,x2,y2, actionedButton1.bmp,x3,y3,x4,y4, actionedButton2.bmp);

(h-5) A status image in the normal status, a status image in the focused status, and a status image in the actioned status are added to the instance of the MediaTracker class, by calling the addImage method of the MediaTracker class, by taking a status image as an argument.

Let "mt" denote an instance variable name of the MediaTracker class instance, and then the following is described:
   mt.addImage(normal,0);
   mt.addImage(focused,0);
   mt.addImage(actioned,0);

(h-6) An instance of the HGraphicsButton class of java.awt is generated. When "hgb1,hgb2" denotes an instance variable name of the HGraphicsButton class instance, and the button material is in any of the "normal", "focused" and "actioned" statuses, the following is described:
   hgb1=new HGraphicsButton(normal, focused, actioned);
   hgb2=new HGraphicsButton(normal, focused, actioned);

(h-7) An instance of the HGraphicsButton class is added to an instance of the setLayout class, by using add( ) which is a member function of the setLayout class. Let "hs" denote a variable name of an instance variable of the setLayout class, and "hgb1,hgb2" denote an instance name of an instance of the HGraphicsButton class, then "hs.add(hgb1); hs.add (hgb1):" is described.

(h-8) An instance of the setLayout class is visualized by using the setVisible method which is a member function of the setLayout class. Let "hs" denote a variable name of an instance variable of the setLayout class, then "hs.setVisible (true);" is described.

(h-9) An instance of the HGraphicsButton class is set to the focused status, by using the requestFocus method which is a member function of the HGraphicsButton class. Let "hgb1" denote a variable name of an instance of the HGraphicsButton class, then "hgb1.requestFocus( );" is described. By setting the statuses of GUIs to the visible status or invisible status in accordance with the 60P capability obtained by the status obtaining command, it is possible to realize, in an object-oriented programming language, the control of the button objects which is realized by using navigation commands in Embodiment 1.

Embodiment 13

The present embodiment expands the application range of the problem solving means. In the above embodiments, a restriction is imposed on the title search of the first play title, top menu title and other titles based on whether or not the 60P capability is provided, thereby preventing in advance an unintended playback of a 60P video by a non-60P-supporting playback device. However, the problem solving means described in the above embodiments can also be used for an existing player device to determine what to do when it meets a format in which the player device cannot play back the video.

For example, when a video stream compressed by a new codec is introduced, or when a video stream whose resolution (for example, 3840×2160) is higher than an existing resolution (1920×1080) is introduced, it may happen that a player device supply a video stream, which cannot be played back by the player device, to a video decoder. Such a problem can also by solved by a structure where the player setting registers indicate whether or not the player device has the capabilities to play back videos of these resolutions, and only when it is confirmed by referring to the player setting registers that the player device can play back a video stream of a resolution, the video stream of the resolution is decoded and played back.

<Supplementary Notes>

Up to now, the present invention has been described through the best embodiments that the Applicant recognizes as of the application of the present application. However, further improvements or changes can be added regarding the following technical topics. Whether to select any of the embodiments or the improvements and changes to implement the invention is optional and may be determined by the subjectivity of the implementer.

(Use of Downconvert 60P→24P)

Not playing back a 60P playlist when a playback device or a display device does not have a 60P capability is merely one example. In stead of this, for example, it is possible to present to the user via a menu that the 60P playlist can be played back after a downconvert 60P→24P.

With this structure, when a playback of a playlist of the 60P video attribute is permitted, the user is notified via the menu that a downconvert 60P→24P is performed. This prevents a user trouble from occurring. Similarly, the user may be notified via the menu that a downconvert 60P→60i is performed.

(Application to Stereoscopic Content)

The base-view component and dependent-view component constituting a stereoscopic playlist may have the 60P attribute. In this case, the control program needs to start a playback by a stereoscopic 60P playlist on a condition that the playback device has the stereoscopic capability and the 60P capability. It is desirable in that case that a transport stream including a 60P base-view component and a transport stream including a 60P dependent-view component are recorded on a recording medium in an interleaved manner.

(Realizing 60P Playlist on Virtual File System)

The 60P playlist may be realized on a virtual file system. The virtual file system assigns file paths for alias access to the files on the file system of a recording medium in a local storage, and causes the applications to execute file accesses that use the file paths for alias access as the locators. Here, the assignment of the file paths for alias access to the files in the local storage is performed as follows. That is to say, the merge management information is specified by an argument, and then the application calls a virtual package create API to generate a virtual package in the virtual file system.

The virtual package generated by the call indicates a file structure in which one or more files other than the files on the Blu-ray ReadOnly disc are added, or a file structure in which one or more files on the Blu-ray ReadOnly disc are replaced with other files. The substance of the virtual package is file management information that indicates the file structure after the file addition and/or file management information that indicates the file structure after the file replacement. The file management information is obtained by adding a new file entry into file management information having been read from the Blu-ray ReadOnly disc to the memory, or by replacing some file entries included in file management information having been read to the memory with other file entries.

It should be noted here that the merge management information is a file in which correspondence between file paths in the local storage and the file paths for alias access is described by tags written in a markup language. Also, the file paths for alias access that are made to correspond to the file paths in the local storage are any combinations among the BDMV directory, CLIPINF directory, PLAYLIST directory, and STREAM directory recorded on the Blu-ray ReadOnly disc.

Once a virtual package is created by the API call of the application, it is possible to specify a file on the virtual package by a locator of the Blu-ray ReadOnly disc, and the files stored in the local storage can be treated as if they are recorded on the Blu-ray ReadOnly disc. The BD-J application checks whether or not the playback device has the 60P capability when a 60P video stream is present in the virtual package to be built. If it is confirmed that the playback device has the 60P capability, the BD-J application outputs a virtual package building request to a virtual file system unit of the playback device, and if it is confirmed that the playback device does not have the 60P capability, the BD-J application does not output a virtual package building request to the virtual file system unit. With this structure, it is possible to avoid a phenomenon that a 60P video stream is entered to a video decoder when a virtual package is built.

(Realization by Speculative Playlist)

The 60P playlist may be a speculative playlist. Here, the speculative playlist is a multi-path playlist which specifies a stream file by using a speculative tag in the merge management information file, and specifies a playlist information file by using an asset tag in the merge management information file.

With regard to the stream file specified by using the speculative tag, even if the stream file is not stored in the local storage at the start of a playback of a 60P-video-attribute playlist, the playback is performed normally if the stream file has been stored in the local storage before its turn comes to be played back.

Accordingly, with use of the speculative playlist, it is not necessary for all the stream files to be downloaded before a playback of a 60P-video-attribute playlist is started, and the playback is progressed in a streaming-like manner.

(Range of Devices Applicable as Recording Device)

In the above embodiments, the recording device is described as a camcorder, namely, a video shooting device. However, the recording device may be a recorder used for recording TV programs at home. Also, the recording device may be combined with the playback device explained in the above embodiments, to be provided as a recording/playback device. Furthermore, the recording device may be combined with a display device, to be provided as a display device having a recording/playback function.

Embodiment of Integrated Circuit

Among the hardware components of the display device and playback device described in the embodiments, hardware components which correspond to logic circuits and storage elements, namely, the core of logic circuits excluding a mechanical part composed of the drive unit of the recording medium, connectors to external devices, and the like, may be realized as a system LSI. The system LSI is obtained by implementing a bare chip on a high-density substrate and packaging them. The system LSI is also obtained by implementing a plurality of bare chips on a high-density substrate and packaging them, so that the plurality of bare chips have an outer appearance of one LSI (such a system LSI is called a multi-chip module).

The system LSI has a QFP (Quad Flat Package) type and a PGA (Pin Grid Array) type. In the QFP-type system LSI, pins are attached to the four sides of the package. In the PGA-type system LSI, a lot of pins are attached to the entire bottom.

These pins function as a power supply, ground, and an interface with other circuits. Since, as described above, the pins in the system LSI play a role of an interface, the system LSI, which is connected with other circuits via the pins, plays a role as the core of the playback device.

Embodiments of Program

The program described in each embodiment of the present invention can be produced as follows. First, the software developer writes, using a programming language, a source program that achieves each flowchart and functional component. In this writing, the software developer uses the class structure, variables, array variables, calls to external functions, and so on, which conform to the sentence structure of the programming language he/she uses.

The written source program is sent as files to the compiler. The compiler translates the source program and generates an object program.

The translation performed by the compiler includes processes such as the syntax analysis, optimization, resource allocation, and code generation. In the syntax analysis, the characters and phrases, sentence structure, and meaning of the source program are analyzed and the source program is converted into an intermediate program. In the optimization, the intermediate program is subjected to such processes as the basic block setting, control flow analysis, and data flow analysis. In the resource allocation, to adapt to the instruction sets of the target processor, the variables in the intermediate program are allocated to the register or memory of the target processor. In the code generation, each intermediate instruction in the intermediate program is converted into a program code, and an object program is obtained.

The generated object program is composed of one or more program codes that cause the computer to execute each step in the flowchart or each procedure of the functional components. There are various types of program codes such as the native code of the processor, and Java™ byte code. There are various forms of realization of the steps by the program codes. For example, when each step can be realized by using an external function, the call statements for calling the external functions are used as the program codes. Also, program codes that realize one step may belong to different object programs. In the RISC processor in which the types of instructions are limited, each step of a flowchart may be realized by combining arithmetic operation instructions, logical operation instructions, branch instructions and the like.

After the object program is generated, the programmer activates a linker. The linker allocates the memory spaces to the object programs and the related library programs, and links them together to generate a load module. The generated load module is based on the presumption that it is read by the computer and causes the computer to execute the procedures indicated in the flowcharts and the procedures of the functional components. The computer program described here may be recorded onto a non-transitory computer-readable recording medium, and may be provided to the user in this form.

(Value Range of Optional Rate Adoptable for Progressive Picture)

In the above embodiments, the 60P video stream is described as an optional frame rate adoptable for the progressive picture. However, this is merely a frame rate selected for the sake of a simple explanation. As the optional frame rate adoptable for the progressive picture, an integral multiple of 24 Hz may be selected. Furthermore, as the optional frame rate, an integral multiple of 60 Hz may be selected.

Furthermore, a plurality of optional rates adoptable for the progressive picture may be assigned to a plurality of bits prepared in the player setting register such that each of the plurality of bits defines whether or not a capability to process the corresponding optional rate adoptable for the progressive picture is provided.

Embodiment as Receiving Device

Each of the playback devices described in the above embodiments may be a receiving device for receiving and playing back TV broadcast. The receiving device includes: a tuning register storing tuning settings of the receiving device; a receiving unit for receiving broadcast waves to obtain a transport stream; a demultiplexing unit for extracting TS packets from the transport stream in accordance with a PMT table corresponding to a tuning setting stored in the tuning register to obtain a video stream, an audio stream and a subtitle stream; a read buffer for storing TS packets constituting the video stream, audio stream and subtitle stream; a system target decoder for decoding the video stream, audio stream and subtitle stream; a plane memory for storing picture data that is obtained by decoding the video stream; an overlay unit for performing an overlay of the picture data stored in the plane memory with a subtitle stored in a plurality of line memories; a display unit for displaying the picture data overlaid with the subtitle; a control unit for setting tuning in the tuning register in accordance with an operation received from a user or a preselected viewing setting and controlling the receiving device as a whole; an operation receiving unit for receiving a user operation; a program executing unit for activating a DVB-MHP application and executing a DVB-MHP application signaling in which switching between broadcast services is regarded as a boundary; and an image memory for storing images drawn by the DVB-MHP application. In the above-structured receiving device, when the video stream is a 60P video stream, the DVB-MHP application judges whether or not the receiving device has a capability for the 60P video stream, and when the receiving device has the capability, causes the 60P video stream to be decoded and played back, and when the receiving device does not have the capability, does not cause the 60P video stream to be decoded and played back. Also, the 60P video stream is played back after being down-converted to a 24P video stream or a 60i video stream. With this structure, even when a 60P video stream is sent via a broadcast medium into a receiving device that is a playback device not supporting 60P, it is possible to prevent the playback device from taking a heavy load of playing back the 60P video stream.

(Obtainment Via Network)

The directory/file structure described in the above embodiments may be supplied to the playback device via a local network. When a content is obtained as a target of depth adjustment from a recording medium on the local network, the recording medium can be regarded as a "network drive". The "network drive" is accessed when a client program or a server program executes a file transfer protocol via a protocol stack. Thus, the playback device can read the digital streams and scenario data described in the above embodiments form the recording medium on the network and supply the read data to the decoder, by executing the process as if it is the above-described client program.

Also, the directory/file structure described in the above embodiments may be supplied to the playback device via a wide area network. In this case, a client program in the playback device instructs a server program (a WWW server or the like) in a server computer managing the network drive to perform a file transfer. The client program and the server program perform an inter-application communication through protocol stacks provided in a client computer (the playback device) and the server computer so that a file is downloaded from the network drive. In this case, the local storage is used to store the downloaded file. With such a download performed via an inter-application communication, the playback device can use the directories/files on the network drive as if accessing files recorded on a recording medium loaded in the playback device itself.

In that case, the playback device may have a gateway function, router function, and bridge function in the network. With this structure, it is possible to perform transmission/reception of video data and audio data efficiently in the home network.

(Structural Elements for Securing Functions)

Structural elements for securing functions of the playback device and recording device can be added as necessary. Such structural elements for securing functions include the following.

Structural elements pertaining to the internal processing include: a conversion unit for converting the data or streams, which are elements of the above-described information of the present invention, to a desired format; a cache memory for temporarily storing the data or streams; a buffer memory for adjusting the data transfer speed; an initialization unit for, upon a power-on, performing an initialization by reading a necessary program from the ROM onto the RAM; a power source controlling unit for performing a power source control depending on the state of the data or streams; a program management unit for managing a plurality of programs, which are to be executed by the MPU in the control unit, as task applications, and perform a scheduling based on the priorities of the programs; and an interrupt handler for generating an interrupt signal in response to an occurrence of a reset or an external event such as a power failure.

Structural elements pertaining to the user include: an authentication unit for performing a user authentication via a password input, a biological authentication or the like; a user interface unit for providing a visual feedback regarding the presence or state of the data, which is an element of the above-described information of the present invention, to the user; a setup/configuration setting unit for displaying a list of items to be set by a user, and receiving an input of a setup or configuration of the device from the user by performing the interactive processing through a GUI; and a warning unit for issuing a warning or notification to the user.

INDUSTRIAL APPLICABILITY

The recording medium, playback device and recording device of the present invention have high usability in the industry of the video shooting device such as the video camera and the commercial device industry of the player device, recorder device and the like.

REFERENCE SIGNS LIST

1000 removable media
1001 playback device
1002 playback device
1003 television
1004 remote control

The invention claimed is:

1. A non-transitory computer-readable recording medium on which are recorded:
   an index table;
   a plurality of digital streams respectively including a plurality of video streams;

a plurality of pieces of playlist information respectively defining a plurality of playback paths of the plurality of video streams; and a plurality of control programs, wherein the plurality of video streams include a video stream composed of progressive pictures and a video stream composed of interlace pictures, and the video stream composed of the progressive pictures has a mandatory rate or an optional rate, the mandatory rate is a frame rate at which any playback device can decode and play back the progressive pictures, and the optional rate is a frame rate at which a limited types of playback devices can decode and play back the progressive pictures, each of the plurality of control programs instructs a playback device to play back one of the plurality of video streams in accordance with one of the plurality of playback paths defined in the plurality of pieces of playlist information, the index table indicates one-to-one correspondence between a plurality of titles and the plurality of control programs, the plurality of titles including a first play title and a top menu title, and among the plurality of control programs, control programs corresponding to the first play title and the top menu title exclude a progressive-optional-rate playback path from a playback target, the progressive-optional-rate playback path being a playback path for playing back the progressive pictures in the video stream at the optional rate.

2. The recording medium of claim 1, wherein
among the plurality of control programs, one or more control programs, which respectively correspond to one or more general titles that include neither the first play title nor the top menu title, instruct the playback device to play back the video stream composed of the progressive pictures at the optional rate, on a condition that the playback device has a capability to process the video stream composed of the progressive pictures at the optional rate.

3. The recording medium of claim 1, wherein
a plurality of mask flags are recorded on the recording medium as corresponding to the plurality of titles, the plurality of mask flags each indicating whether or not a search operation for searching a corresponding title is prohibited, and among the plurality of mask flags, one or more mask flags corresponding to one or more titles that instruct to play back the progressive pictures at the optional rate are set to indicate that search operations for searching the one or more titles are prohibited.

4. The recording medium of claim 1, wherein
the progressive-optional-rate playback path includes a first-attribute playback section defined for a video stream that satisfies a condition of being composed of progressive pictures and having the optional rate, and in a case where the progressive-optional-rate playback path includes another playback section, a video stream defined by the another playback section is regarded to satisfy the condition, and information indicating presence of the first-attribute playback section is set in a playlist that includes one or more first-attribute playback sections.

5. The recording medium of claim 1, wherein
the progressive-optional-rate playback path is a progressive-first-optional-rate playback path which is a playback path for playing back the progressive pictures at a first optional rate, and the plurality of playback paths defined in the playlist information include, as another type of playback path, a progressive-second-optional-rate playback path which is a playback path for playing back the progressive pictures at a second optional rate only within a predetermined geographical region, and one of the plurality of control programs instructs the playback device to play back the progressive pictures at the second optional rate, on a condition that the playback device has a capability to process the progressive-first-optional-rate playback path and a capability to process the progressive-second-optional-rate playback path.

6. The recording medium of claim 1, wherein
when playing back the progressive-optional-rate playback path, each of the plurality of control programs judges whether or not a display device has a capability to process the progressive-optional-rate playback path, and instructs the playback device to play back the progressive-optional-rate playback path, on a condition that the display device has the capability to process the progressive-optional-rate playback path.

7. The recording medium of claim 1, wherein
a top menu displayed by the top menu title includes two or more button objects which correspond one-to-one to two or more titles and each receive a selection of a corresponding title on the top menu, the two or more titles include a first-type title that instructs the playback device to play back the progressive pictures at the optional rate and a second-type title that instructs the playback device to play back the progressive pictures at a frame rate other than the optional rate or to play back the interlace pictures, and a control program corresponding to the top menu title
sets a button object corresponding to the first-type title among the two or more button objects to an enable state when the playback device has a capability to process the progressive-optional-rate playback path, and sets the button object corresponding to the first-type title to a disable state when the playback device does not have the capability to process the progressive-optional-rate playback path.

8. A playback device comprising:
a reading unit configured to read an index table from a recording medium;

a current number register storing a current title number which is a title number of a current title;

an execution unit configured to execute a control program which is indicated in the index table as corresponding to the current title; and a playback unit configured to play back a video stream selected from a plurality of video streams as instructed by the execution unit, in accordance with one of a plurality of playback paths defined in playlist information, wherein the plurality of video streams include a video stream composed of progressive pictures and a video stream composed of interlace pictures, and the video stream composed of the progressive pictures has a mandatory rate or an optional rate, the mandatory rate is a frame rate at which any playback device can decode and play back the progressive pictures, and the optional rate is a frame rate at which a limited types of playback devices can decode and play back the progressive pictures, the control program instructs the playback device to play back one of the plurality of video streams in accordance with one of a plurality of playback paths defined in a plurality of pieces of playlist information, the index table indicates one-to-one correspondence between a plurality of titles and the plurality of control programs, the plurality of titles including a first play title and a top menu title, and among the plurality of control programs, control programs corresponding to the first play title and the top menu title exclude a progressive-optional-rate playback path from a playback target, the progressive-optional-rate playback path being a playback path for playing back the progressive pictures in the video stream at the optional rate.

9. The playback device of claim 8, wherein among the plurality of control programs, one or more control programs, which respectively correspond to one or more general titles that include neither the first play title nor the top menu title, instruct the playback device to play back the video stream composed of the progressive pictures at the optional rate, on a condition that the playback device has a capability to process the video stream composed of the progressive pictures at the optional rate, the playback device further comprising:

a player setting register indicating one or more capabilities of the playback device; and a title management unit configured to, when the player setting register indicates that the playback device has a capability to process the progressive-optional-rate playback path, set a title number of a title corresponding to the progressive-optional-rate playback path into the title number register in accordance with the control program executed by the execution unit.

10. The playback device of claim 8 further comprising a receiving unit configured to receive a title search request from a user, wherein a plurality of mask flags are recorded on the recording medium as corresponding to the plurality of titles, the plurality of mask flags each indicating whether or not a search operation for searching a corresponding title is prohibited, and among the plurality of mask flags, one or more mask flags corresponding to one or more titles that instruct to play back the progressive pictures at the optional rate are set to indicate that search operations for searching the one or more titles are prohibited.

11. The playback device of claim 8, wherein the progressive-optional-rate playback path includes a first-attribute playback section defined for a video stream that satisfies a condition of being composed of progressive pictures and having the optional rate, and in a case where the progressive-optional-rate playback path includes another playback section, a video stream defined by the another playback section is regarded to satisfy the condition, and information indicating presence of the first-attribute playback section is set in a playlist that includes one or more first-attribute playback sections, the playback device further comprising:

a playitem number register storing a current playitem number identifying a current piece of playitem information among a plurality of pieces of playitem information which respectively define a plurality of playback sections in one playback path;

a demultiplexing unit configured to demultiplex, from a digital stream, one or more elementary streams that are indicated in a stream selection table of the current piece of playitem information as being permitted to be played back; and a video decoder configured to decode a video stream included in the one or more elementary streams.

12. The playback device of claim 8, wherein the progressive-optional-rate playback path is a progressive-first-optional-rate playback path which is a playback path for playing back the progressive pictures at a first optional rate, and the plurality of playback paths defined in the playlist information include, as another type of playback path, a progressive-second-optional-rate playback path which is a playback path for playing back the progressive pictures at a second optional rate only within a predetermined geographical region, one of the plurality of control programs instructs the playback device to play back the progressive pictures at the second optional rate, on a condition that the playback device has a capability to process the progressive-first-optional-rate playback path and a capability to process the progressive-second-optional-rate playback path, the player setting register is a first capability register indicating whether or not the playback device has a capability to process the progressive pictures at the optional rate, the playback device further comprises a second capability register indicating whether or not the playback device has a capability to play back the progressive pictures at the second optional rate, and when the playback device is instructed to play back the progressive pictures at the second optional rate, the playback unit plays back the progressive pictures at the second optional rate on a condition that the first capability register indicates that the playback device has the capability to process the progressive pictures at the optional rate and the second capability register indicates that the playback device has the capability to play back the progressive pictures at the second optional rate.

13. The playback device of claim 8, wherein the player setting register includes:

a first capability register indicating whether or not the playback device has a capability to process the progressive pictures at the optional rate; and a second capability register indicating whether or not a display device has a capability to display the progressive pictures at the optional rate, and when the playback device is instructed to play back the progressive pictures at the optional rate, the playback unit plays back the progressive pictures at the optional rate on a condition that the first capability register indicates that the playback device has the capability to process the progressive pictures at the optional rate and the second capability register indicates that the display device has the capability to display the progressive pictures at the optional rate.

14. The playback device of claim 8, wherein a top menu displayed by the top menu title includes two or more button objects which correspond one-to-one to two or more titles and each receive a selection of a corresponding title on the top menu, the two or more titles include a first-type title that instructs the playback device to play back the progressive pictures at the optional rate and a second-type title that instructs the playback device to play back the progressive pictures at a frame rate other than the optional rate or to play back the interlace pictures, a control program corresponding to the top menu title
sets a button object corresponding to the first-type title among the two or more button objects to an enable state when the playback device has a capability to process the progressive-optional-rate playback path, and
sets the button object corresponding to the first-type title to a disable state when the playback device does not have the capability to process the progressive-optional-rate playback path, and the playback device further comprises:

a receiving unit configured to receive a user operation; and a graphics decoder configured to decode a graphics stream and display a top menu including a plurality of buttons, and change the plurality of buttons in state in accordance with the user operation.

15. A recording device comprising:

an encoder configured to obtain a plurality of digital streams respectively including a plurality of video streams by performing an encoding process;

a generating unit configured to generate a plurality of pieces of playlist information corresponding to the plurality of digital streams, a plurality of control programs, and an index table; and a writing unit configured to write the plurality of digital streams, the plurality of pieces of playlist information, the plurality of control programs, and the index table onto a recording medium, wherein the plurality of video streams include a video stream composed of progressive pictures and a video stream composed of interlace pictures, and the video stream composed of the progressive pictures has a mandatory rate or an optional rate, the mandatory rate is a frame rate at which any playback device can decode and play back the progressive pictures, and the optional rate is a frame rate at which a limited types of playback devices can decode and play back the progressive pictures, each of a plurality of control programs instructs the playback device to play back one of the plurality of video streams in accordance with one of the plurality of playback paths defined in the plurality of pieces of playlist information, the index table indicates one-to-one correspondence between a plurality of titles and the plurality of control programs, the plurality of titles including a first play title and a top menu title, and among the plurality of control programs, control programs corresponding to the first play title and the top menu title exclude a progressive-optional-rate playback path from a playback target, the progressive-optional-rate playback path being a playback path for playing back the progressive pictures in the video stream at the optional rate.

16. The recording device of claim 15, wherein the index table is generated to make one or more general titles that include neither the first play title nor the top menu title among the plurality of titles to correspond to one or more control programs which instruct the playback device to play back the video stream composed of the progressive pictures at the optional rate, on a condition that the playback device has a capability to process the video stream composed of the progressive pictures at the optional rate, and then the index table is written on the recording medium.

17. The recording device of claim 15, wherein a plurality of mask flags are recorded on the recording medium as corresponding to the plurality of titles, the plurality of mask flags each indicating whether or not a search operation for searching a corresponding title is prohibited, and among the plurality of mask flags, one or more mask flags corresponding to one or more titles that instruct to play back the progressive pictures at the optional rate are set to indicate that search operations for searching the one or more titles are prohibited, and then the one or more mask flags are written on the recording medium.

18. The recording device of claim 15, wherein when writing the progressive-optional-rate playback path, which includes a first-attribute playback section defined for a video stream that satisfies a condition of being composed of progressive pictures and having the optional rate, onto the recording medium, when the progressive-optional-rate playback path includes another playback section, a video stream defined by the another playback section is regarded to satisfy the condition, and information indicating presence of the first-attribute playback section is set in a playlist that includes one or more first-attribute playback sections.

19. The recording device of claim 15, wherein the progressive-optional-rate playback path is a progressive-first-optional-rate playback path which is a playback path for playing back the progressive pictures at a first optional rate, and the plurality of playback paths defined in the playlist information include, as another type of playback path, a progressive-second-optional-rate playback path which is a playback path for playing back the progressive pictures at a second optional rate only within a predetermined geographical region, and when a piece of playlist information defining the progressive-second-optional-rate playback path for playing back only within the predetermined geographical region is written onto the recording medium, a control program, which instructs the playback device to play back the progressive pictures at the second optional rate on a condition that the playback device has a capability to process the progressive-first-optional-rate playback path and a capability to process the progressive-second-optional-rate playback path, is written onto the recording medium together with the piece of playlist information.

20. The recording device of claim 15, wherein each of the plurality of control programs is generated such that, when playing back the progressive-optional-rate playback path, each of the plurality of control programs judges whether or not a display device has a capability to process the progressive-optional-rate playback path, and instructs the playback device to play back the progressive-optional-rate playback path, on a condition that the display device has the capability to process the progressive-optional-rate playback path, and then the generated control programs are written onto the recording medium.

21. The recording device of claim 15, wherein a top menu displayed by the top menu title includes two or more button objects which correspond one-to-one to two or more titles and each receive a selection of a corresponding title on the top menu, the two or more titles include a first-type title that instructs the playback device to play back the progressive pictures at the optional rate and a second-type title that instructs the playback device to play back the progressive pictures at a frame rate other than the optional rate or to play back the interlace pictures, and a control program, which sets a button object corresponding to the first-type title among the two or more button objects to an enable state when the playback device has a capability to process the progressive-optional-rate playback path and sets the button object corresponding to the first-type title to a disable state when the playback device does not have the capability to process the progressive-optional-rate playback path, is generated, and the generated control program is made to correspond to a top menu title in the index table, and then is written onto the recording medium.

\* \* \* \* \*